United States Patent
Du et al.

(10) Patent No.: US 11,682,777 B2
(45) Date of Patent: Jun. 20, 2023

(54) MULTIFUNCTIONAL MANIFOLD FOR ELECTROCHEMICAL DEVICES AND METHODS FOR MAKING THE SAME

(71) Applicants: Yanhai Du, Hudson, OH (US); Aliia Mubarak Moh Maar, Riyadh (SA)

(72) Inventors: Yanhai Du, Hudson, OH (US); Aliia Mubarak Moh Maar, Riyadh (SA)

(73) Assignees: Kent State University, Kent, OH (US); YANHAI POWER TECHNOLOGY, LLC, Hudson, OH (US)

( * ) Notice: Subject to any disclaimer, the term of this patent is extended or adjusted under 35 U.S.C. 154(b) by 213 days.

(21) Appl. No.: 16/771,718

(22) PCT Filed: Dec. 12, 2017

(86) PCT No.: PCT/US2017/065758
§ 371 (c)(1),
(2) Date: Jun. 11, 2020

(87) PCT Pub. No.: WO2019/117589
PCT Pub. Date: Jun. 20, 2019

(65) Prior Publication Data
US 2021/0175526 A1    Jun. 10, 2021

(51) Int. Cl.
H01M 8/04082    (2016.01)
H01M 8/12        (2016.01)

(52) U.S. Cl.
CPC .......... *H01M 8/04201* (2013.01); *H01M 2008/1293* (2013.01)

(58) Field of Classification Search
CPC ..... H01M 8/04201; H01M 2008/1293; H01M 8/2484; Y02E 60/50
See application file for complete search history.

(56) References Cited

U.S. PATENT DOCUMENTS

| | | | |
|---|---|---|---|
| 8,182,959 B2 | 5/2012 | Du et al. | 429/497 |
| 2006/0093884 A1* | 5/2006 | Seabaugh | H01M 8/1253 429/188 |
| 2007/0003806 A1 | 1/2007 | Sarkar et al. | 429/26 |
| 2007/0231669 A1 | 10/2007 | Ghosh | 429/38 |
| 2007/0259235 A1 | 11/2007 | Jacobson et al. | 420/30 |
| 2008/0096085 A1 | 4/2008 | Tsunoda | 429/34 |
| 2009/0117435 A1 | 5/2009 | Du et al. | 429/31 |
| 2009/0202878 A1* | 8/2009 | Schild | H01M 8/04022 165/166 |
| 2010/0143755 A1* | 6/2010 | Fischer | H01M 8/0618 429/452 |
| 2011/0281191 A1* | 11/2011 | Okanishi | H01M 8/2475 429/444 |
| 2016/0264416 A1 | 9/2016 | Finnerty et al. | |

FOREIGN PATENT DOCUMENTS

WO    WO-03088378 A2 * 10/2003 .......... H01M 8/0254

OTHER PUBLICATIONS

International Search Report dated Apr. 12, 2018 in related application No. PCT/US2017/065758.
Written Opinion dated Apr. 12, 2018 in related application No. PCT/US2017/065758.
Yanhai Du; *Super-High Volumetric Power Density SOFC Module*, Fuel Cell Seminar & Exposition, Mohegan Sun, Nov. 6, 2012.
Du et al.; *From JP-8 Fuel to Solid Oxide Fuel Cell Portable Power*, Fuel Cell Seminar & Exposition, Columbus, Ohio, Oct. 23, 2013.

* cited by examiner

*Primary Examiner* — Muhammad S Siddiquee
(74) *Attorney, Agent, or Firm* — Renner Kenner Greive Bobak Taylor and Weber

(57) ABSTRACT

A multifunctional manifold for use with electrochemical devices having a spiral cross-section, such as spiral solid-oxide fuel cells, includes an interface that is configured to be placed in operative communication with such devices. The interface includes a fuel interface section and an oxidant interface section that are each configured as spirals. The spiral interface sections also include channels that are configured to be placed in operative communication with corresponding spiral channels of the electrochemical device to deliver operating gases, such as fuel gas and oxidant gas, thereto. In addition to delivering operating gases to the fuel cells, the multifunctional manifold is also configured to act as an electrical current collector and a heat exchanger.

8 Claims, 43 Drawing Sheets

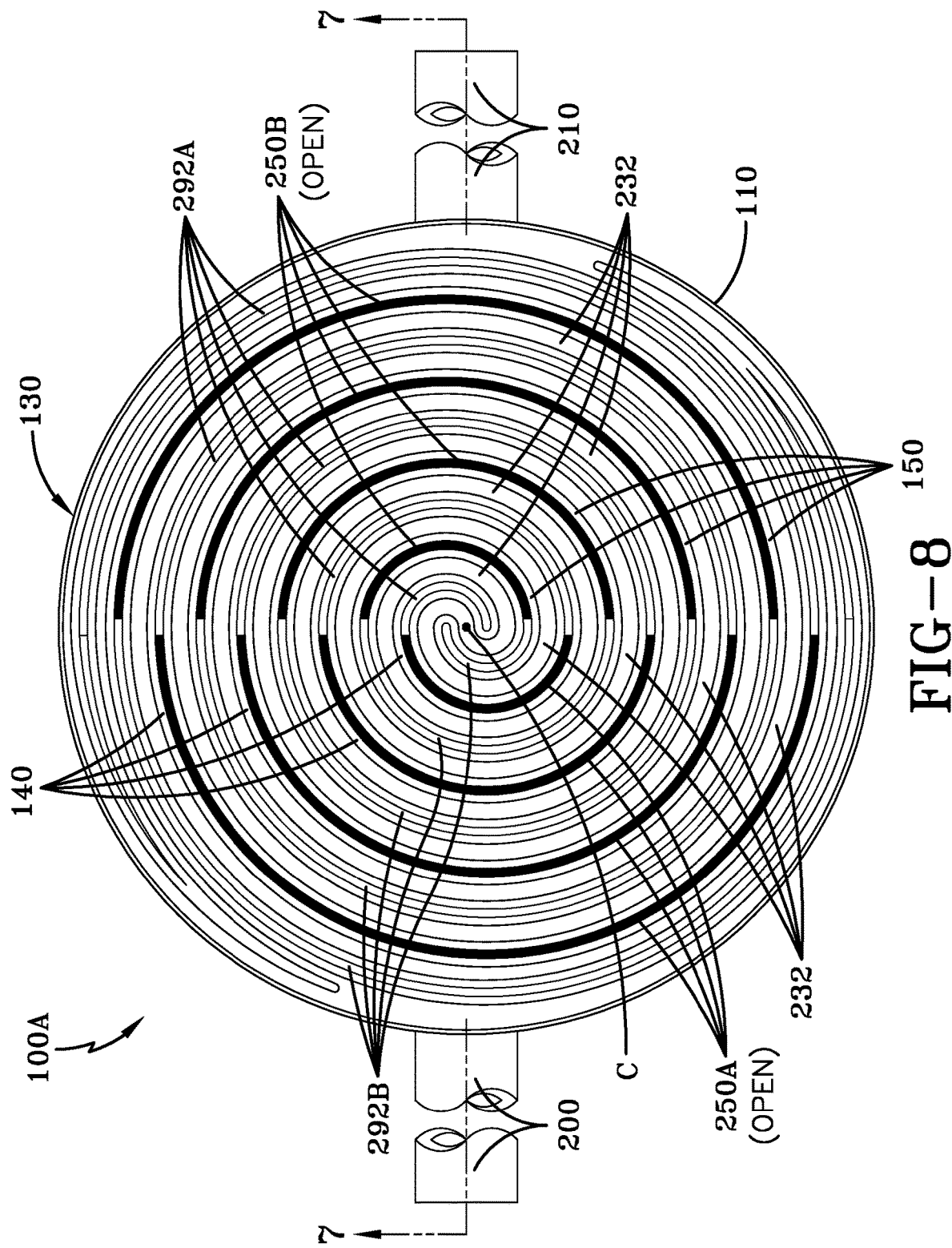

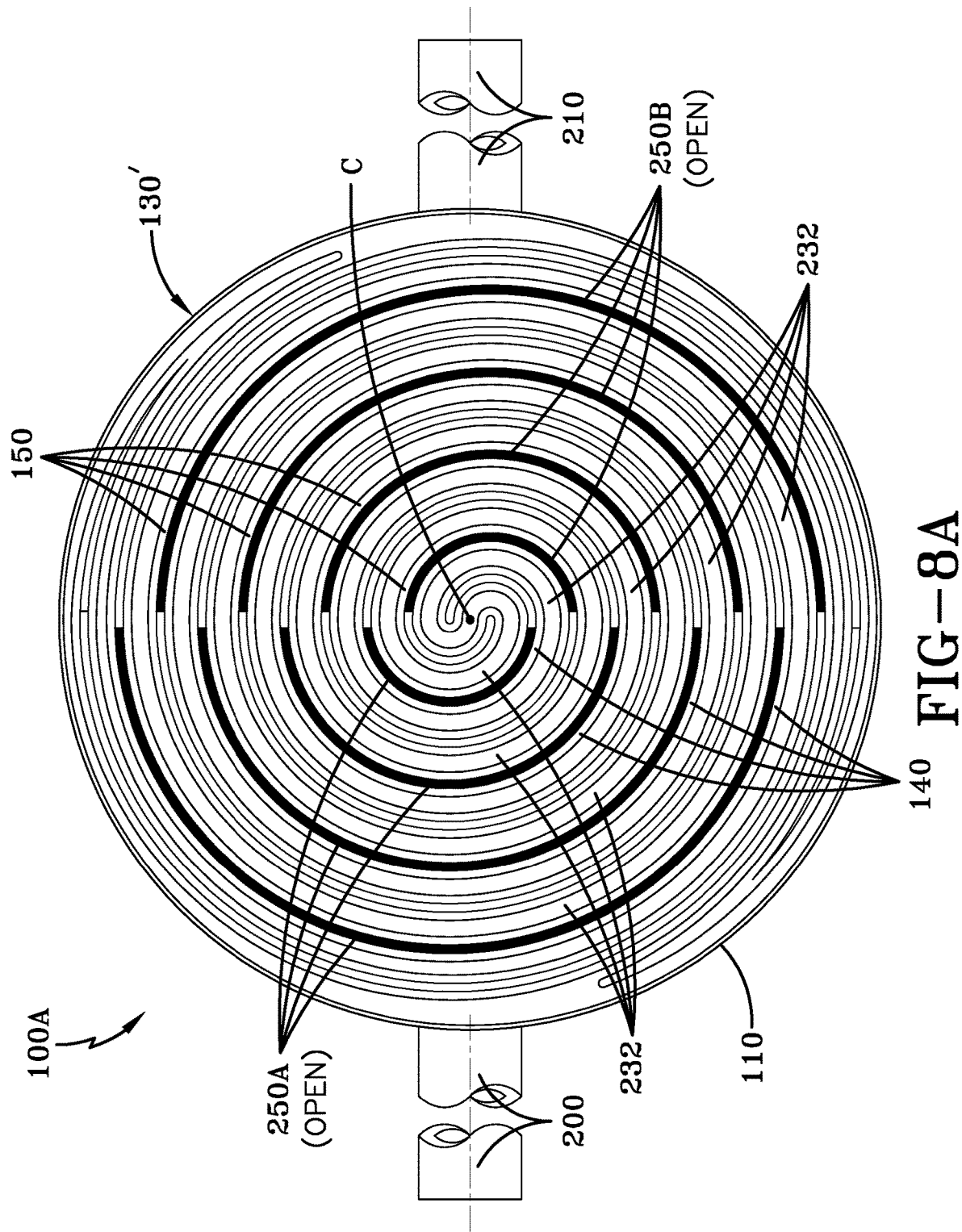

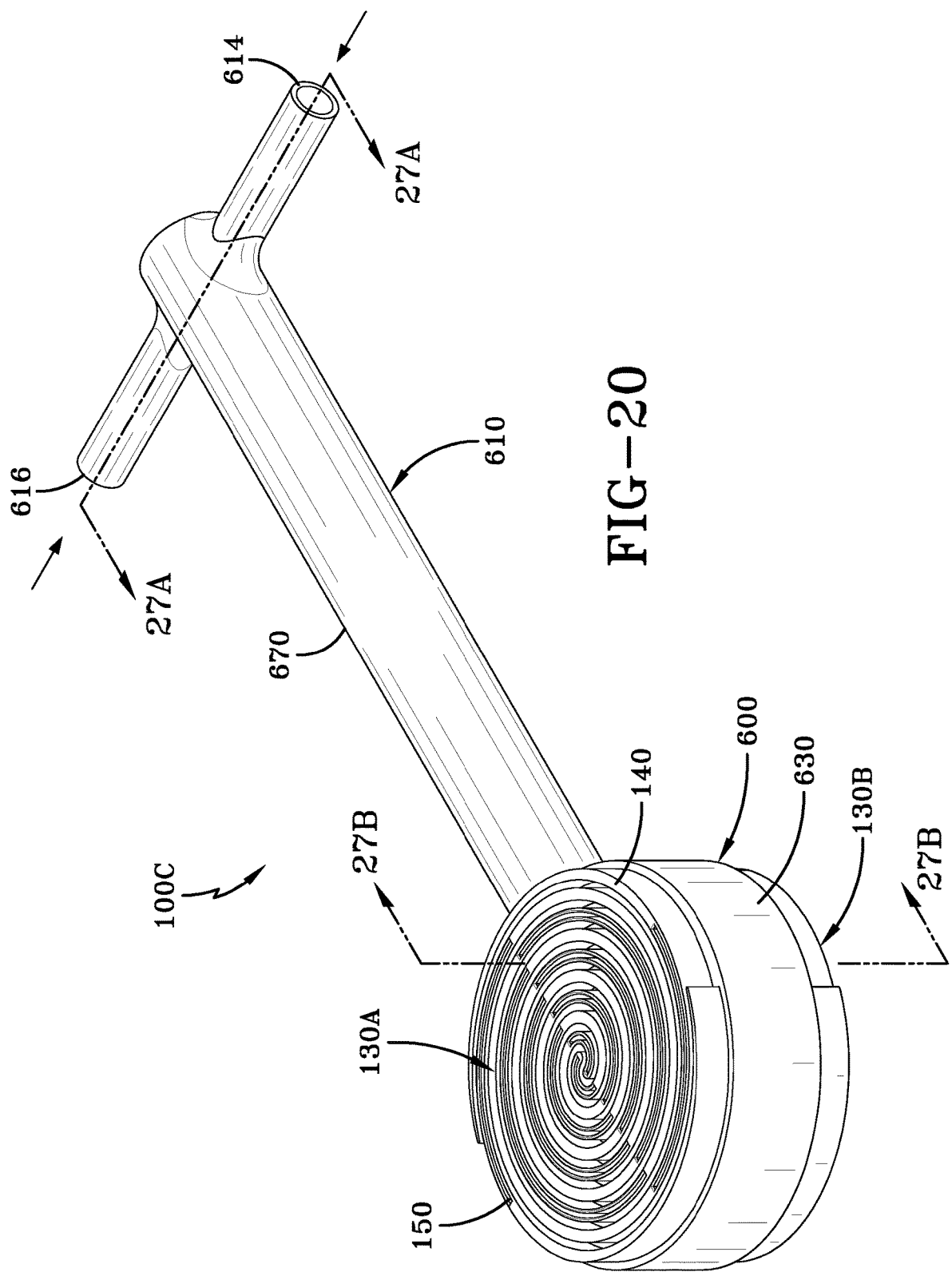

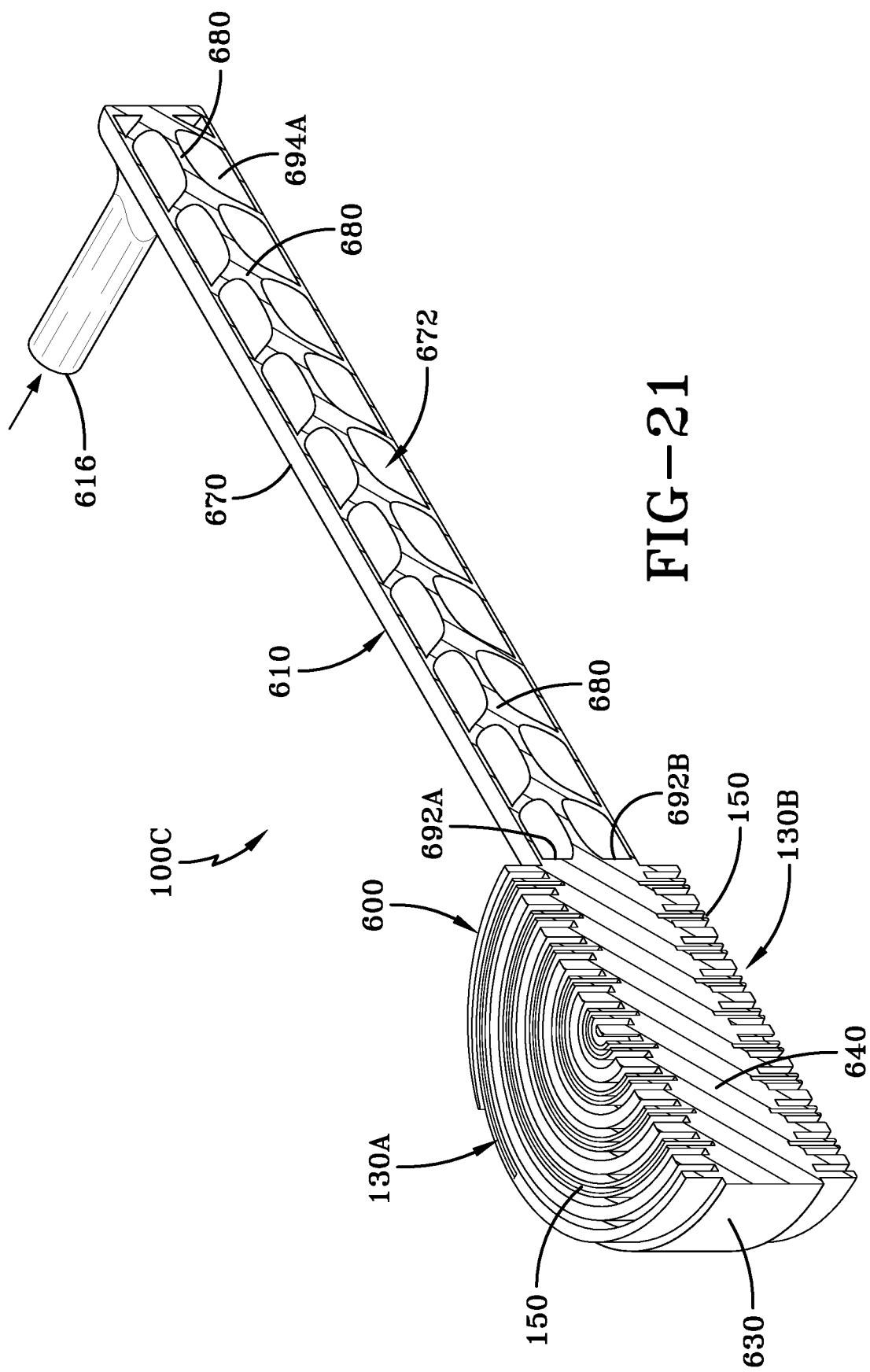

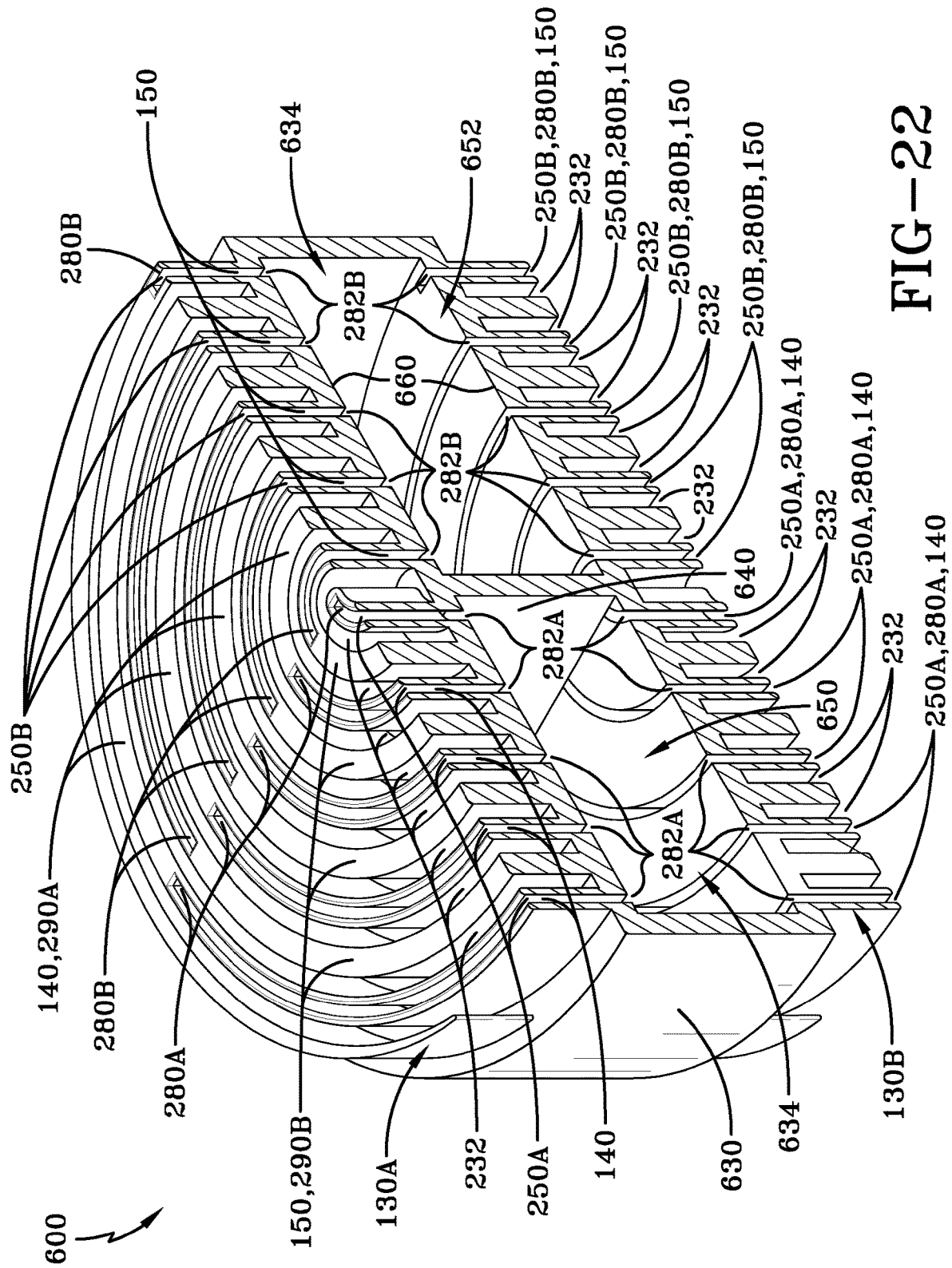

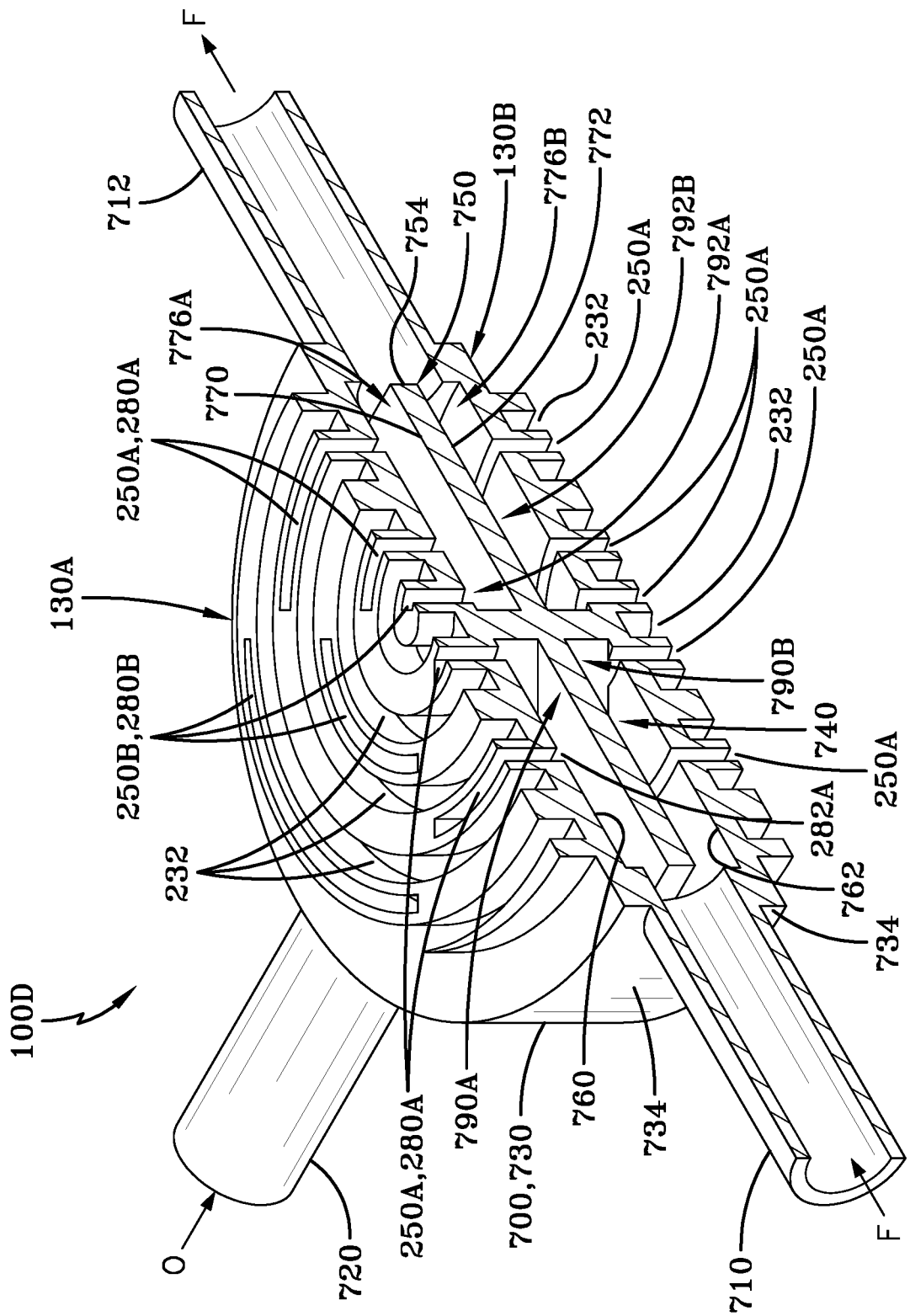

MULTIFUNCTIONAL MANIFOLD FOR ELECTROCHEMICAL DEVICES AND METHODS FOR MAKING THE SAME

TECHNICAL FIELD

The embodiments disclosed herein relate to tubular electrochemical devices. In particular, the embodiments disclosed herein relate to manifolds for use with tubular solid-oxide electrochemical devices. More particularly, the embodiments disclosed herein relate to manifolds for use with tubular solid-oxide electrochemical devices that have a spiral cross-section.

BACKGROUND

As the world pursues sources of clean and reliable energy, the development of fuel cell and electrolysis technologies have increased in importance. In general, a fuel cell is an electrochemical device that continuously converts chemical energy of a fuel gas, such as hydrogen, into electrical energy without combustion, whereupon water and heat are formed as by-products. In terms of design, a fuel cell includes two electrodes that are separated by an electrolytic medium, which prevents, for example, the direct contact between the fuel gas and an oxidant gas, such as oxygen.

Tubular solid-oxide fuel cells have also been pursued due to their desirable operating features, such as thermal shock resistance and high mechanical strength. In addition, increased operating performance of tubular solid-oxide fuel cells has been achieved by arranging the anode, the cathode, and the electrolyte thereof in a spiral configuration, so as to form a spiral solid-oxide fuel cell(s). For example, an exemplary SOFC that is configured with such a spiral configuration is set forth in U.S. Pat. No. 8,182,959, which is incorporated herein by reference.

Specifically, as shown in FIGS. 1-4, the '959 patent provides an SOFC 10 that has a generally cylindrical shape with a cross-section that is representative of a closed Fermat spiral. A "Fermat spiral" refers to a parabolic spiral, such as a spiral 50 shown in FIG. 3. The Fermat spiral of spiral 50 is a type of Archimedean spiral, which follows the equation $r=\pm\theta^{1/2}$, in polar coordinates (the more general Fermat spiral follows $r^2=a^2\theta$). In some embodiments, the spiral 50 may be configured so that the width of the fuel channel 18 is a consistent dimension, except for the portions of the fuel channel 18 that form the ends of the fuel channel 18, which are tapered. Similarly, the spiral 50 may be configured so that the width of the oxidant channel 20 is a consistent dimension, except for the portions of the oxidant channel 20 that forms the ends of the oxidant channel 20, which are tapered. The term "closed Fermat spiral" refers to a Fermat spiral in which the spiral closes upon itself, such as the spiral 2 shown in FIG. 4, whereby a first end 4 and a second end 6 are closed.

Continuing, FIG. 1 of the '959 patent shows the SOFC 10 having a substantially cylindrical shape and a cross-section representative of a closed Fermat spiral. The SOFC 10 includes a first end 32, a midpoint 34, and a second end 36. Additionally, FIGS. 1 and 2 show an anode 12, an electrolyte 14, a cathode 16, a fuel channel 18 (bounded by the anode 12), and an oxidant channel 20 (bounded by the cathode 16) that are provided by the SOFC 10. The electrolyte 14 is interposed between the anode 12 and the cathode 16 so that, together, the anode 12, the electrolyte 14, and the cathode 16 form a multilayer member 19. The multilayer member 19, in turn, has a substantially cylindrical shape and exhibits a cross-section representative of a closed Fermat spiral. In some embodiments, the width of the multilayer member 19 has a consistent dimension, except for the portions of the multilayer member 19 that form the ends of the multilayer member 19, which are tapered.

During operation of the SOFC 10, an oxidant, such as air, flows through the oxidant channel 20, and fuel flows through the fuel channel 18, either in the same or an opposite axial direction. Oxidant molecules in the oxidant channel 20 permeate the cathode 16 and contact the electrolyte 14 where, in the case of an ionic conductor, oxygen ions are formed. The oxygen ions diffuse into the electrolyte 14 and migrate to the other side of the multilayer member 19 where they encounter the anode 12 and fuel flowing through the fuel channel 18.

Thus, given the structural characteristics of tubular electrochemical devices having a spiral cross-section, including spiral solid-oxide fuel cells such as that disclosed in the '959 patent, there is a need to provide a manifold for efficiently communicating materials, including an oxidant gas, such as air or oxygen, and fuel gas, such as hydrogen, with tubular electrochemical devices having a spiral cross-section, including, but not limited to: spiral solid-oxide electrolysis cells, and tubular solid-oxide fuel cells, and the like. In addition, there is a need for a heat exchanger that, in some embodiments, operates in conjunction with the manifold to recover heat generated by the operation of tubular electrochemical devices and to preheat one or more inlet gases to enhance the operational performance of such tubular electrochemical devices coupled thereto. Still yet, there is a need for a manifold for use tubular electrochemical devices having a spiral cross-section to collect the electrical current generated by electrochemical fuel cells, or to deliver electrical current to solid-oxide electrolysis cells.

SUMMARY

In light of the foregoing, it is a first aspect of the various embodiments disclosed herein to provide a manifold for an electrochemical device comprising a body including a fuel chamber and an oxidant chamber that are separate from one another, such that a fuel port is in operative communication with the fuel chamber and an oxidant port is in operative communication with the oxidant chamber; an interface adapted to be operatively coupled to the electrochemical device, the interface comprising a fuel interface section including a fuel channel that is in operative communication with the fuel chamber; and an oxidant interface section including an oxidant channel that is in operative communication with the oxidant chamber, wherein the fuel interface section at least partially forms a spiral, and the oxidant interface section at least partially forms a spiral.

It is a further aspect to provide the manifold with a first electrode and a second electrode carried by the body and electrically coupled to respective first and second interface terminals, wherein the first electrode is configured to be placed in electrical communication with an anode of the electrochemical device, and the second electrode is configured to be placed in electrical communication with a cathode of the electrochemical device.

It is yet another aspect of the manifold, to provide that the first electrode and the second electrode are provided by at least a portion of the fuel interface section and at least a portion of the oxidant interface section, respectively.

Still another aspect is to provide the manifold, so that at least a portion of the fuel interface section forms the first electrode and at least a portion of the oxidant interface section forms the second electrode.

It is yet another aspect of the various embodiments disclosed herein to provide a manifold for an electrochemical device comprising a body having a base from which extends a wall that defines a first cavity, the base and the wall formed by spaced surfaces that define a second cavity therein; a heat exchanger disposed in the second cavity, wherein the heat exchanger is in operative communication with a fuel port and an oxidant port; an interface positioned in the first cavity of the body, the interface configured to be operatively coupled to the electrochemical device, wherein the interface includes: a fuel interface section having a fuel channel that is in operative communication with the heat exchanger; and an oxidant interface section having an oxidant channel that is in operative communication with the heat exchanger; wherein the fuel interface section and the oxidant interface section each at least partially forms a Fermat spiral.

Another aspect of the manifold is to provide a first electrode and a second electrode carried by the body and electrically coupled to respective first and second interface terminals, wherein the first electrode is configured to be placed in electrical communication with an anode of the electrochemical device, and the second electrode is configured to be placed in electrical communication with a cathode of the electrochemical device.

Yet another aspect of the manifold provides that the first electrode and the second electrode are provided by at least a portion of the fuel interface section and at least a portion of the oxidant interface section, respectively.

It is yet another aspect of the manifold to provide that at least a portion of the fuel interface section forms the first electrode and at least a portion of the oxidant interface section forms the second electrode.

Yet another aspect of the various embodiments disclosed herein is to provide a manifold for an electrochemical device comprising a body; a first interface and a second interface included by the body, wherein the first interface and the second interface each include: a first fuel port in operative communication with a second fuel port included by the body; and a first oxidant port in operative communication with a second oxidant port included by the body, wherein the first fuel port and the first oxidant port each form a closed Fermat spiral.

Still another aspect of the manifold is to provide a first electrode and a second electrode carried by the interface body and electrically coupled to respective first and second interface terminals, wherein the first electrode is configured to be placed in electrical communication with an anode of the electrochemical device, and the second electrode is configured to be placed in electrical communication with a cathode of the electrochemical device.

Yet another aspect of the various embodiments disclosed herein is to provide a manifold for a plurality of electrochemical fuel cells comprising a body defining a cavity therein; a partition separating the cavity into a first group of a plurality of separate chambers and a second group of a plurality of separate chambers, wherein each of the chambers of each the group is in fluid communication with one of a fuel inlet, a fuel outlet, an oxidant inlet, and an oxidant outlet; and a first interface and a second interface, wherein the interfaces each include: a fuel interface section including a fuel inlet channel, and a fuel outlet channel; and an oxidant interface section including an oxidant inlet channel, and an oxidant outlet channel, wherein the fuel interface section and the oxidant interface section each form a spiral; wherein the fuel inlet channel and the fuel outlet channel of the first and second interfaces are respectively in fluid communication with the fuel inlet chamber and the fuel outlet chamber of the first and second groups of the chambers respectively, and wherein the oxidant inlet channel and the oxidant outlet channel of the first and second interfaces are respectively in fluid communication with the oxidant inlet chamber and the oxidant outlet chamber of the first and second groups of the chambers respectively.

Another aspect of the various embodiments disclosed herein is to provide a method of forming a spiral fuel cell comprising providing a material; depositing the material by an additive manufacturing process; and controlling the depositing step to form a spiral fuel cell.

Yet another aspect of the method is that the material comprises a ceramic composite material.

Still another aspect of the method is that the ceramic composite material comprises yttria-stabilized zirconia (YSZ) and nickel oxide (NiO).

Yet another aspect of the method is that the additive manufacturing process comprises selective laser sintering (SLS).

Another aspect of the method is that the additive manufacturing process is selected from the group consisting of: powder and slurry based 3D printing; selective laser melting (SLM), stereo lithography, laminated object manufacturing, direct deposition additive manufacturing, material jetting, or binder jetting.

Still another aspect of the method is that the spiral fuel cell has a porosity between about 35-45%.

Another aspect of the method is that one portion of the fuel cell has a pore size of about 1 um or less, and another portion of the fuel cell has a pore size of between about 5-20 um.

Yet another aspect of the method is that the material includes ceramic powder, and the depositing step is controlled so that the ceramic powder has a particle size of 1 um or less.

Another aspect of method is that the deposited material is deposited as a plurality of layers that have a thickness of 10 um or less.

Yet another aspect of the method is that the additive manufacturing process utilizes an extrusion or injection molding process.

Still another aspect of the various embodiments disclosed herein is to provide a method of attaching an electrochemical device to a manifold comprising providing a fuel cell having a spiral cross-section; providing a first and a second manifold each having a spiral interface; interfacing the spiral interface of the first manifold to one end of the electrochemical device; and interfacing the spiral interface of the second manifold to another end of the electrochemical device.

BRIEF DESCRIPTION OF THE DRAWINGS

The various embodiments disclosed herein will be better understood by referencing the following description, appended claims, and accompanying drawings, wherein:

FIG. 8 is a top plan view of the manifold embodiment shown in FIG. 5 in accordance with the concepts and disclosures presented herein;

FIG. 8A is another top plan view of the manifold embodiment shown in FIG. 5 in accordance with the concepts and disclosures presented herein;

FIG. 20 is another embodiment of a manifold for use with a tubular SOFC having a spiral cross-section in accordance with the concepts and disclosures presented herein;

FIG. 21 is a cross-sectional view of the manifold embodiment shown in FIG. 20 in accordance with the concepts and disclosures presented herein;

FIG. 22 is a cross-sectional perspective view of the manifold embodiment shown in FIG. 20 in accordance with the concepts and disclosures presented herein;

FIG. 30 is a cross-sectional view of the manifold embodiment shown in FIG. 28 in accordance with the concepts and disclosures presented herein;

DETAILED DESCRIPTION

Various embodiments of a manifold discussed herein are configured for use with any tubular electrochemical device having a spiral cross-section, hereinafter referred to as a spiral electrochemical device or "SOFC", which may include, but is not limited to: solid-oxide electrochemical devices, such as solid-oxide electrolyzer cells, and solid-oxide fuel cells, including SOFC 10 previously discussed for example. However, to facilitate the understanding of the operation of the various embodiments of the manifold presented herein, the discussion relating to these manifolds has been made with reference to the use of the SOFC 10; nonetheless, such discussion should not be construed as limiting, as such manifolds are capable of being used with any suitable SOFC device.

One embodiment of a manifold is referred to by numeral 100A, as shown in FIGS. 5-11A. The manifold 100A includes a hollow interface body 110 that supplies fuel gas and an oxidant gas to an interface 130. The interface 130 includes a fuel interface section 140 and an oxidant interface section 150 that are arranged as spirals. Accordingly, the interface 130 enables the operative communication of the manifold 100A to a compatible tubular electrochemical device having a spiral cross-section in order to deliver fuel and oxidant thereto. It should be appreciated that the terms "operative communication" and "fluid communication" and variations thereof are defined herein as the ability of two structures to transfer gas material therebetween.

Figure 6:
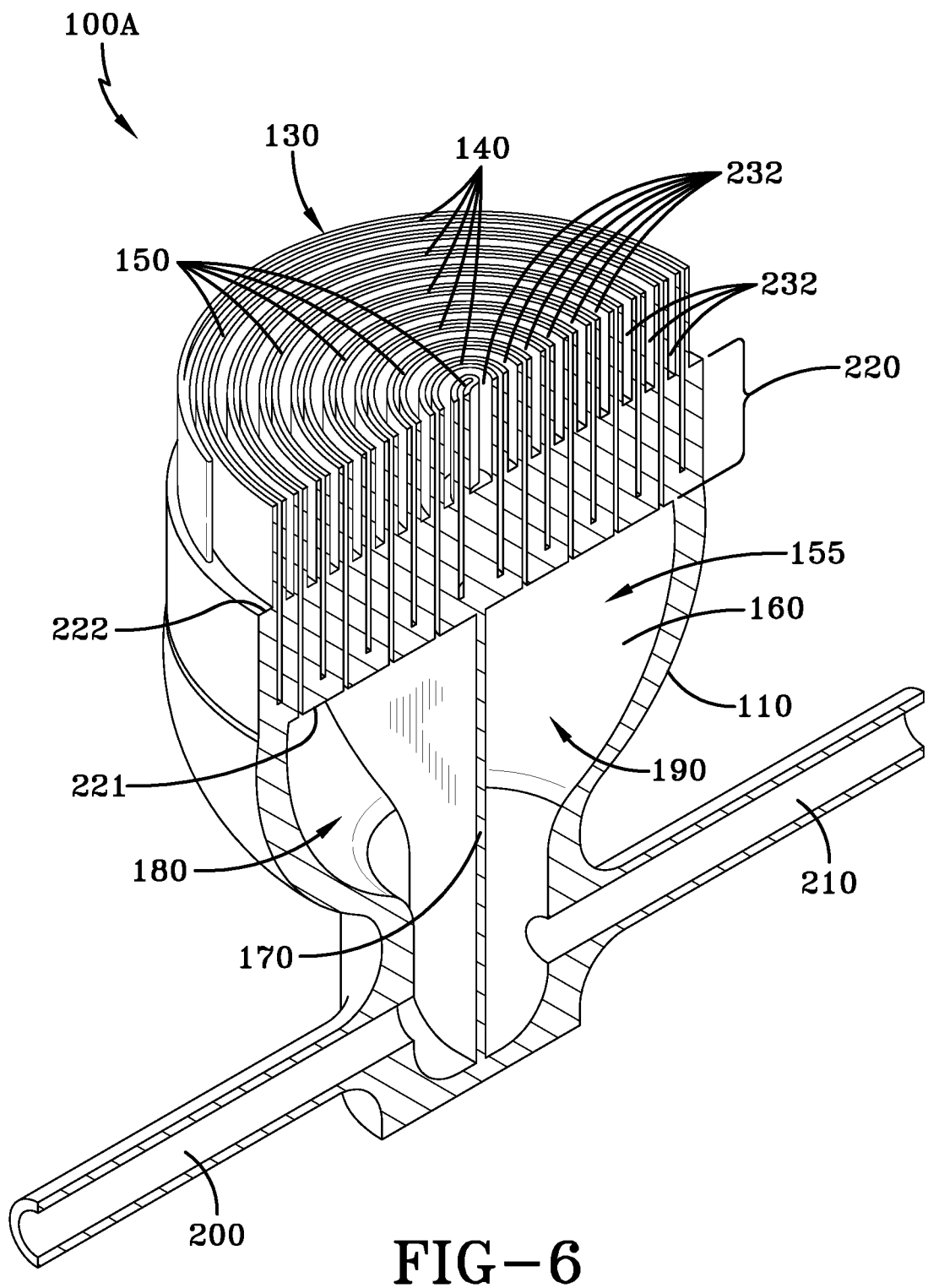
FIG. 6 is a cross-sectional perspective view of the manifold embodiment shown in FIG. 5 in accordance with the concepts and disclosures presented herein.

The body 110 of the manifold 100A defines an inner cavity 155 that is in operative communication with the interface 130. The shape or dimension of the inner cavity 155 is defined by an inner surface 160. The inner surface 160 may be configured to have a concave cross-sectional shape, as shown in FIG. 6, or a conical or cone-shaped cross-sectional shape, as shown with regard to the embodiment of the manifold designated as 100A' in FIG. 11. In other embodiments, the inner surface 160 defining the inner cavity 155 may be configured to have any suitable shape, including a curvilinear shape, a rectilinear shape, or any combination thereof. Disposed in the inner cavity 155 is a partition 170 that, as shown clearly in FIGS. 6-7, divides the inner cavity 155 into a separate fuel chamber 180 and a separate oxidant chamber 190. In addition, the fuel chamber 180 is in operative communication with a fuel port 200, while the oxidant chamber 190 is in fluid communication with an oxidant port 210. The fuel port 200 and the oxidant port 210 are disposed through the body 110 and are configured to allow fuel gas, such as hydrogen, and an oxidant gas, such as air or oxygen, to be respectively fluidly communicated to respective chambers 180 and 190 from outside of the body 110.

The interface 130 is disposed on a base section 220 provided by the interface body 110 that is adjacent to the inner cavity 155. The base section 220 includes an inner surface 221 and outer surface 222. As such, the fuel interface section 140 and the oxidant interface section 150 provided by the interface 130 extend from the outer surface 222 of the base section 220, while the partition 170 extends between the inner surface 221 of the base section 220 to an inner surface 160 of the inner cavity 155. In addition, the interface 130 includes the fuel interface section 140 and the oxidant interface section 150, which are each configured to have a spiral shape. In some embodiments, the spirals of the interface sections 140,150 may comprise a Fermat spiral, which in some embodiments closes on itself. In some embodiments, the fuel interface section 140 and the oxidant interface section 150 may be arranged in an interleaved or alternating manner with respect to each other and are spaced apart from each other by a spacing gap 232. Specifically, the spacing gap 232 serves to separate the interface sections 140 and 150 from each other. That is, given the spiral arrangement of the interface sections 140,150, the spacing gap 232 forms a spiral as well, such as a Fermat spiral, which in some embodiments, closes on itself. As such, the fuel interface section 140, the oxidant interface section 150, and the spacing gap 232 are arranged in a concentric, interleaved, or alternating manner to each other. In addition, the fuel and oxidant interface sections 140,150 may have a substantially rectilinear cross-section but may be configured to have any suitable cross-sectional shape, including a curvilinear shape, rectilinear shape, or any combination thereof. Similarly, the spacing gap 232 may be configured to have any suitable size or cross-sectional shape, including a curvilinear shape, a rectilinear shape, or any combination thereof. In addition, the spacing gap 232 is configured as a groove that does not extend all the way through the base section 220, and as such, the spacing gap 232 does not operatively communicate with the fuel and oxidant chambers 180 and 190.

Continuing, the fuel interface section 140 and the oxidant interface section 150 include respective fuel and oxidant channels 250A and 250B. It should be appreciated that the term "channel" is defined herein as a passage or conduit having at least two separate openings. In some embodiments, the channels 250A and 250B that are included in the respective interface sections 140 and 150 that extend from the base 220 may be defined by respective sets of spaced, substantially parallel walls 260,262 and 264,266. In addition, a portion of the fuel channel 250A also extends through the base 220 so as to be in operative communication with the fuel chamber 180, while a portion of the oxidant channel 250B also extends through the base 220 so as to be in operative communication with the oxidant chamber 190. As such, the fuel channel 250A and the oxidant channel 250B extend through the fuel interface section 140 and the oxidant interface section 150, respectively, so as to fluidly communicate with respective fuel and oxidant chambers 180 and 190.

Figure 4:
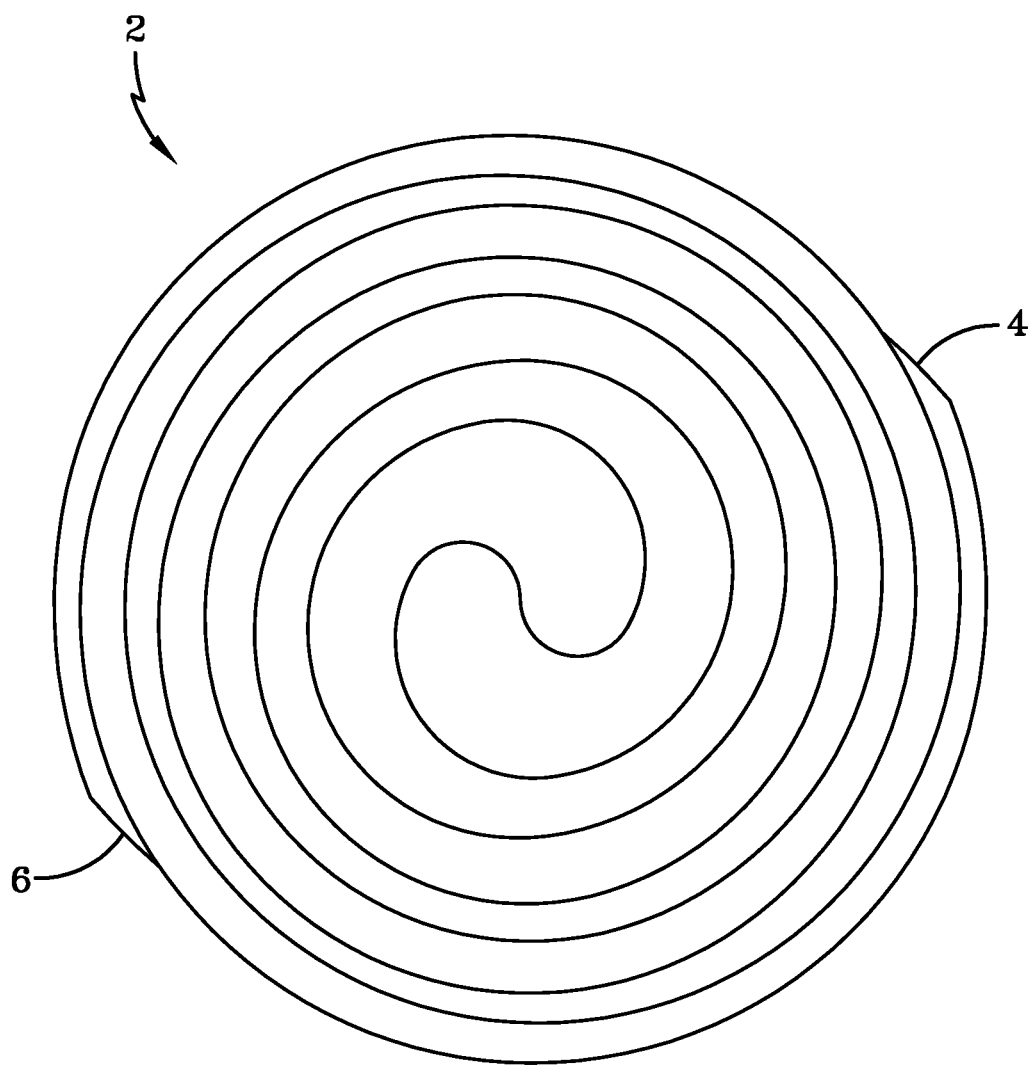
FIG. 4 is a schematic of a closed Fermat spiral.
Figure 5:
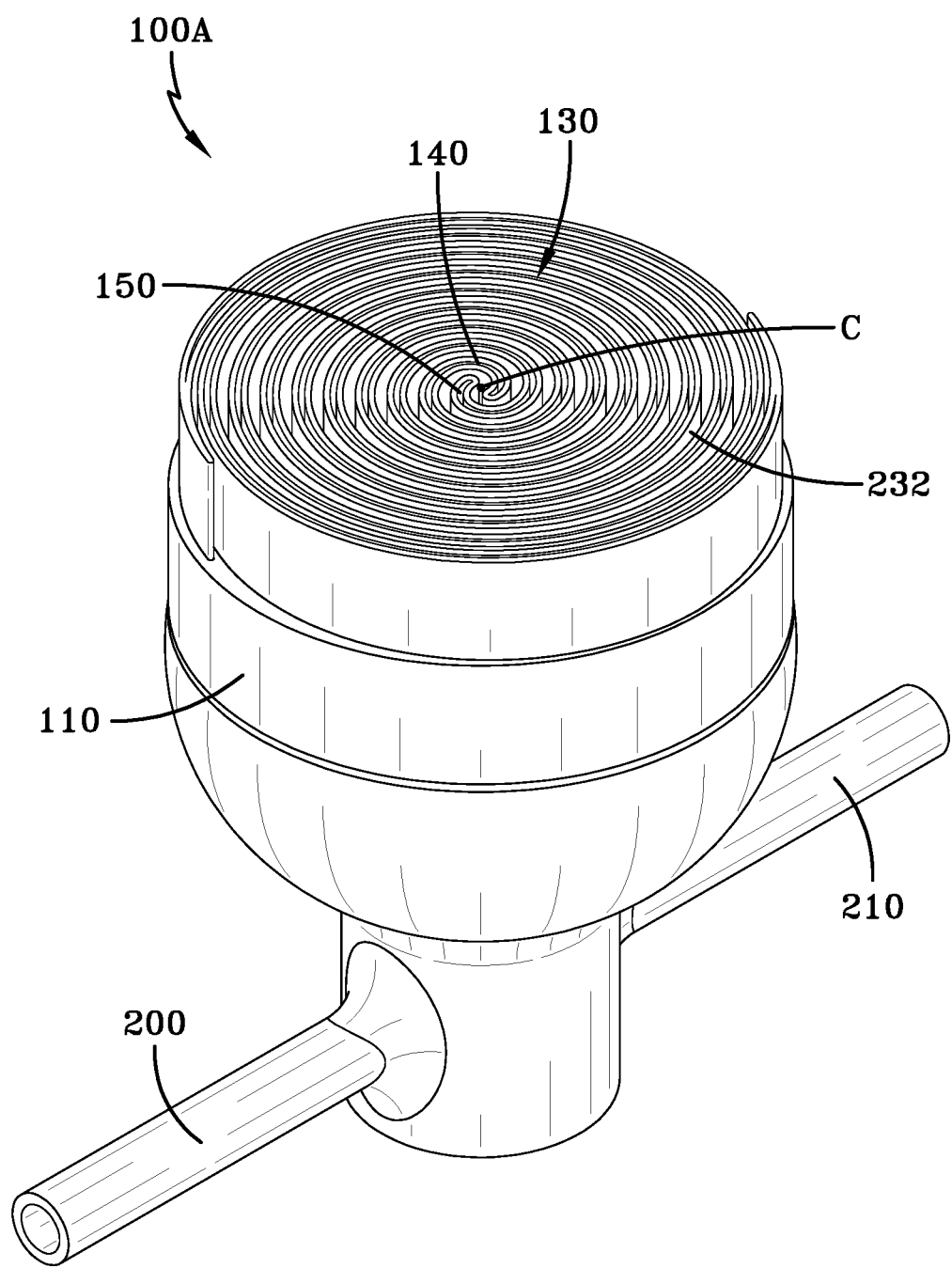
FIG. 5 is a perspective view of one embodiment of a manifold for use with a tubular SOFC having a spiral cross-section in accordance with the concepts and disclosures presented herein.

It should be appreciated that while the fuel and oxidant interface sections 140,150 may be arranged to extend radially outward from a center "C" of the interface 130 in a counter-clockwise direction, as shown in FIG. 8, other configurations are possible. For example, in other embodiments, the interface 130' may be arranged, as shown in FIG. 8A, such that the fuel and oxidant interface sections 140,150 are configured to extend radially outward from the center "C" of the interface 130 in a clockwise direction. Accordingly, such clockwise configuration of interface 130' would allow the interface 130' to be compatible for use with the fuel cell 10, shown in FIG. 4, such that the fuel interface section 140 and the oxidant interface section 150 of the manifold 100 are capable of being operatively received, interfaced, or otherwise placed in fluid communication with the fuel channel 18 and the oxidant channel 20, respectively, of the fuel cell 10.

Figure 11:
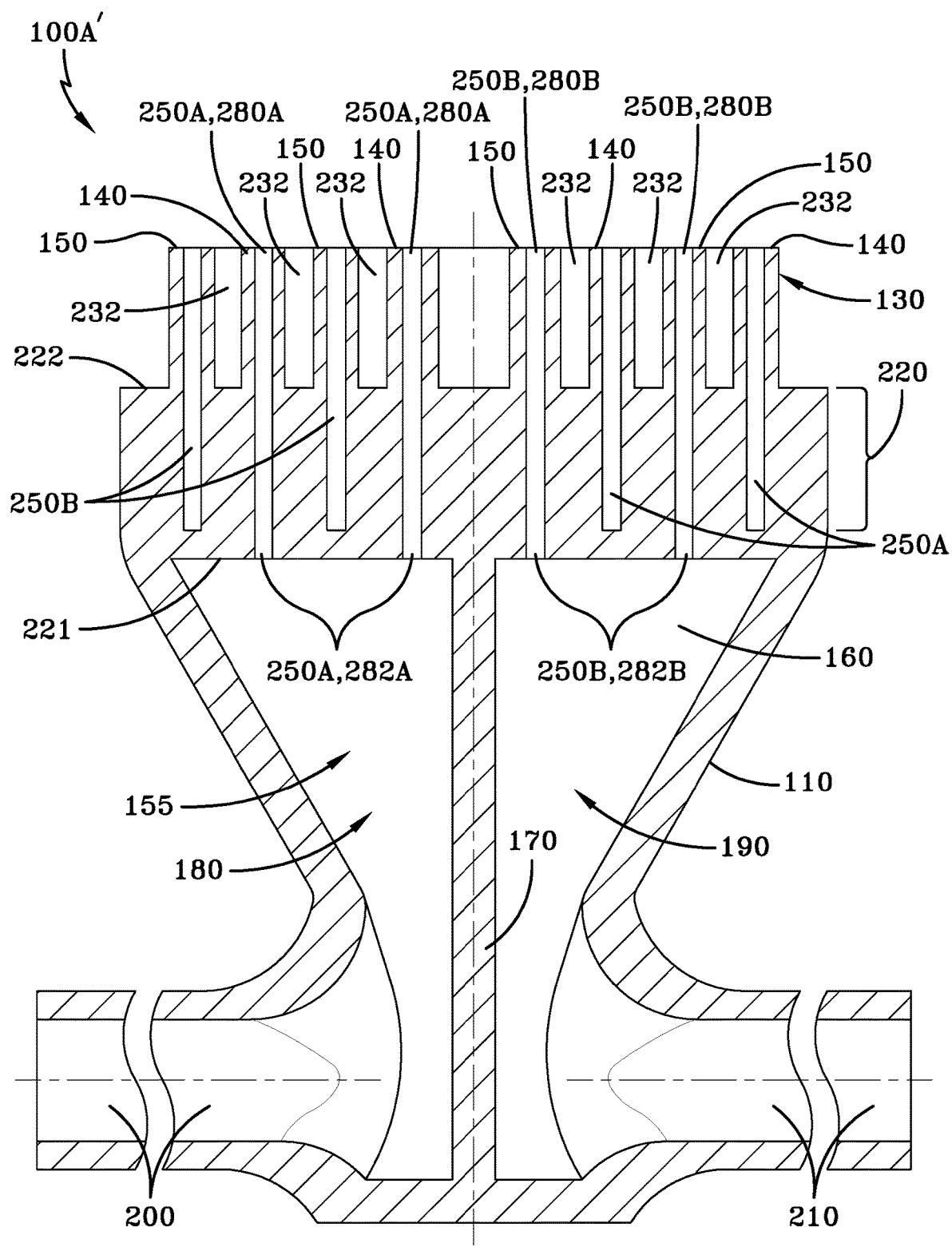
FIG. 11 is a cross-sectional view of an alternative embodiment of a manifold that is based on the manifold shown in FIG. 5 in accordance with the concepts and disclosures presented herein.

Furthermore, the size, number, and relative spacing between one or more of the interface sections 140,150, channels 250A,250B, and spacing gap 232 may be configured in any desired manner. For example, FIG. 11 shows an alternative manifold 100A' in which the interface sections 140,150 are configured to have wider fuel and oxidant channels 250A,250B and a wider spacing gap 232, and whereby the spiral sections 140,150 rotate through a smaller number of revolutions as compared to the manifold of 100A. Furthermore, while the interface sections 140,150 are shown as part of a complete spiral, other embodiments may be utilized where one or more of the interface sections 140,150 may be configured as a plurality of discrete or spaced portions or segments that follow a spiral path. In some embodiments, the interface sections 140,150 may comprise only a portion of a complete spiral. It should also be appreciated that the interface sections 140,150 may be configured to have any number of interleaved or alternating spiral revolutions, and in some embodiments the length of the interface sections 140,150 may be equal or unequal.

Figure 7:
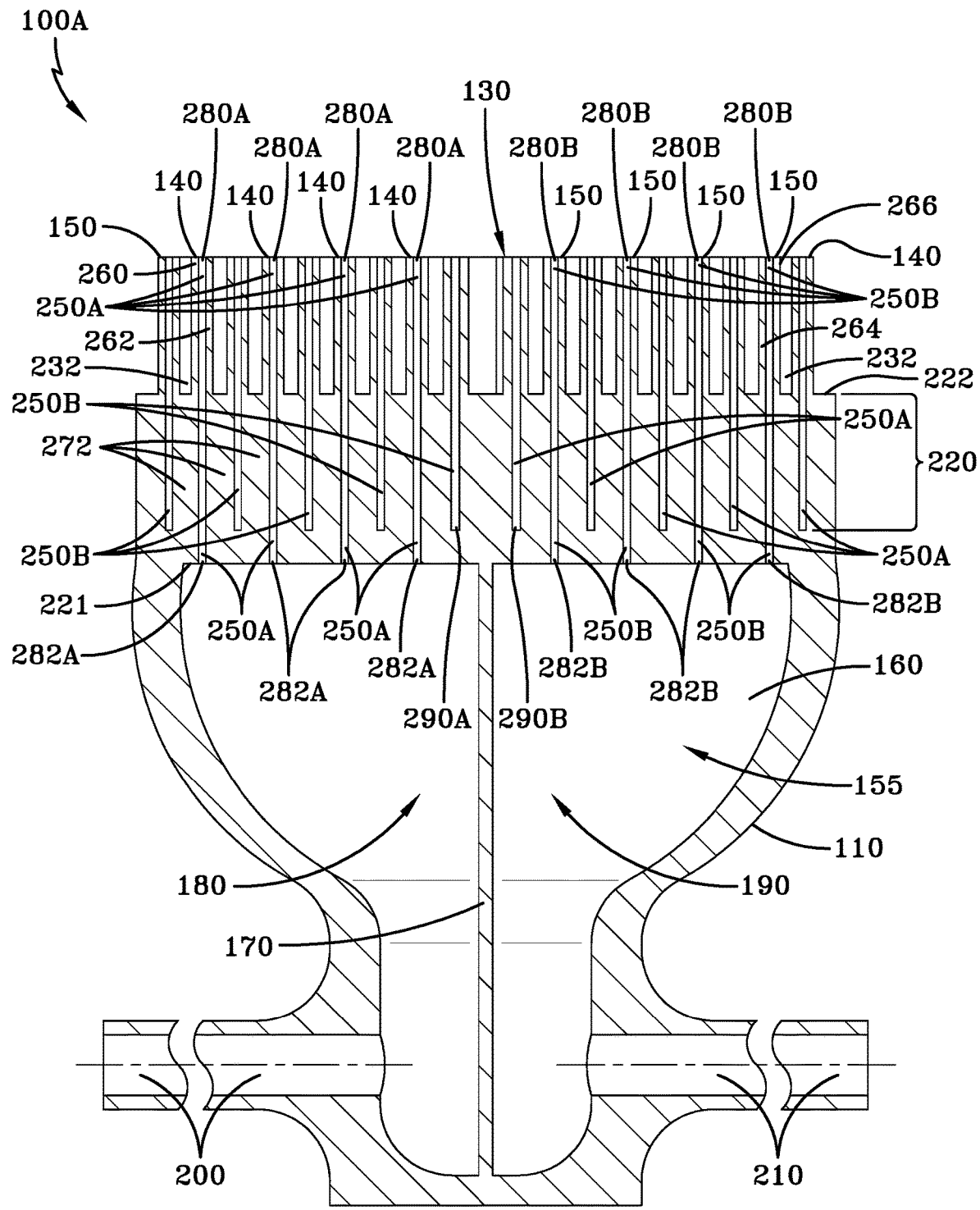
FIG. 7 is cross-sectional elevational view of the manifold embodiment shown in FIG. 5 in accordance with the concepts and disclosures presented herein.
Figure 9:
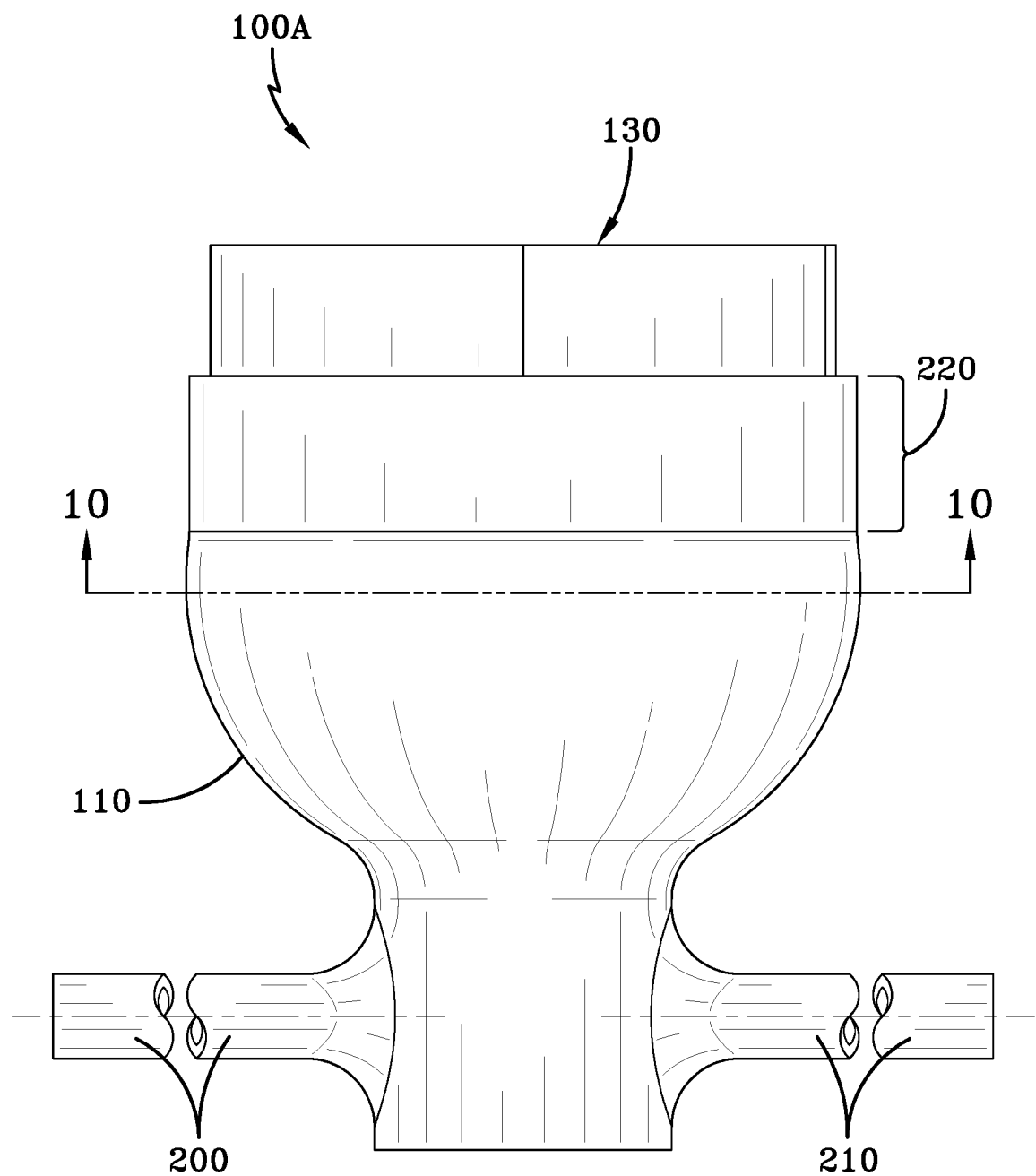
FIG. 9 is an elevational view of the manifold embodiment shown in FIG. 5 in accordance with the concepts and disclosures presented herein.
Figure 10:
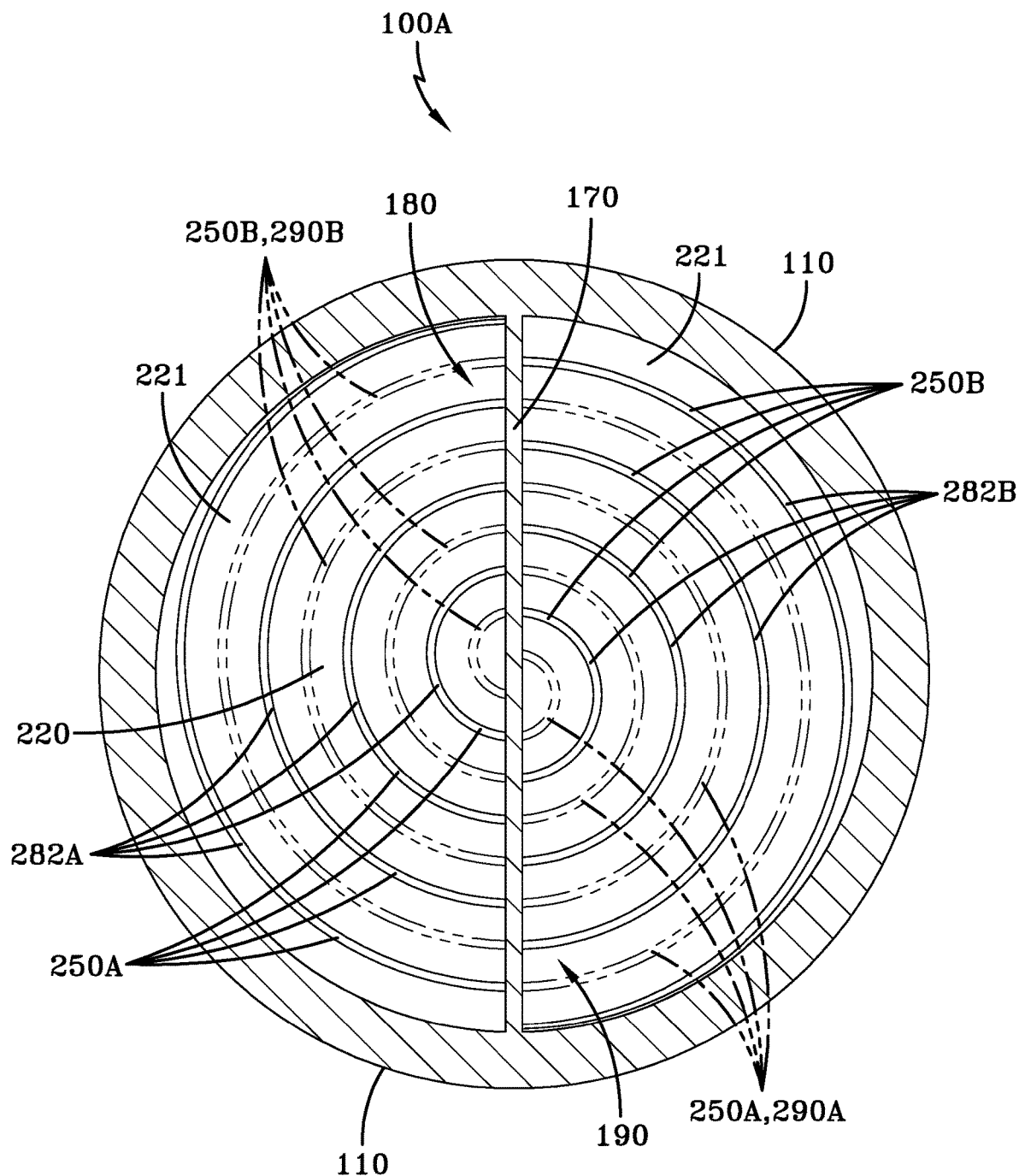
FIG. 10 a bottom plan view of a fuel and oxidant chamber provided by the embodiment of the manifold shown in FIG. 5 in accordance with the concepts and disclosures presented herein.

Continuing, the fuel channel 250A fluidly couples the interface port 280A that is proximate to the external environment of the manifold 100A to a base port 282B that is proximate to, and in operative communication with, the fuel chamber 180. In addition, the oxidant channel 250B fluidly couples the interface port 280B that is proximate to the external environment of the manifold 100A to a base port 282B that is proximate to, and in operative communication with, the oxidant chamber 190. That is, as shown in FIGS. 7 and 10, a portion of the fuel channel 250A extends through the base section 220 to be in operative communication with the fuel chamber 180 via the base port 282A, and a portion of the oxidant channel 250B extends through the base section 220 to be in operative communication with the oxidant chamber 190 via base port 282B. Accordingly, the portions or segments of the fuel channel 250A that are not in operative communication with the fuel chamber 180 are blocked-off by the separator sections 290A, and the portions of the oxidant channel 250B that are not in operative communication with the oxidant chamber 190 are blocked-off by the separator sections 290B, as shown in FIGS. 8 and 10. Thus, the separator sections 290A prevent the fuel channel 250A from being in fluid communication with the oxidant chamber 190, and the separator sections 290B prevent the oxidant channel 250B from being in fluid communication with the fuel chamber 180.

It should be appreciated that in some embodiments, the portion or segment of the fuel channel 250A that is coextensive with, or that overlies, the fuel chamber 180 is configured to be in operative communication with the fuel chamber 180 via the base port 282A, while the remaining portion of the fuel channel 250A is closed-off from fluid communication with the fuel and oxidation chambers 180, 190 by the separator sections 290A. The fuel channel 250A may be closed off by the separator sections 290A at any point within the fuel channel 250A, such as proximate to the interface port 280A or base port 282A or at any point therebetween. In addition, in some embodiments the portion or segment of the oxidant channel 250B that is coextensive with, or that overlies, the fuel chamber 180 is configured to be in operative communication with the oxidant chamber 190 via the base port 282B, while the remaining portion of the oxidant channel 250B is closed-off from fluid communication with the fuel and oxidant chambers 180,190 by the separator sections 290B. The oxidant channel 250B may be closed off by the separator sections 290B at any point within the oxidant channel 250B, such as proximate to the interface port 280B or base port 282B or at any point therebetween. As such, the fuel channel 250A may be configured so that the separator sections 290A alternate with the base ports 282A openings, as shown in FIG. 10. Similarly, the oxidant channel 250B may be configured so that the separator sections 290B alternate with the base ports 282B, also shown in FIG. 10.

Thus, a portion or fraction of the total length of the fuel channel 250A of the fuel interface section 140 is configured to be in operative communication with the fuel chamber 180 via the base port 282A to allow for the passage of fuel within the fuel chamber 180 into the fuel channel 250A and into the attached spiral electrochemical device, such as the spiral SOFC 10 for example, in a manner to be discussed. In addition, a portion or fraction of the total length of the oxidant channel 250B is configured to be in operative communication with the oxidant chamber 190 via base port 282B to allow for the passage of the oxidant within the oxidant chamber 190 into the oxidant channel 250B and into the attached spiral electrochemical device, such as the spiral SOFC 10 for example, in a manner to be discussed. In other words, the two separate chambers 180 and 190, defined by the partition 170, operate so that only the fuel chamber 180 operatively communicates with the fuel channel 250A and so that only the oxidant chamber 190 operatively communicates with the oxidant channel 250B. Thus, while the base ports 282A,282B may be coextensive with the portion of the respective channels 250A,250B that overlie, or that are coextensive with, the respective fuel and oxidant chambers 180,190, as shown in FIG. 10, in other embodiments, the base ports 282A,282B may be dimensioned to be of any desired length or size. For example, FIG. 7 shows that approximately half of the total length of the fuel channel 250A and oxidant channel 250B are in operative communication with their respective fuel and the oxidant chambers 180,190, in other embodiments any portion or fraction of the total length of the fuel and/or oxidant channels 250A, 250B may be operatively coupled to their appropriate chambers 180,190. In other words, any portion of the fuel channel 250A may be closed off from the fuel chamber 180 as long as some portion of the fuel channel 250A is in operative communication with the fuel chamber 180 via the base port 282A to allow material to flow between the fuel channel 250A and the fuel chamber 180. Similarly, any portion of the oxidant channel 250B may be closed off from the oxidant chamber 190 as long as some portion of the oxidant channel 250B is in operative communication with the oxidant chamber 190 via the base port 282B to allow material to flow between the oxidant channel 250B and the oxidant chamber 190.

While the embodiments above provide various manners for configuring the fuel channel 250A and the oxidant channel 250B, it should be appreciated that such exemplary embodiments are not limiting, as the fuel channel 250A and the oxidant channel 250B may be configured in the interface 130 in any manner, as long as the fuel channel 250A is prevented from operatively communicating with the oxidant chamber 190, and the oxidant channel 250B is prevented from operatively communicating with the fuel chamber 180.

Figure 11A:
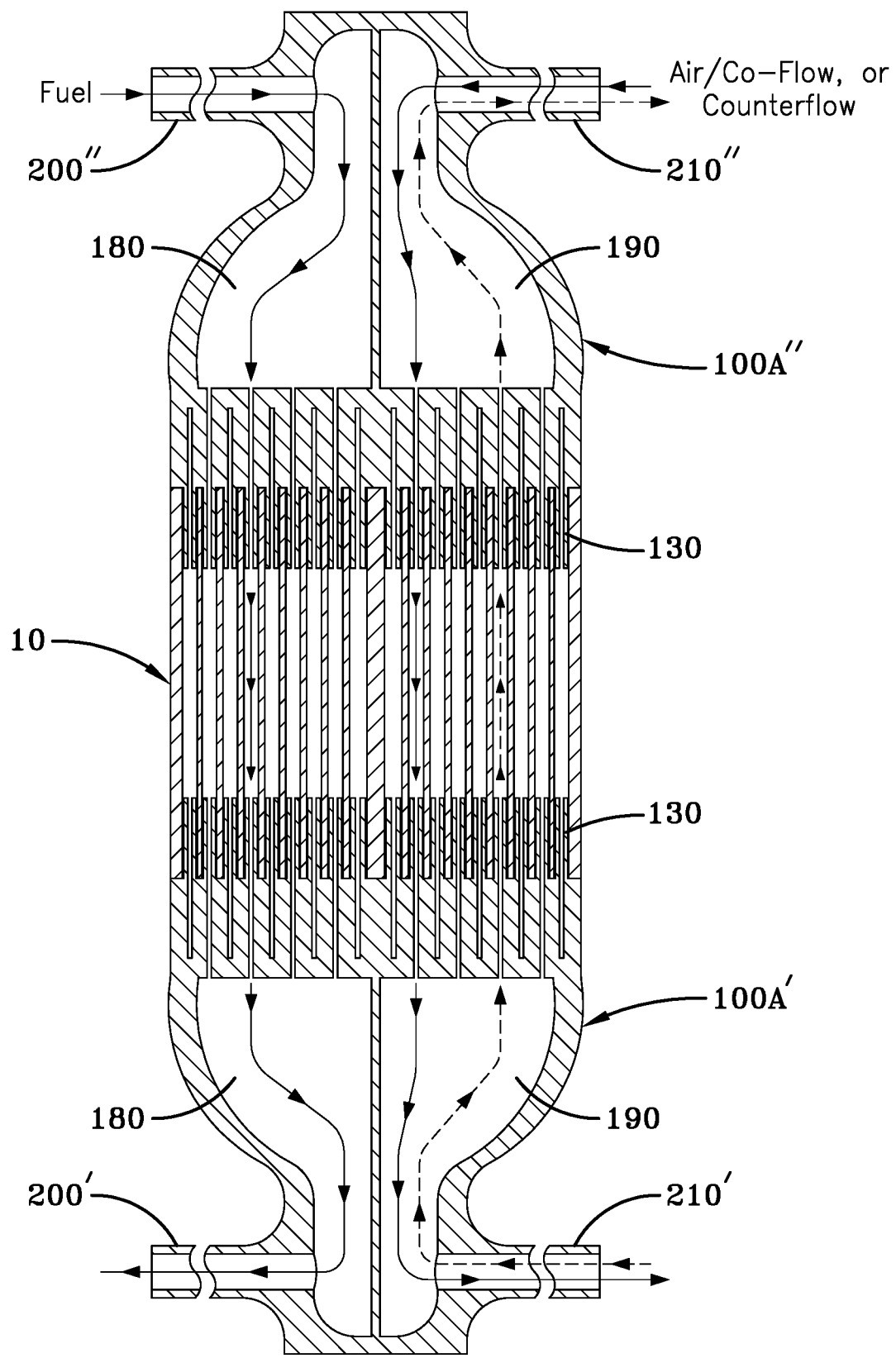
FIG. 11A is cross-sectional view of the SOFC placed in operative arrangement with a pair of manifolds shown in FIG. 5 in accordance with the concepts and disclosures presented herein.
Figure 12:
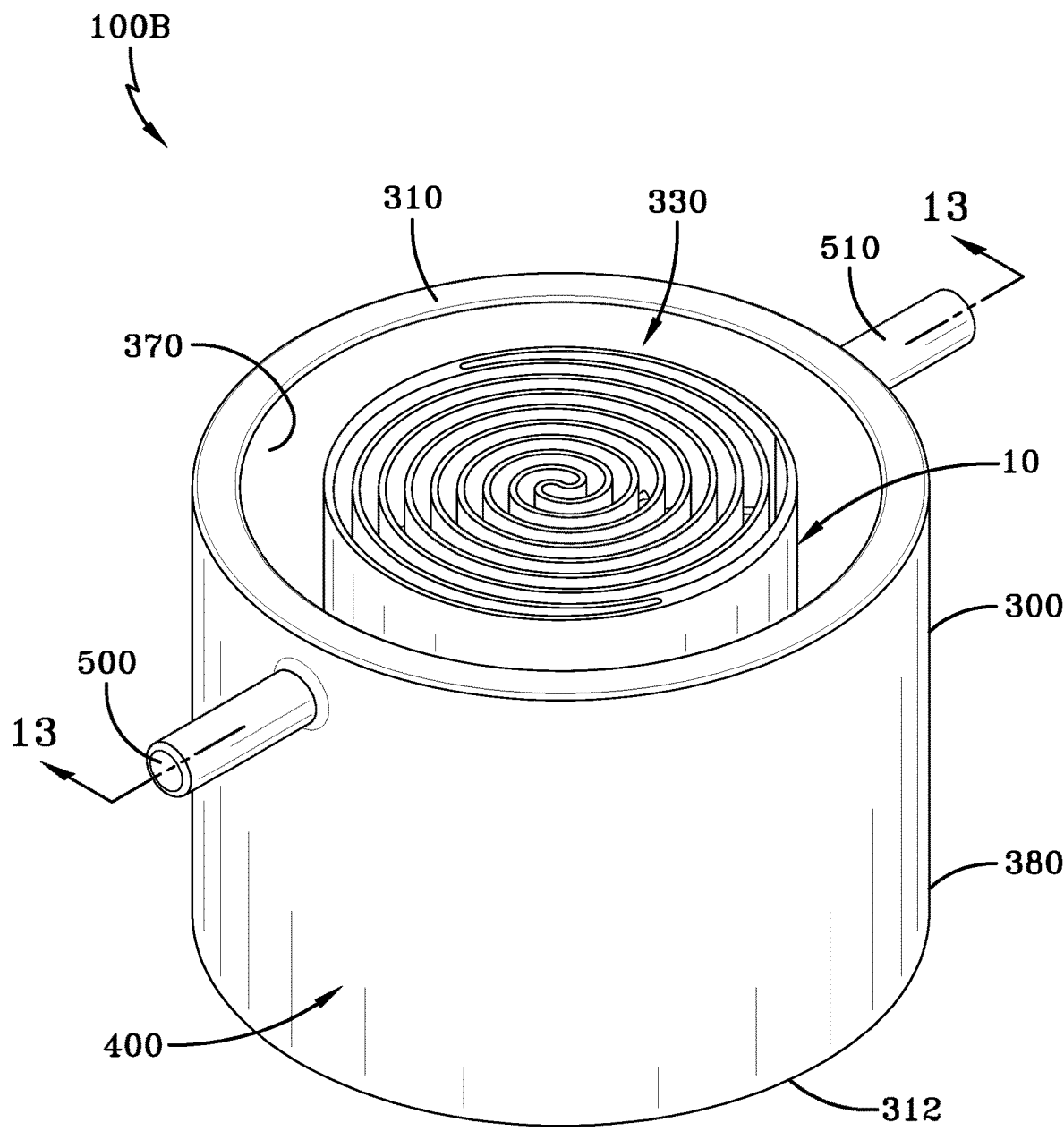
FIG. 12 is a perspective view of another embodiment of a manifold for use with a tubular SOFC having a spiral cross-section in accordance with the concepts and disclosures presented herein.
Figure 13:
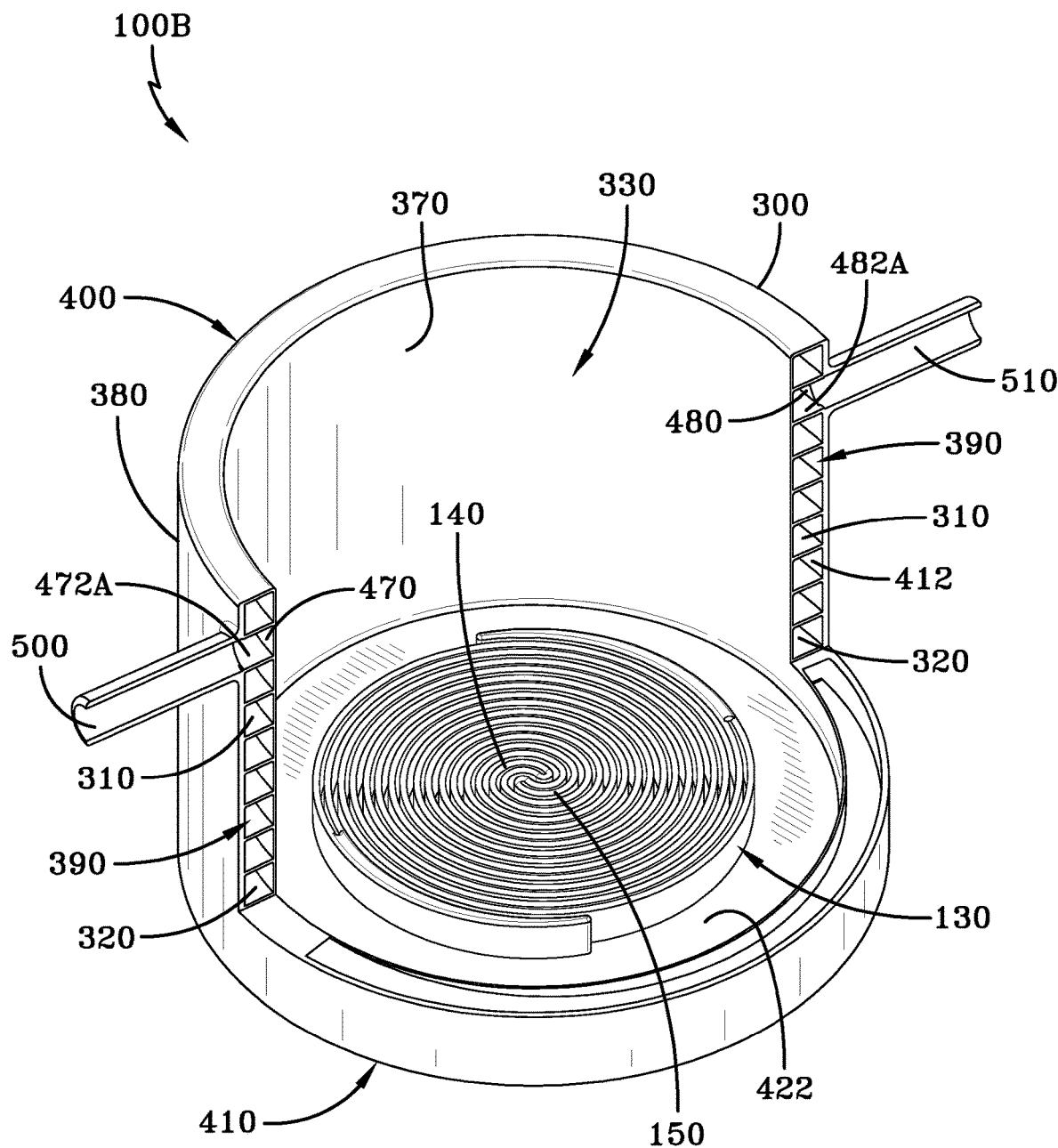
FIG. 13 is a cross-sectional view of the manifold embodiment shown in FIG. 12 in accordance with the concepts and disclosures presented herein.
Figure 14:
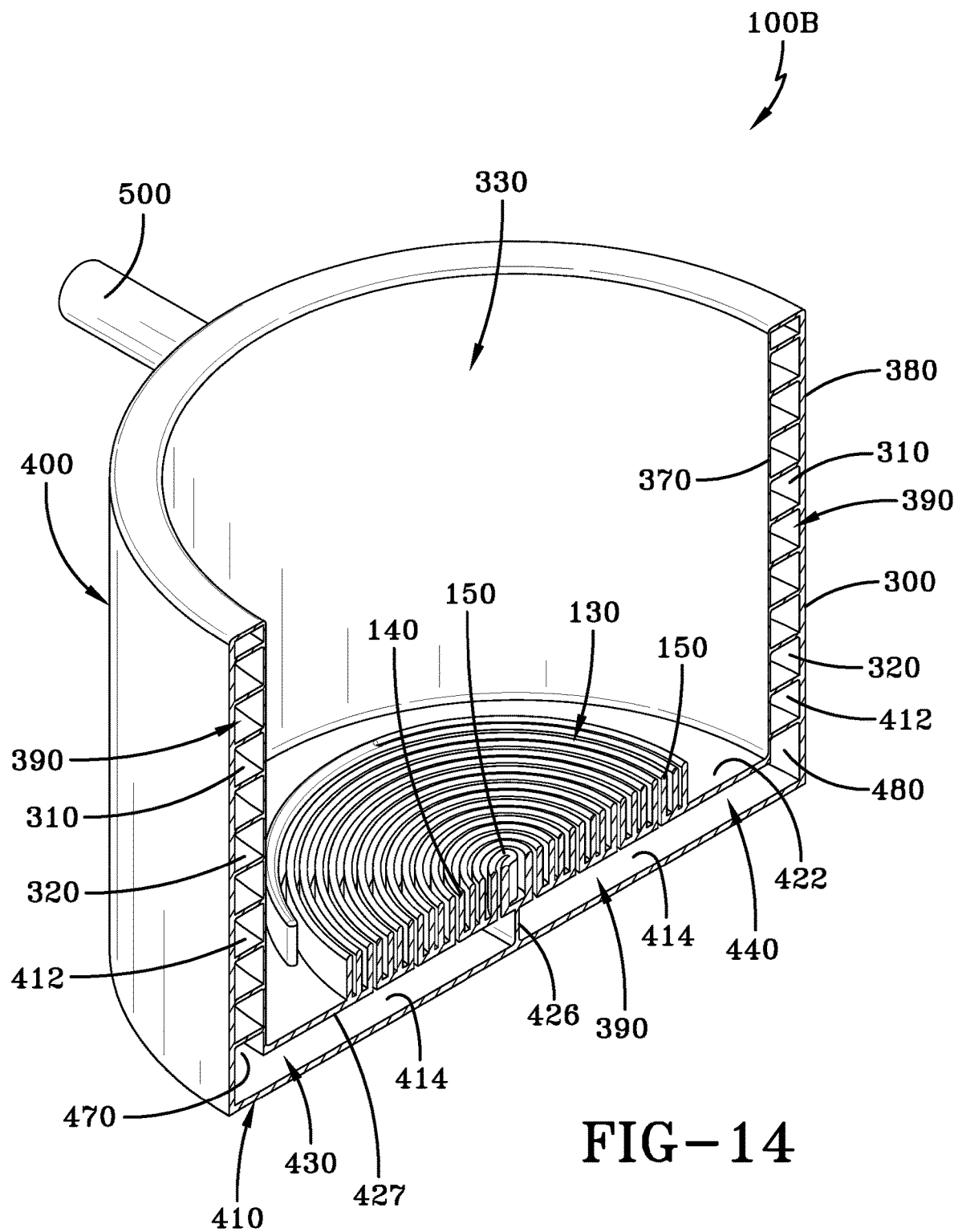
FIG. 14 is a cross-sectional perspective view of the manifold embodiment shown in FIG. 12 in accordance with the concepts and disclosures presented herein.
Figure 15:
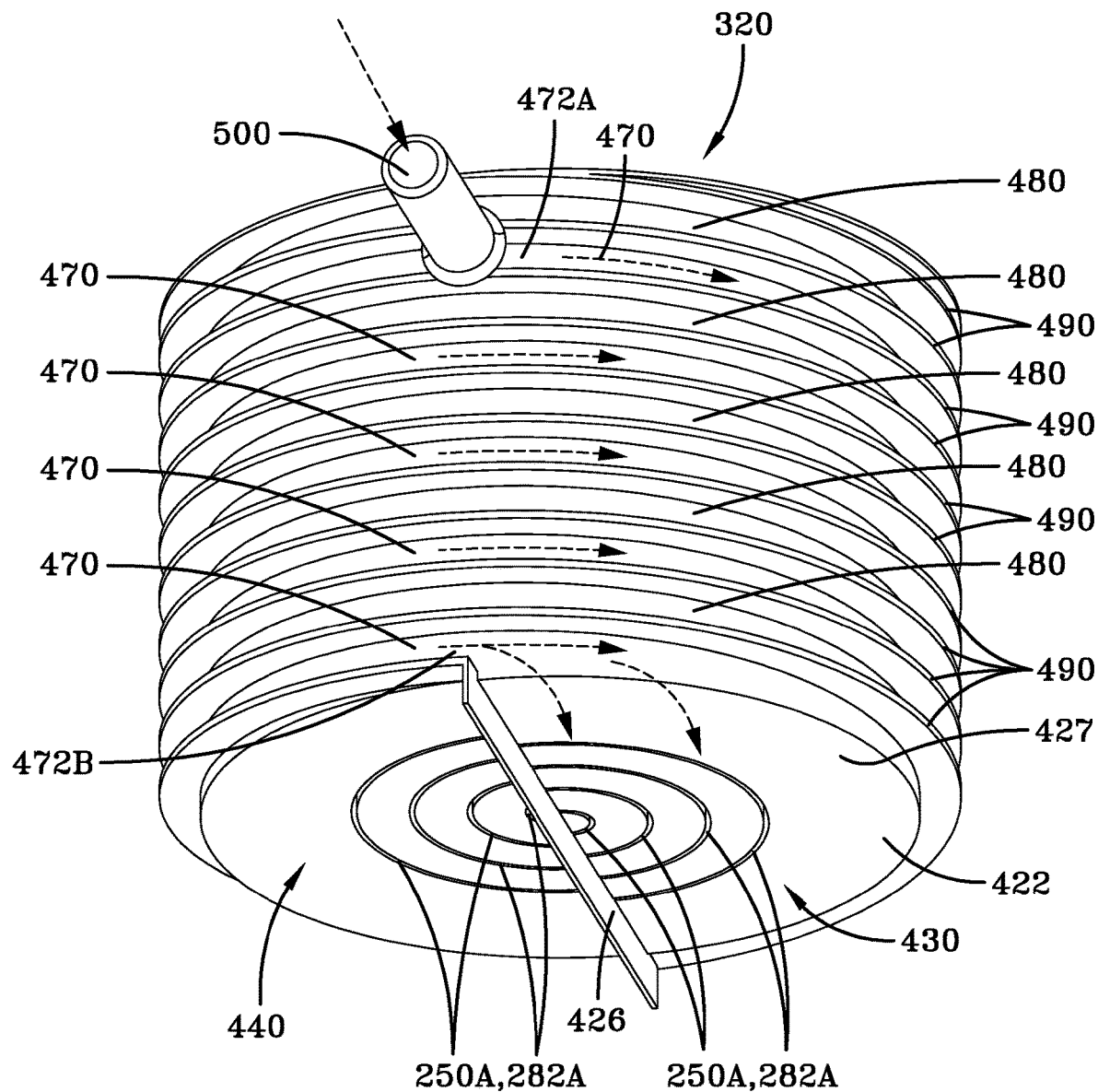
FIG. 15 is a perspective view of a heat exchanger provided by the manifold embodiment of FIG. 12 in accordance with the concepts and disclosures presented herein.

During operation of the manifold 100A, a pair of manifolds 100A' and 100A" are provided, whereby the interface 130 of each manifold 100A'/100A" is placed in operative communication with one end the SOFC 10, as shown in FIG. 11A. For example, in some embodiments the fuel channel 250A of the interface 130 of the manifolds 100A'/100A" is placed in fluid communication with the fuel channel 18 of the SOFC 10 by placing the fuel section 140 into the fuel channel 18 of the SOFC 10. In addition, the oxidant channel 250B of the interface 130 of the manifolds 100A'/100A" is placed in fluid communication with the oxidant channel 20 of the SOFC 10 by placing the oxidant section 150 into the oxidant channel 20 of the SOFC 10. In addition, a portion of the multilayer member 19 of the SOFC 10 is placed within the spacing gap 232 of the interface 130. It should be appreciated that the receipt of the fuel and oxidant sections 140,150 of the manifold 100A into the fuel and oxidant channels 18,20 of the SOFC 10 may occur such as by sliding, and in some cases, creates a seal, such as by friction-fit, therebetween. It should be appreciated that the seal between the SOFC 10 and spiral manifolds 100A'/100" may be achieved by brazing or other joining techniques.

Continuing, fuel gas, such as hydrogen, is delivered to the fuel port 200", which is routed into the fuel chamber 180 of the manifold 100A". The fuel in the fuel chamber 180 then enters the fuel channel 250A of the manifold 100A via the base port 282A, whereupon the fuel gas exits the fuel channel 250A at the interface port 280A for receipt by the fuel channel 18 of the SOFC 10, whereupon the reactants/by-products produced by the SOFC 10 are routed into the fuel chamber 180 of the manifold 100A', and exhausted out of the port 200'. In addition, an oxidant gas, such as air or oxygen, is delivered into the oxidant port 210", which is routed into the oxidant chamber 190 and enters the oxidant channel 250B of the manifold 100A" via the base port 282B. The oxidant gas then exits the oxidant channel 250B at the interface port 280B for receipt by the oxidant channel 20 of the SOFC 10, whereupon the reactants/by-products produced by the SOFC 10 are routed into the oxidant chamber 190 of the manifold 100A', and exhausted out of the port 210'.

It should be appreciated that in some embodiments, the fuel port 200 and the oxidant port 210 may each serve as inlets, as outlets, or any combination thereof.

Another embodiment of a manifold 100B is shown in FIGS. 12-19A of the drawings. The manifold 100B includes a body 300 that is formed by a hollow wall 310 that includes therein a heat exchanger 320. The wall 310 is configured to define an inner manifold cavity 330 in which the interface 130, as previously discussed above, is disposed. Accordingly, the fuel and oxidant interface sections 140,150 provided by the interface 130 enable the manifold 100B to be placed in operative communication with an SOFC, such as fuel cell SOFC 10.

Specifically, the hollow wall 310 of the body 300 includes an inner section 370 and an outer section 380 that are spaced apart to form a body cavity 390 therebetween. In some embodiments, the wall 310 may form a cylindrical wall section 400 that is attached at one end to a base section 410. Accordingly, the portion of the body cavity 390 included by the wall section 400 and the portion of the body cavity 390 included by the base section 410 are respectively referred to as a wall cavity 412 and a base cavity 414. It should be appreciated that the wall section 400 and the base section 410 may take on any suitable dimension or shape, such as a rectilinear shape, curvilinear shape, or any combination thereof. The wall section 400 and the base section 410 define the inner body cavity 330, which is bounded by the inner section 370 of the wall 310. The inner cavity 330 is dimensioned to accommodate the receipt of the SOFC device, such as SOFC 10, that is configured to be operatively coupled to the interface 130. In some embodiments, the inner cavity 330 may be occupied by any suitable thermal insulating material to maintain the SOFC 10 at a desired temperature.

The manifold 100B utilizes the interface 130, as previously discussed above with regard to manifold 100A, and as such, the discussion presented with regard to interface 130 and manifold 100A is equally applicable to that of manifold 100B. The interface 130 is positioned on an outer surface 421 of a base section 422 of the body 300, which is a surface provided by the portion of the inner section 370 that forms the base section 410. Additionally, the base cavity 414 of the base section 410 includes a partition 426 that divides the base cavity 414 into a separate fuel chamber 430 and a separate oxidant chamber 440 that respectively allows for the movement of fuel gas/fuel reaction by-products and oxidant gas/oxidant reaction by-products through the fuel and oxidant channels 250A, 250B of the respective fuel and oxidant interface sections 140,150. In one embodiment, the partition 426 extends between an inner surface 427 of the base section 422 and an inner surface 428 of the outer section 380 of the body 300. As such, the fuel and oxidant interface sections 140,150 extend from the outer surface 421 of the base section 422, while the fuel and oxidant channels 250A and 250B extend through the interface sections 140, 150 and through the base section 422 to fluidly communicate with the fuel and oxidant chambers 430,440 in a manner to be discussed.

Figure 16:
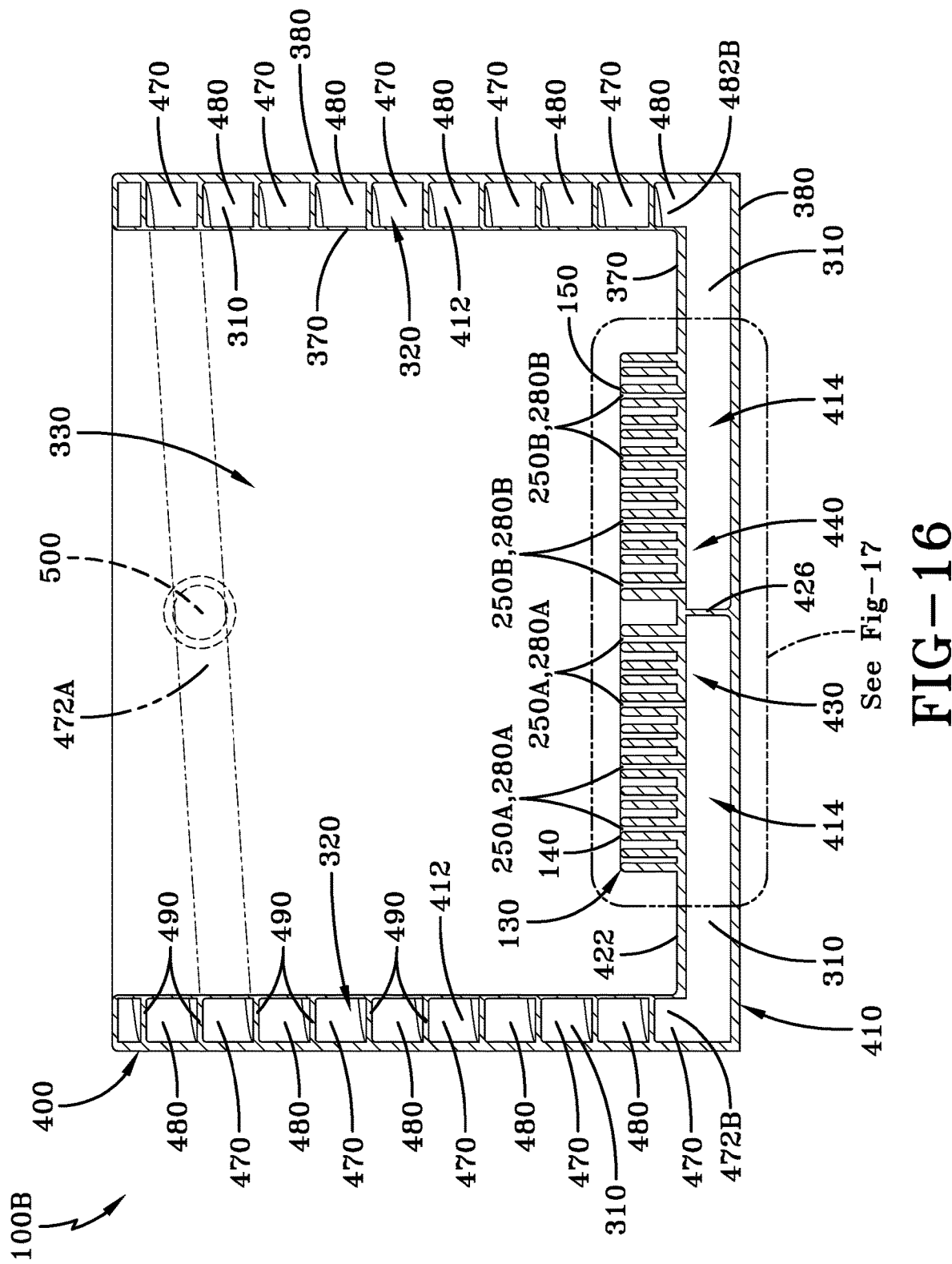
FIG. 16 is a cross-sectional view of the manifold embodiment of FIG. 12 in accordance with the concepts and disclosures presented herein.
Figure 17:
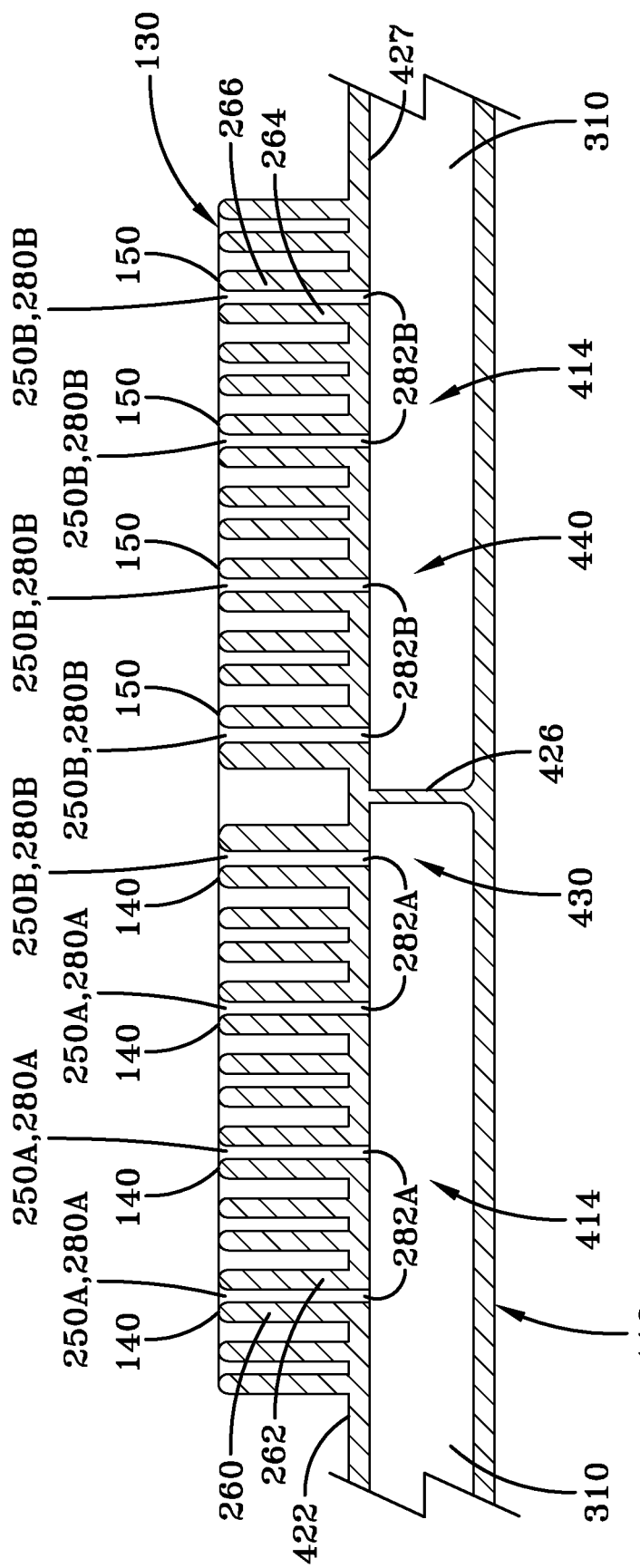
FIG. 17 is a cross-sectional view of the manifold embodiment shown in FIG. 12 showing fuel and oxidant chambers in accordance with the concepts and disclosures presented herein.
Figure 18:
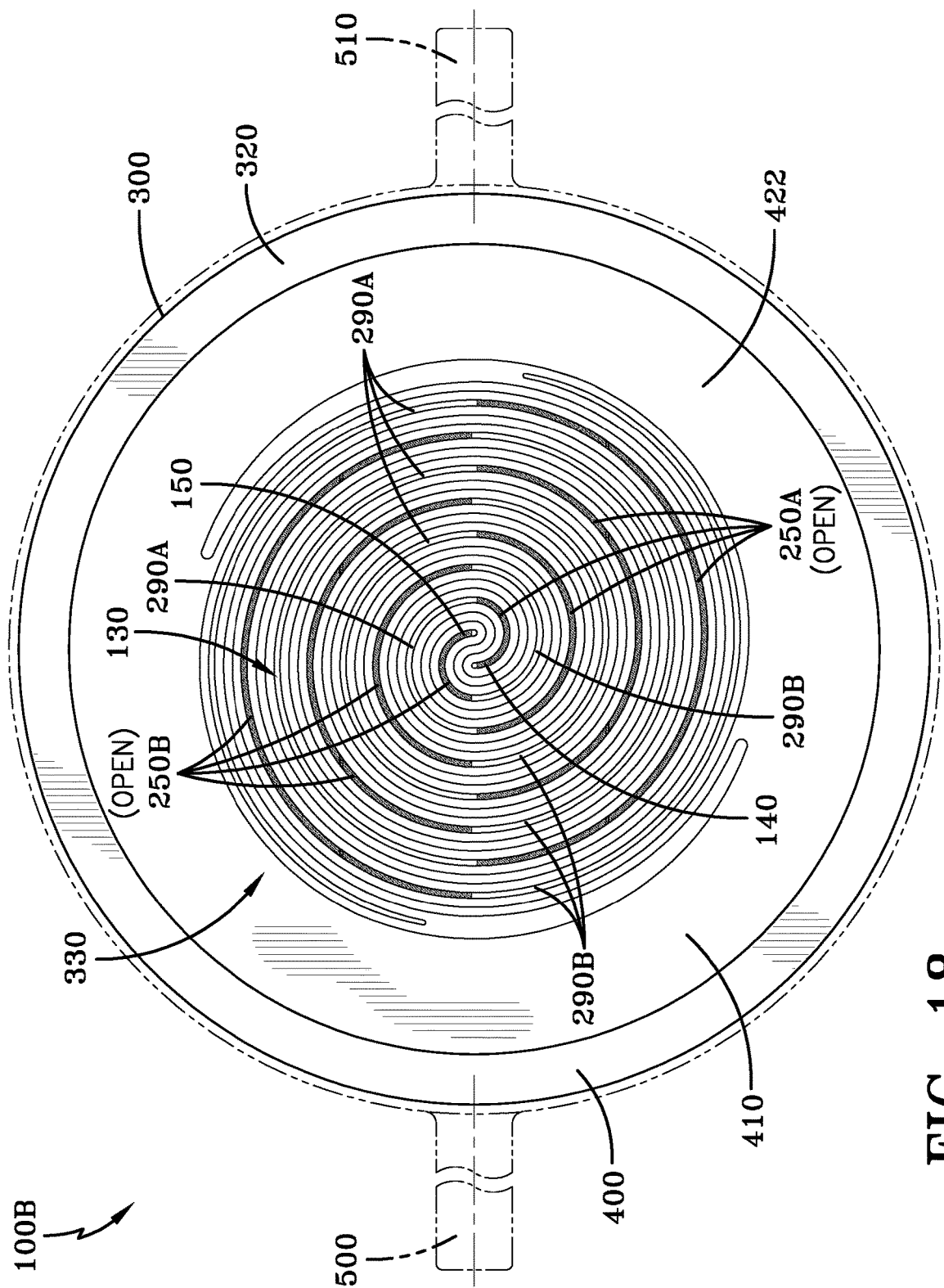
FIG. 18 is a top plan view of the manifold embodiment shown in FIG. 12 in accordance with the concepts and disclosures presented herein.

Continuing, the fuel channel 250A and the oxidant channel 250B fluidly couple respective interface ports 280A and 280B that are proximate to the external environment of the manifold 100B to respective base ports 282A and 282B that open into the fuel chamber 430 and the oxidant chamber 440 respectively. Thus, as shown in FIG. 16, a portion of the fuel channel 250A extends through the base section 422 to be in operative communication with the fuel chamber 430 via the base port 282A, and a portion of the oxidant channel 250B extends through the base section 422 to be in operative communication with the oxidant chamber 440 via base port 282B. In some embodiments, the portion or segment of the fuel channel 250A that is coextensive with, or that overlies, the fuel chamber 430 is placed in operative communication with the fuel chamber 440 via the base port 282A. Similarly, a portion of the oxidant channel 250B that is coextensive with, or that overlies, the oxidant chamber 440 is in operative communication with the oxidant chamber 440 via the base port 282B. Additionally, the portion of the fuel channels 250A that are coextensive with the oxidant chamber 440 are configured to be closed off so as to not operatively communicate with the oxidant chamber 440 by the separator sections 290A. In addition, in some embodiments the portion or segment of the oxidant channel 250B that is coextensive with, or that overlies, the chamber 430 is configured to be closed off so as to not operatively communicate with the fuel chamber 440 by the separator sections 290B. Thus, a portion or fraction of the total length of the fuel channel 250A of the fuel interface section 140 is configured to be in operative communication with the fuel chamber 430 to allow for the passage of fuel/fuel reaction by-products delivered by the fuel channel 250A from the attached SOFC 10 to the fuel chamber 430. In addition, a portion or fraction of the total length of the oxidant channel 250B is configured to be in operative communication with the oxidant chamber 440 to allow for the passage of the oxidant within the oxidant chamber 440 into the oxidant channel 250B for delivery to the SOFC 10. In other words, the two separate chambers 430 and 440 defined by the partition 436 operate so that only the fuel chamber 430 operatively communicates with the fuel channel 250A via the base port 282A, and so that only the oxidant chamber 440 operatively communicates with the oxidant channel 250B via the base port 282B, as shown clearly in FIGS. 18-19.

Disposed within the wall cavity 412 of the body 300 is the heat exchanger 320. The heat exchanger 320 includes a fuel passage or conduit 470 that has open ends or ports 472A and 472B and an oxidant passage or conduit 480 having open ends or ports 482A and 482B. In some embodiments, the passages 470 and 480 may be formed by spaced walls 490 that radially extend relative to the longitudinal axis of the body 300 between the inner and outer wall sections 370,380. In further embodiments, the fuel passage 470 and the oxidant passage 480 are arranged in an interleaved or alternating manner. In yet further embodiments, the fuel passage 470 and the oxidant passage 480 may be arranged in a spiral configuration within the body cavity 390 relative to the longitudinal axis of the body 300. It should be appreciated that the heat exchanger 320 may be configured with any desired number of revolutions around the longitudinal axis of the body 300 and may have any desired size or cross-sectional shape, including a curvilinear shape, rectilinear shape, or any combination thereof.

Continuing, the heat exchanger 320 is configured so that the end 472A of the fuel passage 470 is operatively coupled to a fuel port 500, while the other end 472B of the fuel passage 470 is operatively coupled to the fuel chamber 430. In addition, the end 482A of the oxidant passage 480 of the heat exchanger 320 is operatively coupled to an oxidant port 510, while the other end 482B of the oxidant passage 480 is operatively coupled to the oxidant chamber 440. The fuel port 500 and the oxidant port 510 are disposed through the wall 310 of the body 300 in order to allow for the communication of suitable gas materials from any suitable external source.

Thus, the fuel port 500, the fuel passage 470 of the heat exchanger 320, the fuel chamber 430, and the fuel channel 250A of the fuel interface section 140 are in operative communication with each other to allow for the flow of a fuel gas/fuel reaction by-products therethrough. In addition, the oxidant port 510, the oxidant passage 480 of the heat exchanger 320, the oxidant chamber 440, and the oxidant channel 250B of the oxidant interface section 150 are in operative communication with each other to allow for the flow of oxidant gas/oxidant reaction by-products material therethrough.

Figure 19:
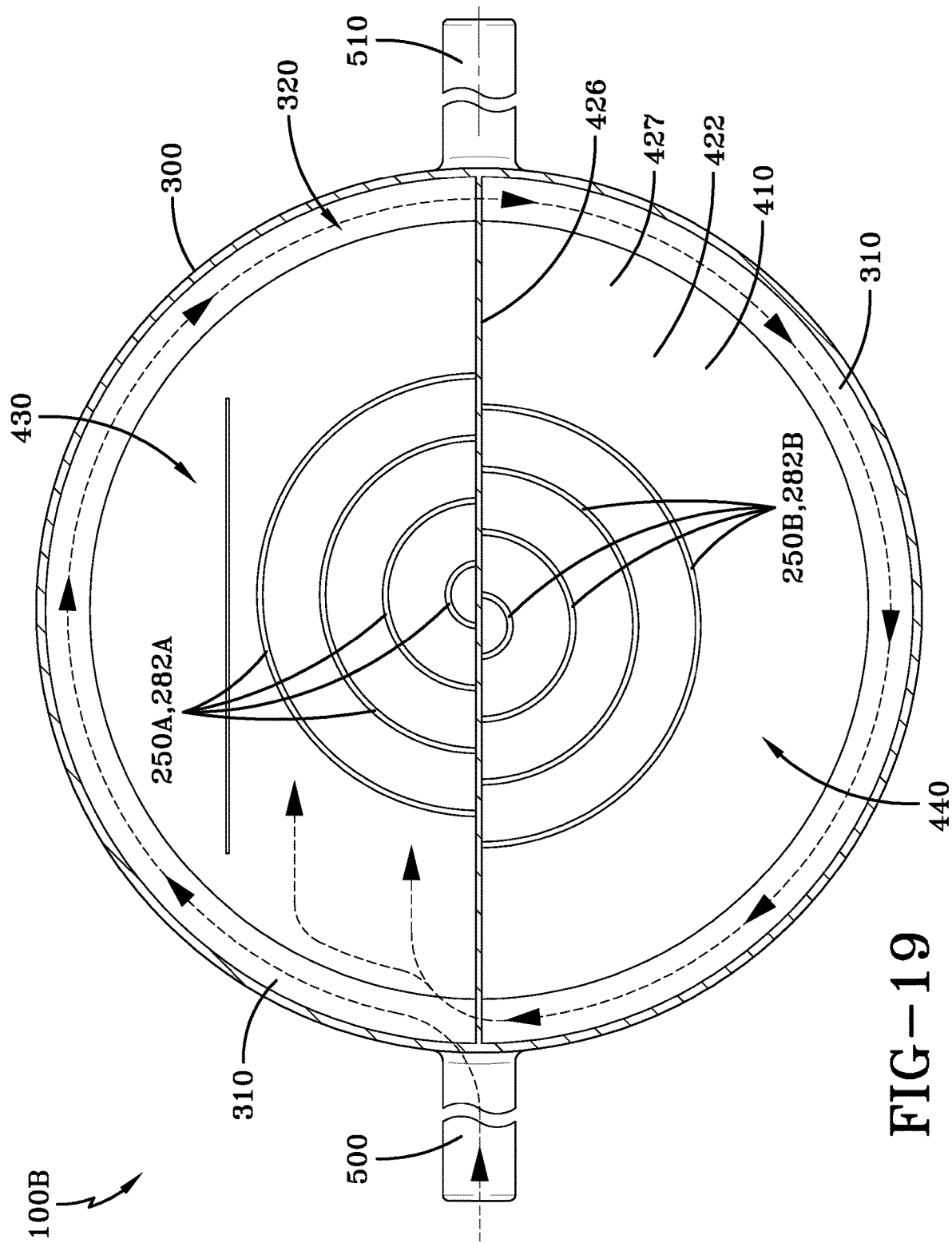
FIG. 19 is a bottom plan view of the manifold embodiment of FIG. 12 showing the fuel and oxidant chambers in accordance with the concepts and disclosures presented herein.
Figure 19A:
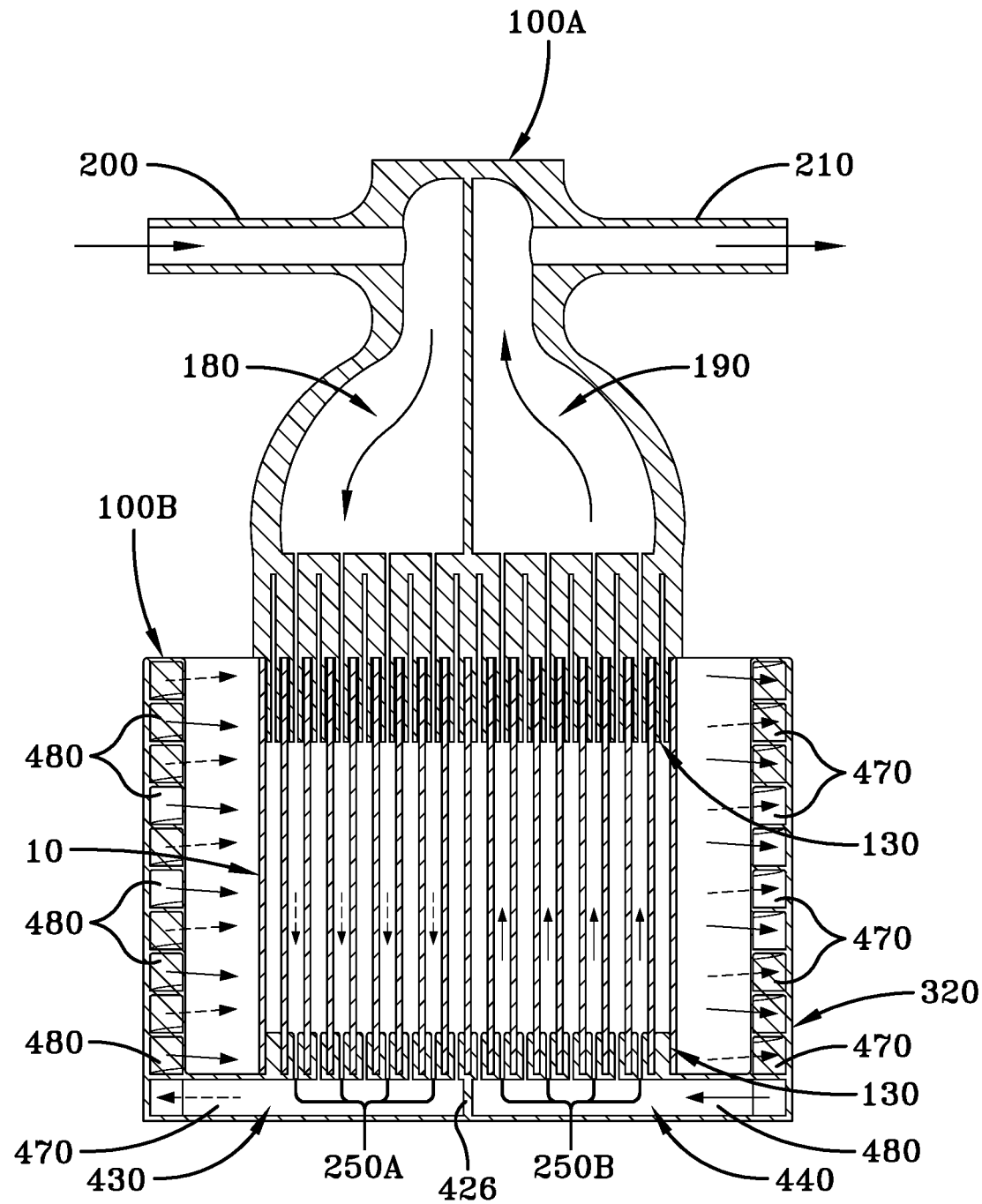
FIG. 19A is a cross-sectional view of the SOFC placed in operative arrangement with manifolds shown in FIG. 5 and FIG. 12 in accordance with the concepts and disclosures presented herein.
Figure 23:
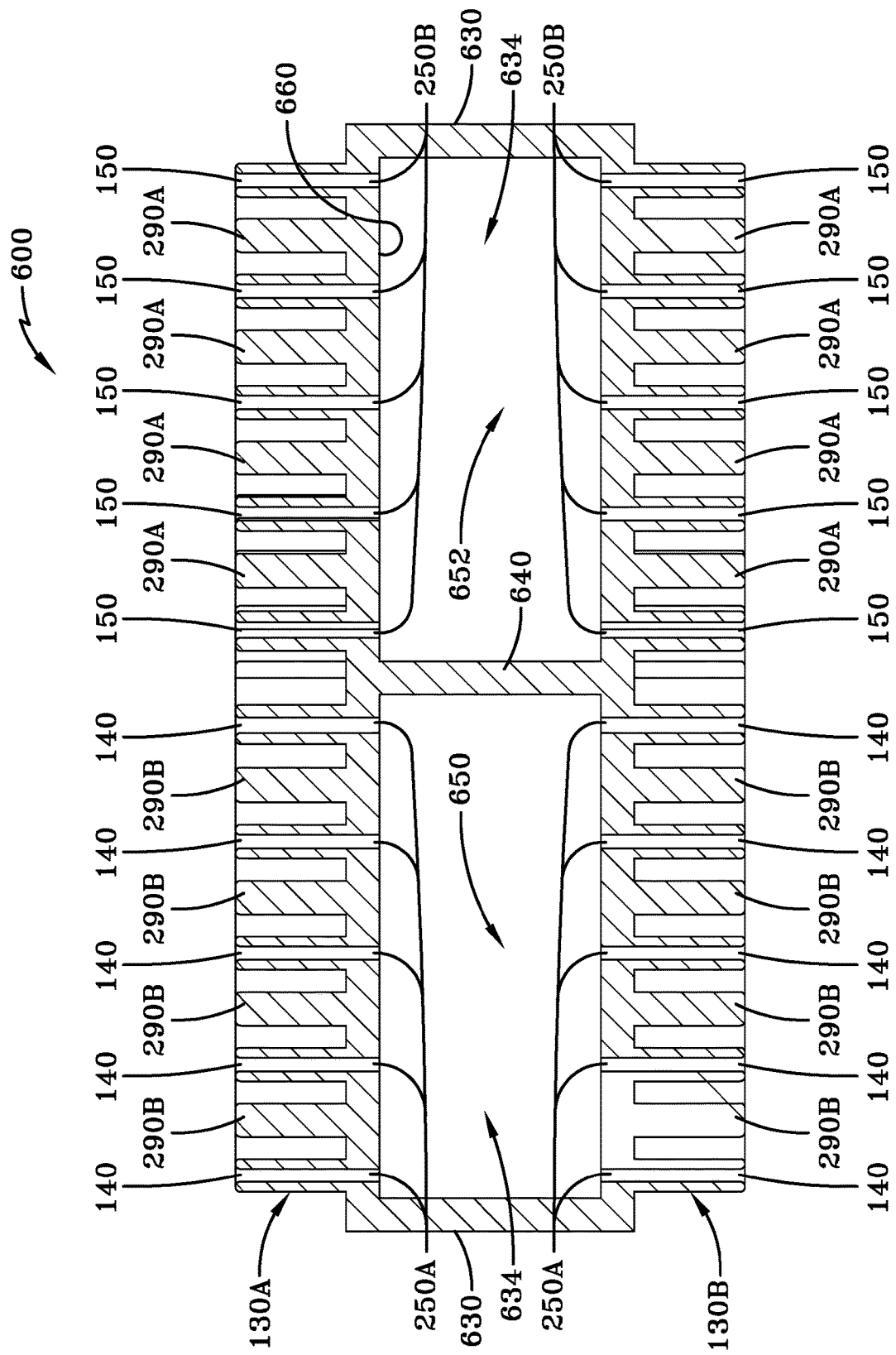
FIG. 23 is a cross-sectional view of the manifold embodiment shown in FIG. 20 in accordance with the concepts and disclosures presented herein.
Figure 24:
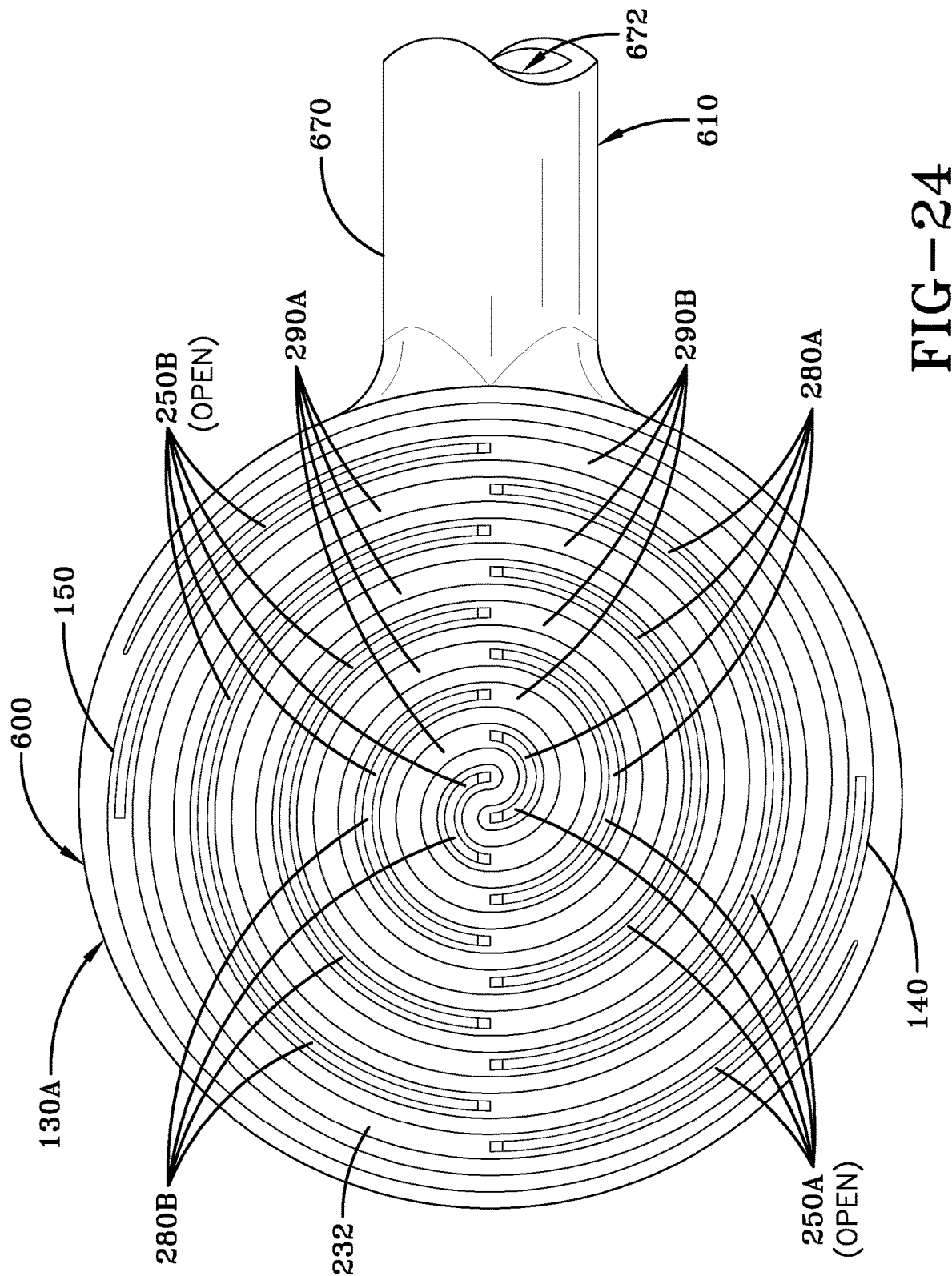
FIG. 24 is a top plan view of the manifold embodiment shown in FIG. 20 in accordance with the concepts and disclosures presented herein.
Figure 25:
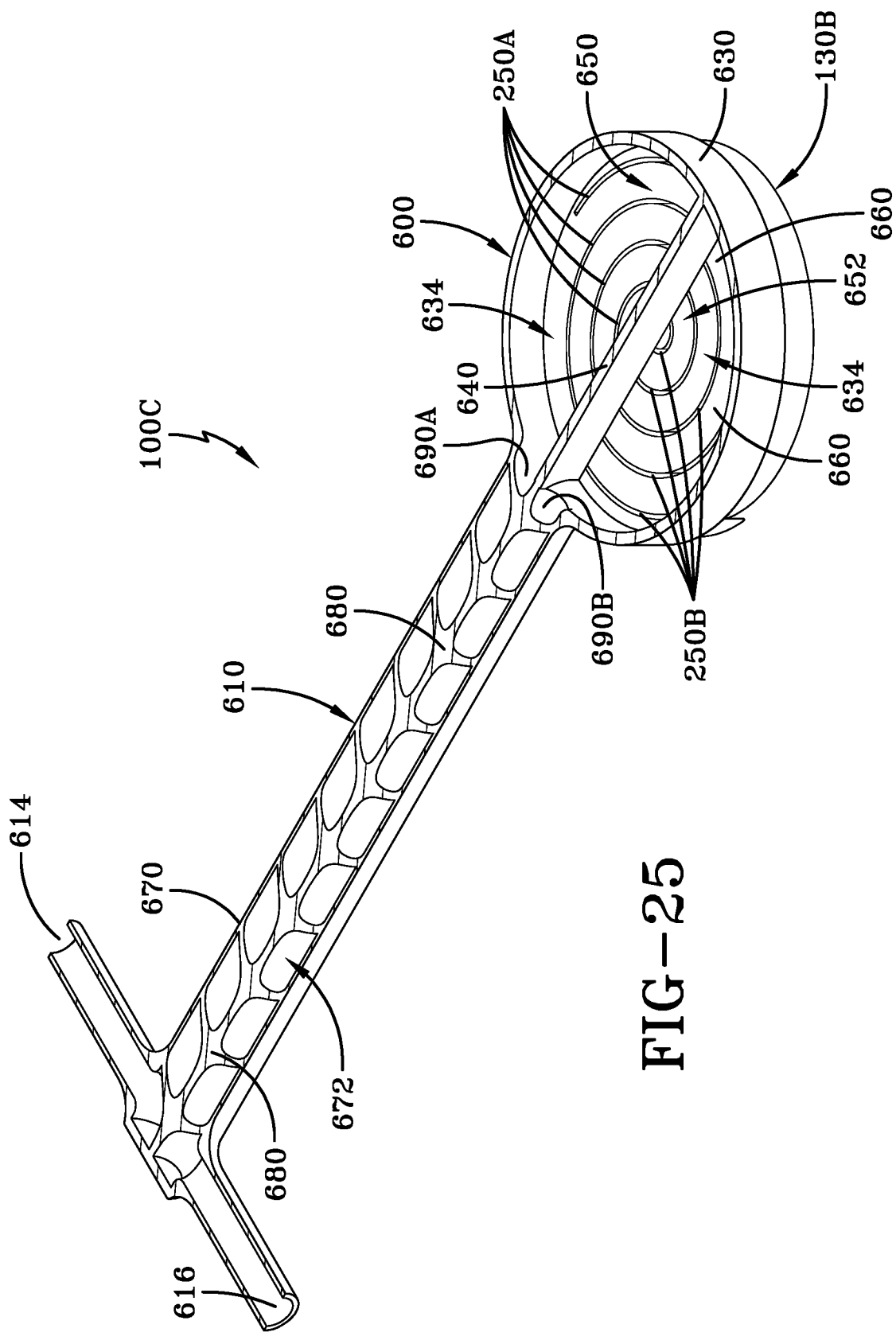
FIG. 25 is a perspective cross-sectional view of the manifold embodiment shown in FIG. 20 in accordance with the concepts and disclosures presented herein.
Figure 26:
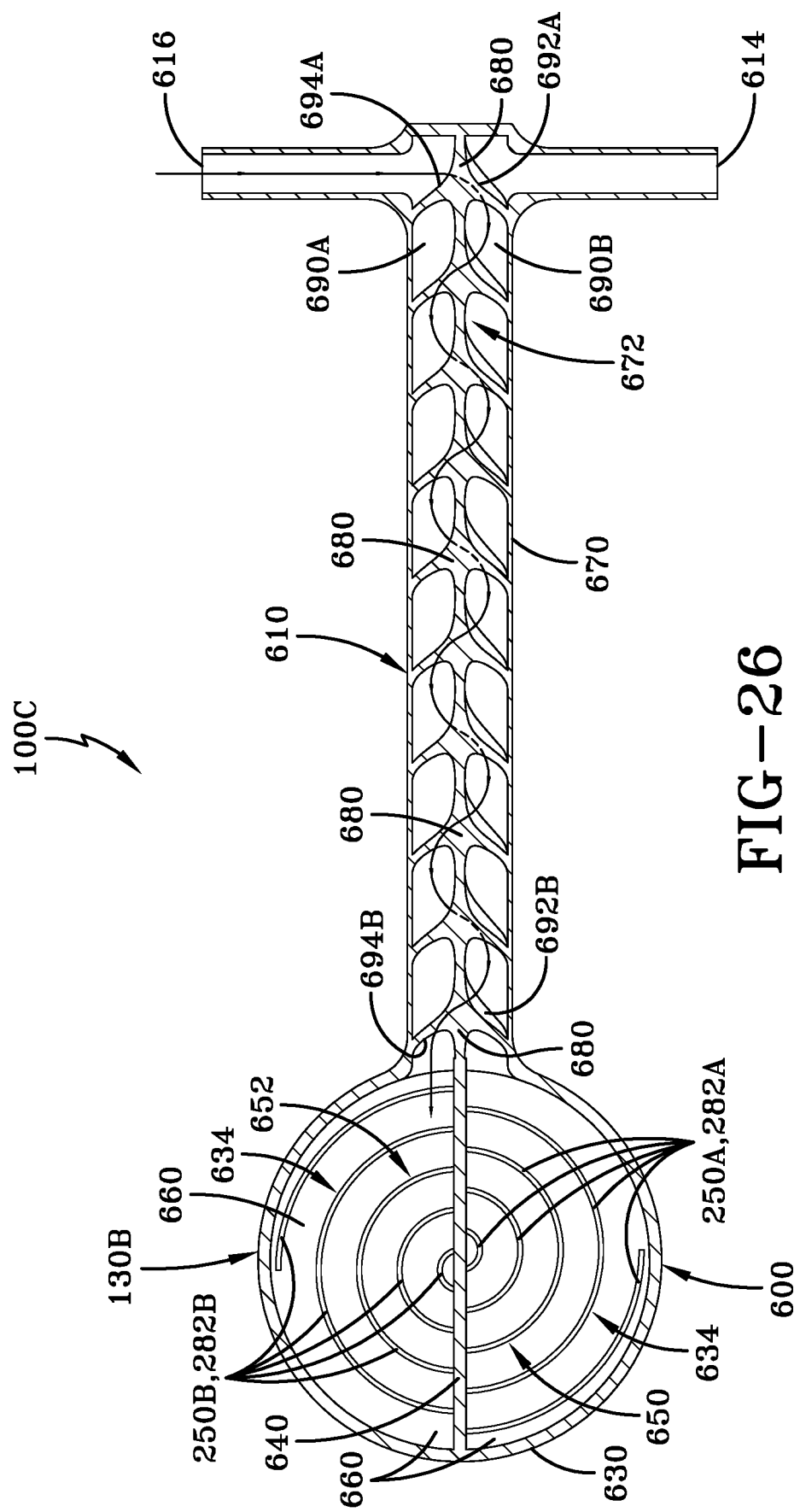
FIG. 26 is another perspective cross-sectional view of the manifold embodiment shown in FIG. 20 in accordance with the concepts and disclosures presented herein.

To place the SOFC 10 into operation, the interface 130 of the manifold 100B is placed in operative communication with one end of the SOFC 10, while the interface 130 of the manifold 100A is placed in operative communication with the other end of the SOFC 10, as shown in FIG. 19A. Next, oxidant gas, such as air or oxygen, is supplied to the oxidant port 510 of the manifold 100B, whereupon it enters the oxidant passage 480 of the heat exchanger 320. It should be appreciated, that in some embodiments, the oxidant gas may be pressurized to a desired level. The oxidant gas then moves through the oxidant passage 480, whereupon the oxidant gas is delivered to the oxidant chamber 440. It should be appreciated, that the oxidant may be pre-heated within the heat exchanger 320 in a manner to be discussed. Assuming, for example, that the SOFC 10 has been in operation, the heat exchanger 320 will be heated from the heat imparted by the exhausted fuel reaction by-products that are permitted to flow from the SOFC 10 through the interface 130 and into the fuel passage 470 of the heat exchanger 320. Next, the oxidant within the oxidant chamber 440 of the manifold 100B is routed through the oxidant channel 250B of the oxidant interface section 150 for delivery to the SOFC 10. After interacting with the SOFC 10, the reactants/by-products are permitted to exit the SOFC 10 and into the oxidant chamber 190 of the manifold 100A, where they are exhausted out of the port 210.

Simultaneously, in some cases, with the flow of the oxidant gas, fuel gas, such as hydrogen, is supplied to the fuel port 200 of the manifold 100A, whereupon it enters the SOFC 10. It should be appreciated that in some embodiments, the fuel may be pressurized to a desired level. The fuel then interacts with the SOFC 10, whereupon unused fuel and heated reaction by-products enter the fuel chamber 430 of the manifold 100B before entering the fuel passage 470 of the heat exchanger 430, thereby heating the cooled incoming oxidant flowing through the oxidant passage 480. Finally, the unused fuel and heated reaction by-products are exhausted from the manifold 100B via the port 500.

It should be appreciated that while the discussion of the manifolds 100A/100B above utilized the heated fuel reactants/by-product to pre-heat oxidant gas before it enters the SOFC 10, the manifolds 100A/100B may be configured so that the heated oxidant reactants/by-products may be used to pre-heat the fuel gas before it enters the SOFC 10. Such may be achieved by supplying oxidant gas into the port 210 of the manifold 100A, whereupon the oxidant passage 480 is heated by reaction by-products; and supplying fuel gas into the port 500 of the manifold 100B, whereupon it is pre-heated as it passes through the fuel passage 470 of the heat exchanger 320.

Thus, in some embodiments, the manifold 100B may be configured to operate such that an initial source of heat is generated from outside of the fuel cell 10, such as through fuel gas reactions/reformation (i.e. heat source A). This external heat source may be generated by the burning of a portion of the fuel gas to form heated fuel by-products, or by a fuel reforming reaction, such as a catalytic partial oxidation (CPOX) reaction, as well as any other suitable heat generation method. This initial heat from heat source A that is generated by the fuel gas and/or the fuel reformants is carried into or transmitted into the fuel cell 10 by the fuel gas. Continuing, after the fuel gas entering the fuel cell 10, it electrochemically reacts with oxidant to generate electricity and form heated reactants. These high temperature reactants form a heat source (i.e. heat source B), which are then received by the heat exchanger 320, where the heat is recovered therefrom. For example, in some embodiments, the heated fuel cell reactants may include unused fuel gas, water vapor, CO, $CO_2$, etc.

It should be appreciated that in some embodiments, the heated fuel may be combusted, such as through its combination with the oxidant gas, to convert the unused fuel into heat for use in the heat source. Accordingly, the incoming cold oxidant is pre-heated through the heat exchanger 320 before entering the SOFC 10.

In yet another embodiment of manifold 100B, it should be appreciated that a manifold 100C' may be used in lieu of manifold 100A to control the flow of operating and by-product/exhaust gases through the SOFC 10. The structural and operational aspects of the manifold 100C' will be presented in the following sections below. The use of manifold 100C' allows for the recovery of heat from both fuel and oxidant reactants/by-products.

Another embodiment of the manifold is referred to by numeral 100C, as shown in FIGS. 20-27. The manifold 100C includes an interface body 600 that includes a pair of opposed interfaces 130A and 130B. The interface body 600 is fluidly coupled to a heat exchanger 610 that includes an inlet 614 and an outlet 616. The heat exchanger 610 is able to capture the heat of the reaction by-products of multiple SOFCs 10, which are operatively coupled to the interfaces 130A-B, whereupon the heat captured by the heat exchanger 610 is supplied to the incoming fuel or oxidant gases passing therethrough for receipt into the interface body 600. Thus, the heat exchanger 610 serves to capture the heat from the heated fuel gas or oxidant reactants that flow from the manifold 100C and out of the outlet 616, which are used to pre-heat either the fuel gas or oxidant gas that is supplied to the inlet 614 of the heat exchanger 610 for delivery to the SOFC 10.

The interface body 600 includes a wall 630 that separates the opposite facing interfaces 130A-B to define an inner cavity 634. It should be appreciated that in other embodiments, that the interfaces 130A-B may be positioned in any desired orientation relative to the body 600. Disposed within the inner cavity 634 is an interface partition 640 that separates the inner cavity 634 into a separate fuel chamber 650 and a separate oxidant chamber 652. In one embodiment, the partition 640 is positioned to extend between an inner surface 660 of the interfaces 130A-B. As such, the fuel channel 250A of the fuel interface section 140 of interfaces 130A-B is in operative communication with the fuel chamber 650, and the oxidant channel 250B of the oxidant interface section 150 of interfaces 130A-B is in operative communication with the oxidant chamber 652. As such, the interfaces 130A-B operatively communicate with the fuel and oxidant chambers 650,652 in the manner previously discussed above with regard to the other embodiments.

The interfaces 130, referred to as interfaces 130A and 130B with regard to manifold 100C may be configured, such as that shown in FIG. 22, whereby the separator sections 290A and 290B extend the entire or full longitudinal length of the fuel and oxidant channels 250A and 250B at discrete locations along the radial extent of the fuel and oxidant sections 140,150. As such, the interface 130 is configured so that a portion of the fuel channel 250A extending from the base port 282A to the interface port 280A, defining the separator section 290A, has a solid cross-section, and a portion of the oxidant channel 250B extending from the base port 282B to the interface port 280B, defining the separator section 290B, has a solid cross-section.

Accordingly, in some embodiments, the portions of the fuel section 140 that are not in fluid communication with the fuel chamber 180 via the fuel channel 250A have a solid cross-section, and the portions of the oxidant section 150 that are not in fluid communication with the oxidant chamber 190 via the oxidant channel 250B, have a solid cross-section. As a result of such configuration, the spiral fuel section 140 includes multiple, individual fuel channels 250A that are separated by various solid separator sections 290A. Similarly, the spiral oxidant section 150 includes multiple, individual oxidant channels 250B that are separated by various solid separator sections 290B. Thus, in some embodiments, the fuel section 140 includes multiple fuel channels 250A and separator sections 290A, which are arranged in an alternating or interleaved configuration. Similarly, in some embodiments, the oxidant section 150 includes multiple oxidant channels 250B and separator sections 290B, which are arranged in an alternating or interleaved configuration. As such, the multiple fuel channels 250A are spaced apart by the separator sections 290A, and the multiple oxidant channels 250B are spaced apart by the separator sections 290B. It should be appreciated that such configuration of the interface 130 discussed with regard to the manifold 100C may be utilized with any of the embodiments of the manifold presented herein.

Operatively coupled to the inner cavity 634 of the interface body 600 is the heat exchanger 610. The heat exchanger 610 includes a body 670, which comprises an elongated tube, having a cavity 672 disposed therein. It should be appreciated that in some embodiments, the elongated tube forming the body 670 may be cylindrical, but may take on any other suitable cross-sectional shape or dimension. An exchanger partition 680 is provided within the cavity 672, and extends along the longitudinal length of the body 670 of the heat exchanger 610. In addition, the exchanger partition 680 is axially aligned with the interface partition 640 that is disposed in the interface body 600. That is, the interface partition 640 and the exchanger partition 680 form a single continuous partition within the manifold 100C. The exchanger partition 680 serves to create two separate passages, an inlet passage 690A and an outlet passage 690B. With regard to the inlet passage 690A, it has terminal openings 692A and 692B, whereby opening 692A is in operative communication with the inlet 614, while the other opening 692B of the inlet passage 690A is in operative communication with the fuel chamber 650 of the interface body 600. However, it should be appreciated that in some embodiments, the inlet passage 690A may be placed in operative communication with the oxidant chamber 652. Similarly, the outlet passage 690B has terminal openings 694A and 694B, whereby opening 694A is in operative communication with the outlet 616, while the opening 694B of the outlet passage 690B is in operative communication with the oxidant chamber 652 of the interface body 600. However, it should be appreciated that in some embodiments, the outlet passage 690B is placed in operative communication with the fuel chamber 650, when the inlet passage 690A is in operative communication with the oxidant chamber 652. In some embodiments, the exchanger partition 680 may include one or more baffles to impede or slow the flow of fuel gas or oxidant gas through the heat exchanger 610. In other embodiments, the passages 690A-B may each comprise spiral passages. In some embodiments the spiral passages may be intertwined or interleaved with each other. However, it should be appreciated that the partition 680 and the passages 690A, 690B may be arranged in any desired shape or configuration. In addition, the heat exchanger 610 may be formed of any suitable materials, including those that have electrical and thermal conductivity, can withstand the fuel cell operating temperatures as well as the oxidizing and reducing environments, and a thermal expansion coefficient that closely matches that of the SOFC 10. Such materials include, but are not limited to metals, such as super alloys, Inconel, Crofer APU, gold, platinum, as well other suitable metals, including electrically conductive ceramics, such as lanthanum chromite, and any combination thereof.

Figure 27A:
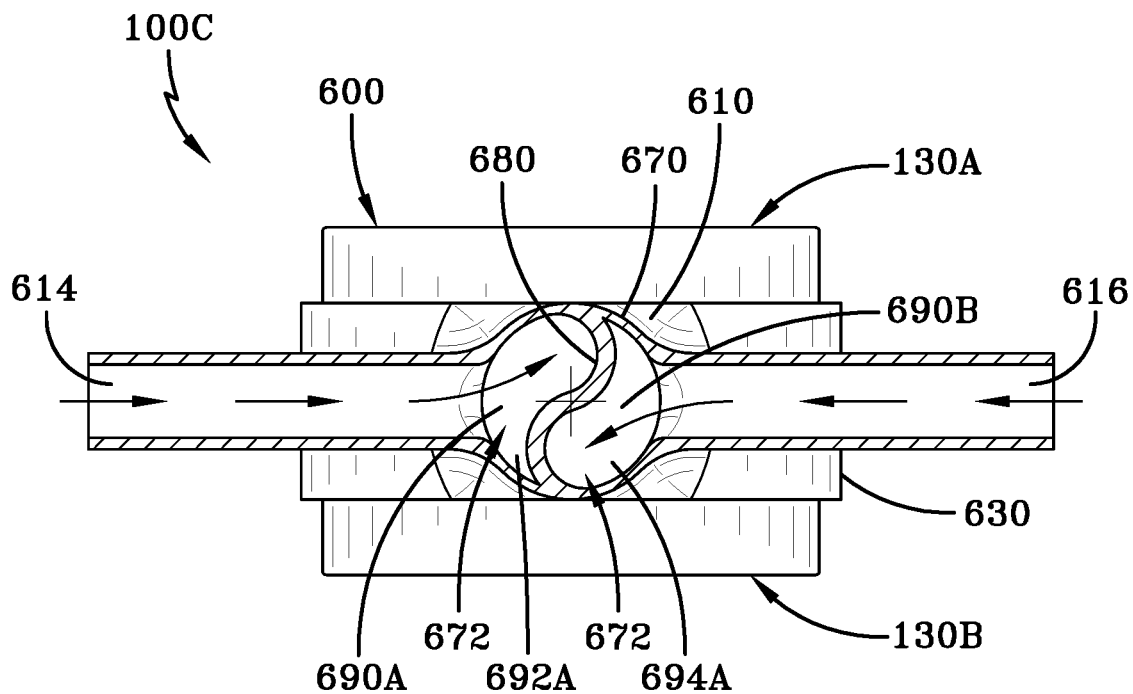
FIG. 27A is a cross-sectional view of the manifold embodiment shown in FIG. 20 in accordance with the concepts and disclosures presented herein.
Figure 27B:
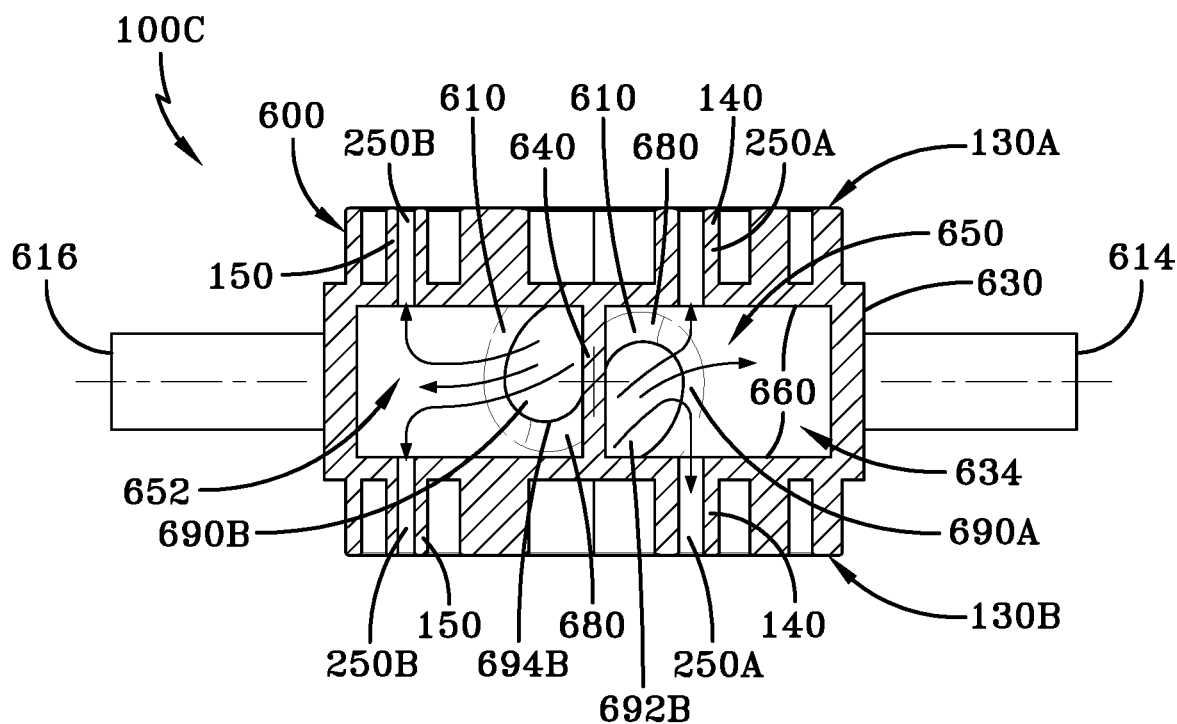
FIG. 27B is another cross-sectional view of the manifold embodiment shown in FIG. 20 in accordance with the concepts and disclosures presented herein.
Figure 27C:
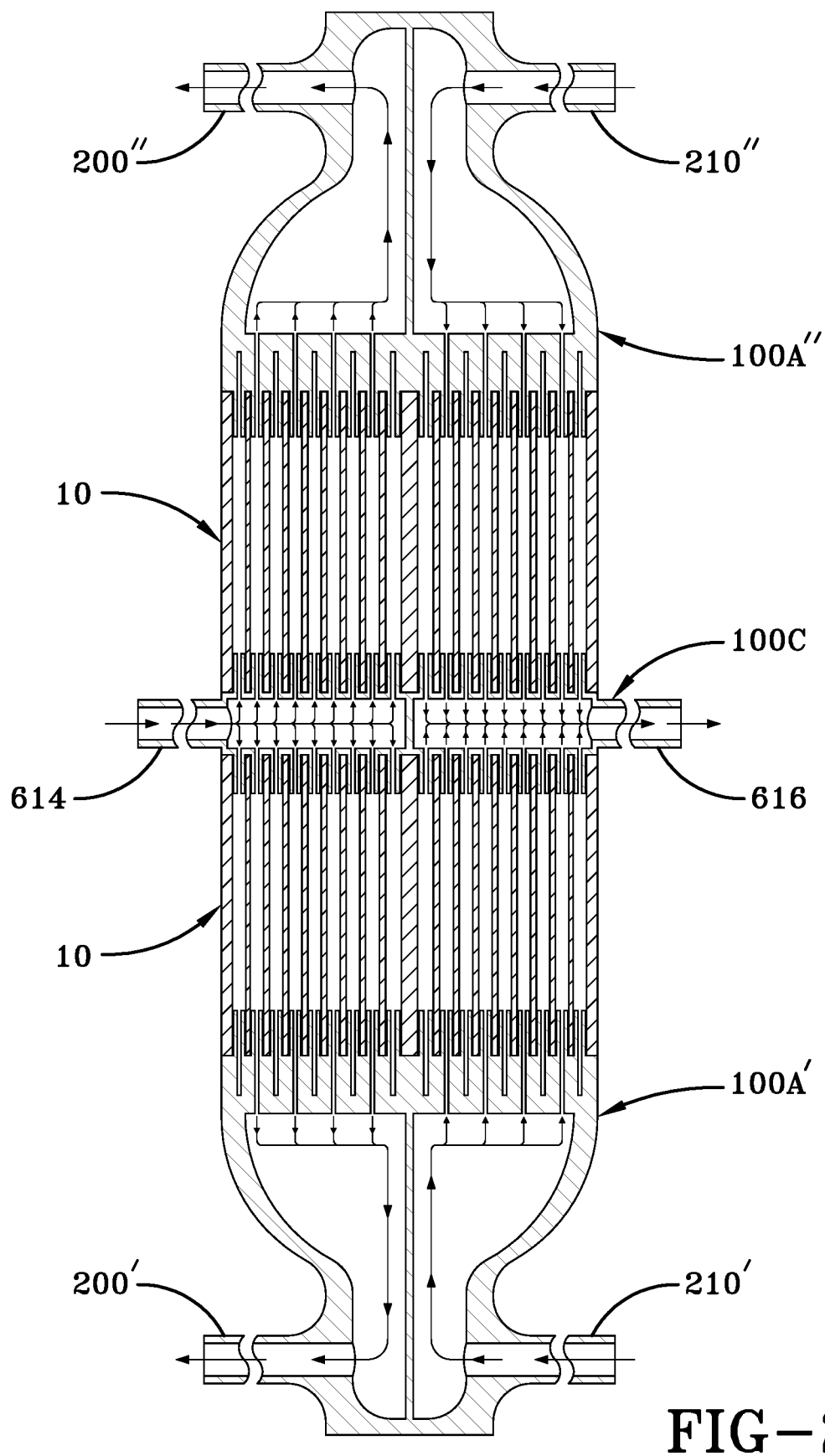
FIG. 27C is another cross-sectional view of the manifold shown in FIG. 20 utilized with a plurality SOFCs in accordance with the concepts and disclosures presented herein.

Thus, during operation of the manifold 100C, a one end of a pair of SOFCs 10 is placed in operative communication with respective interfaces 130A-B of the manifold 100C. In addition, the remaining end of the SOFCs 10 are placed in operative communication with a manifold 100A, as shown in FIG. 27C. For example, in some embodiments, the fuel channel 250A of the interfaces 130A-B are placed in fluid communication with the fuel channel 18 of the SOFCs 10 by placing the fuel section 140 of the interfaces 130A-B into the fuel channel 18 of the respective SOFCs 10. In addition, the oxidant channel 250B of the interfaces 130A-B is placed in fluid communication with the oxidant channel 20 of the respective SOFCs 10 by placing the oxidant section 150 of the interfaces 130A-B into the oxidant channel 20 of the respective SOFCs 10. In addition, a portion of the multilayer member 19 of the SOFCs 10 is placed within the spacing gap 232 of the respective interfaces 130A-B. It should be appreciated that the receipt of the fuel and oxidant sections 140,150 of the manifold 100C into the fuel and oxidant channels 18,20 of the SOFCs 10, may occur such as by brazing, sliding, and in some cases creates a seal, such as by braze joining, or friction fit, therebetween.

Next, oxidant gas, such as air, is supplied to the ports 210 of the manifolds 100A' and 100A", whereupon the oxidant gas enters the SOFCs 10, whereupon the reactants/by-products enter the interface body 600 of the manifold 600C, and flow through the passage 690B of the exchanger 610 before exiting the manifold 100C at port 616. As such, these reactants/by-products serve to heat the heat exchanger.

Simultaneously with the flow of the oxidant gas through the heat exchanger 610 and the interfaces 130A-B of the manifold 100C, fuel gas, such as hydrogen, is supplied to the fuel inlet 614, whereupon it enters the passage 690A of the heat exchanger 610. It should be appreciated that in some embodiments, the fuel gas may be pressurized to a desired level. Assuming, that the SOFCs 10 to which the manifold 100C is operatively coupled have been operation, the heat exchanger 610 will have been previously heated from the exhausted by-products from the interaction of the fuel gas with the SOFCs 10 that is permitted to flow back into the passage 690A of the heat exchanger 610 from the interface body 600. As such, the incoming fuel gas delivered to the fuel chamber 650 from the passage 690A is pre-heated, along with the incoming oxidant gas. Next, the fuel gas within the fuel chamber 650 is then routed through the fuel channel 250A provided by both of the interfaces 130A-B of the manifold 100C in the manner previously discussed above for delivery to the SOFC 10 operatively coupled thereto. After the delivered fuel gas interacts with the SOFCs 10, any reactants/by-products are routed into the manifolds 100A'/100A" and exhausted out of the ports 200.

It should also be appreciated that the manifolds 100A' and 100A" may be each replaced with manifold 100C' discussed below to enable the capture of heat via the heat exchangers 610.

Figure 27D:
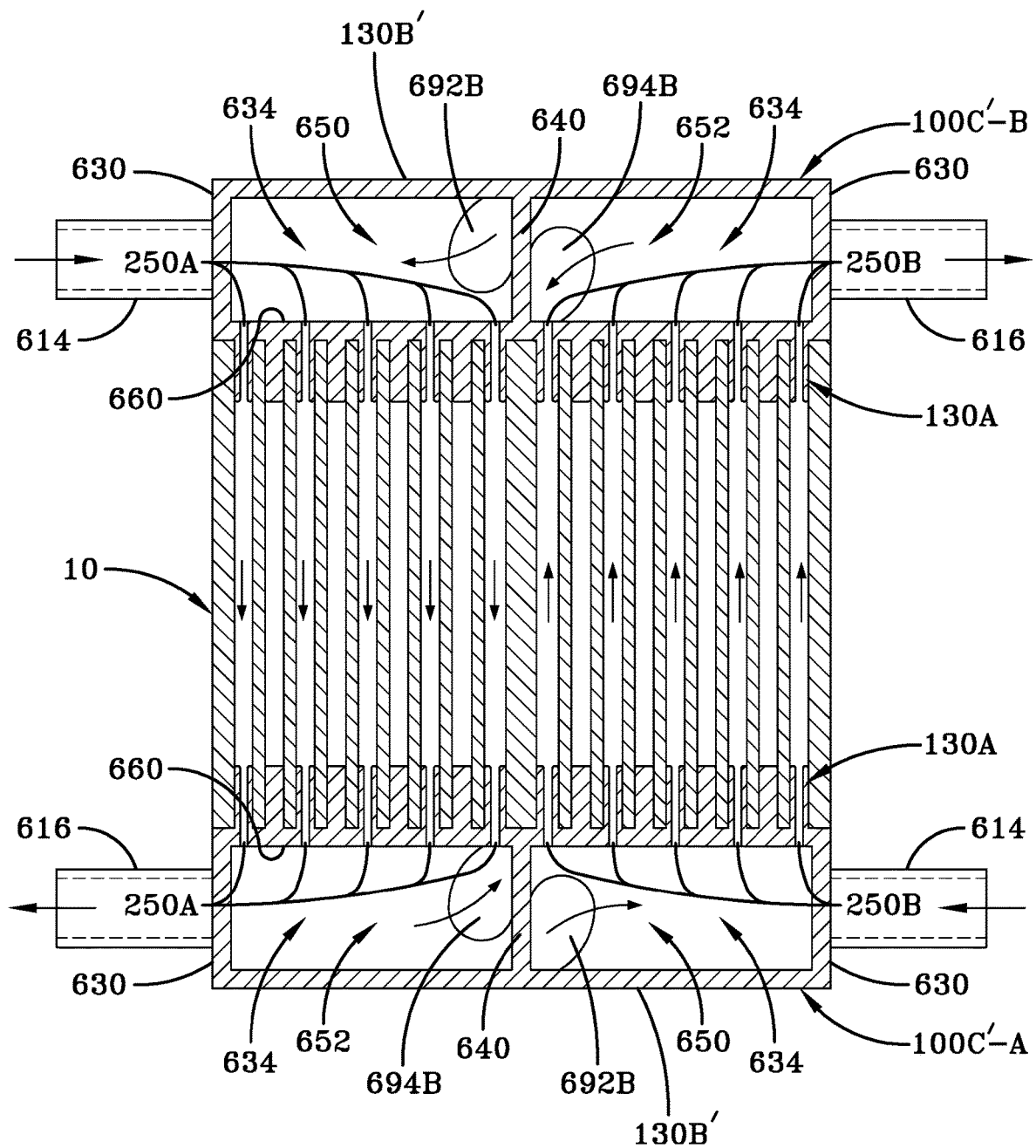
FIG. 27D is another embodiment of the manifold shown in FIG. 20 for use with a tubular SOFC having a spiral cross-section in accordance with the concepts and disclosures presented herein.
Figure 28:
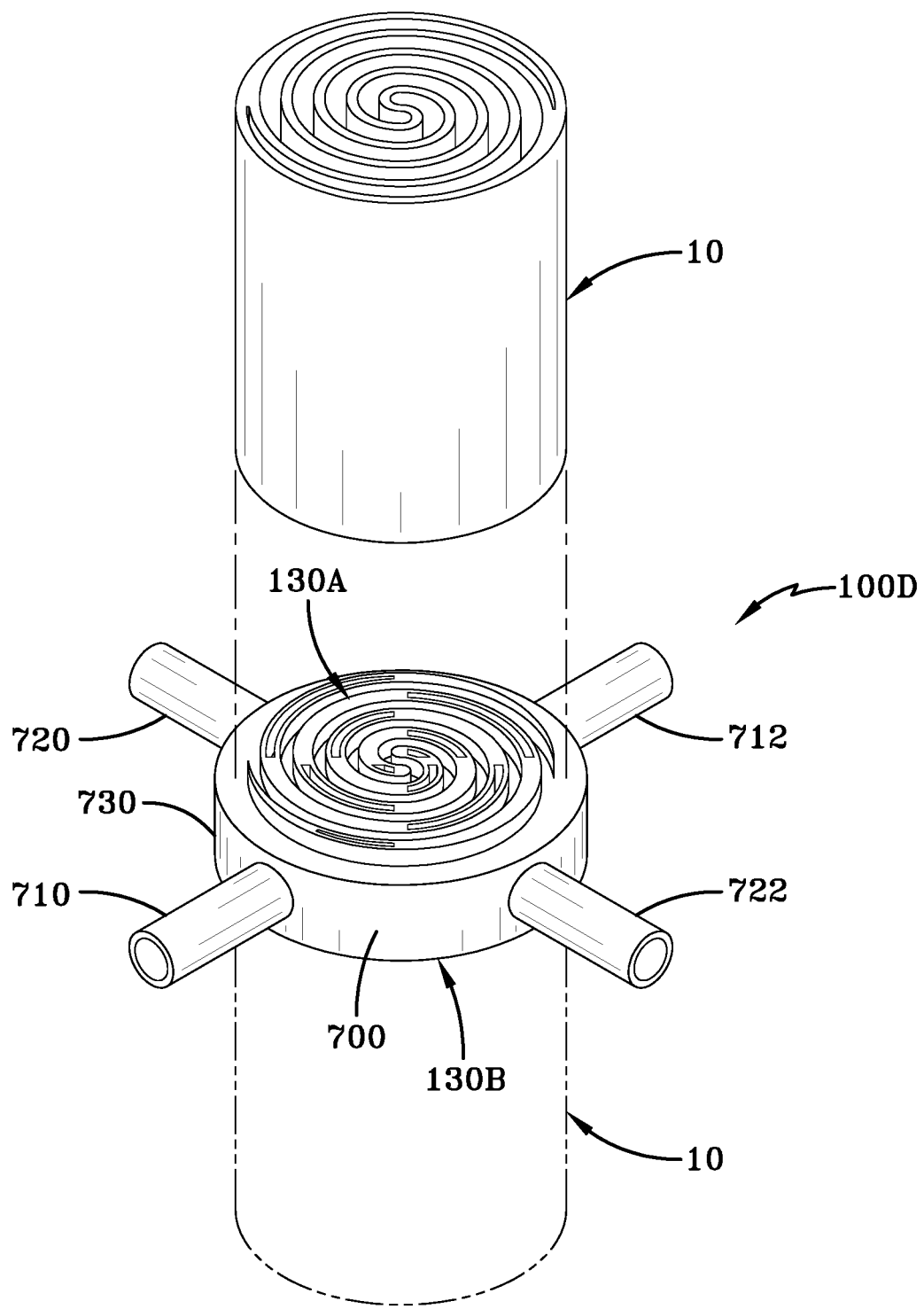
FIG. 28 is a perspective view of another embodiment of a manifold for use with a tubular SOFC having a spiral cross-section in accordance with the concepts and disclosures presented herein.
Figure 29A:
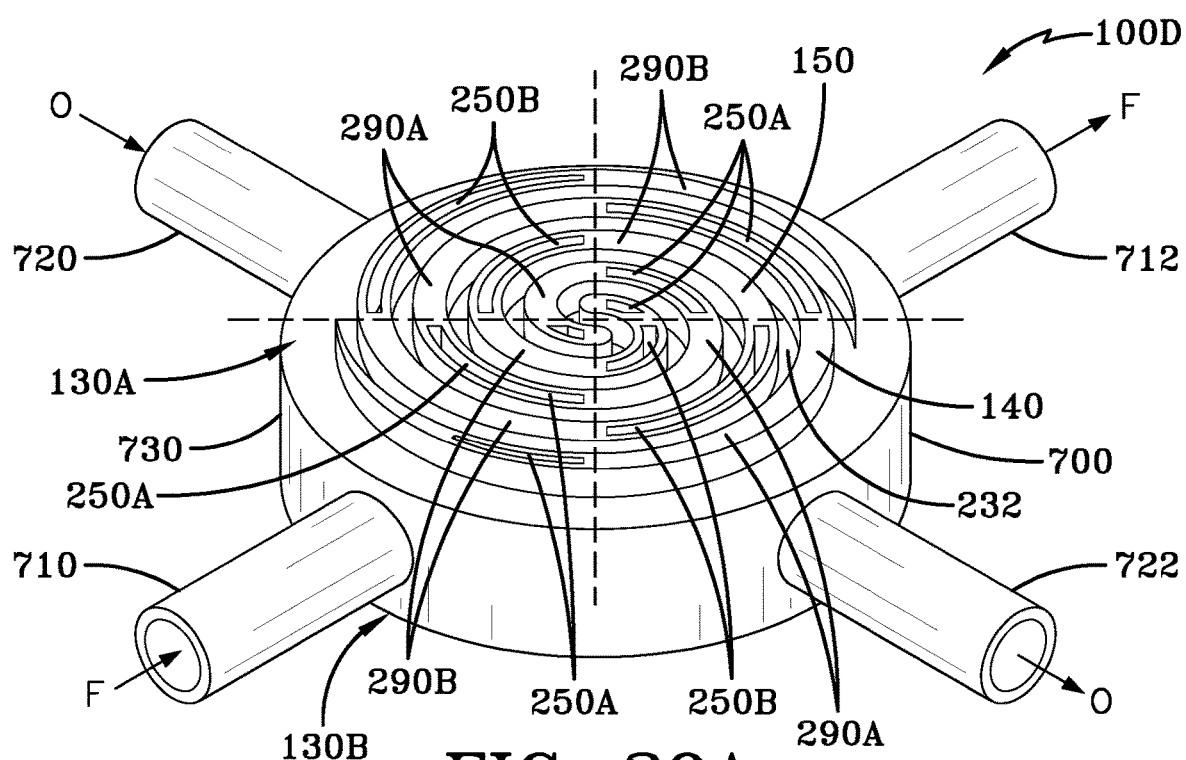
FIG. 29A is a perspective view of the manifold embodiment shown in FIG. 28 in accordance with the concepts and disclosures presented herein.
Figure 29B:
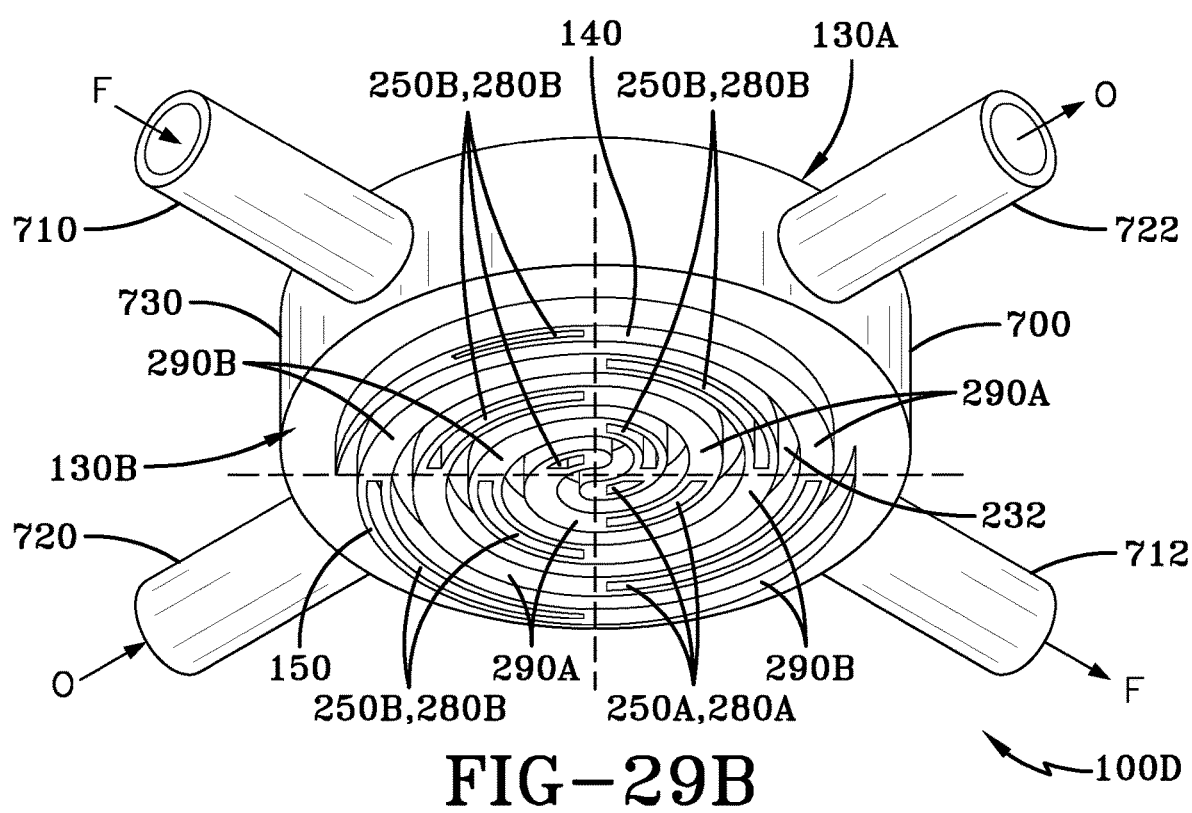
FIG. 29B is another perspective view of the manifold embodiment shown in FIG. 29A in accordance with the concepts and disclosures presented herein.
Figure 31:
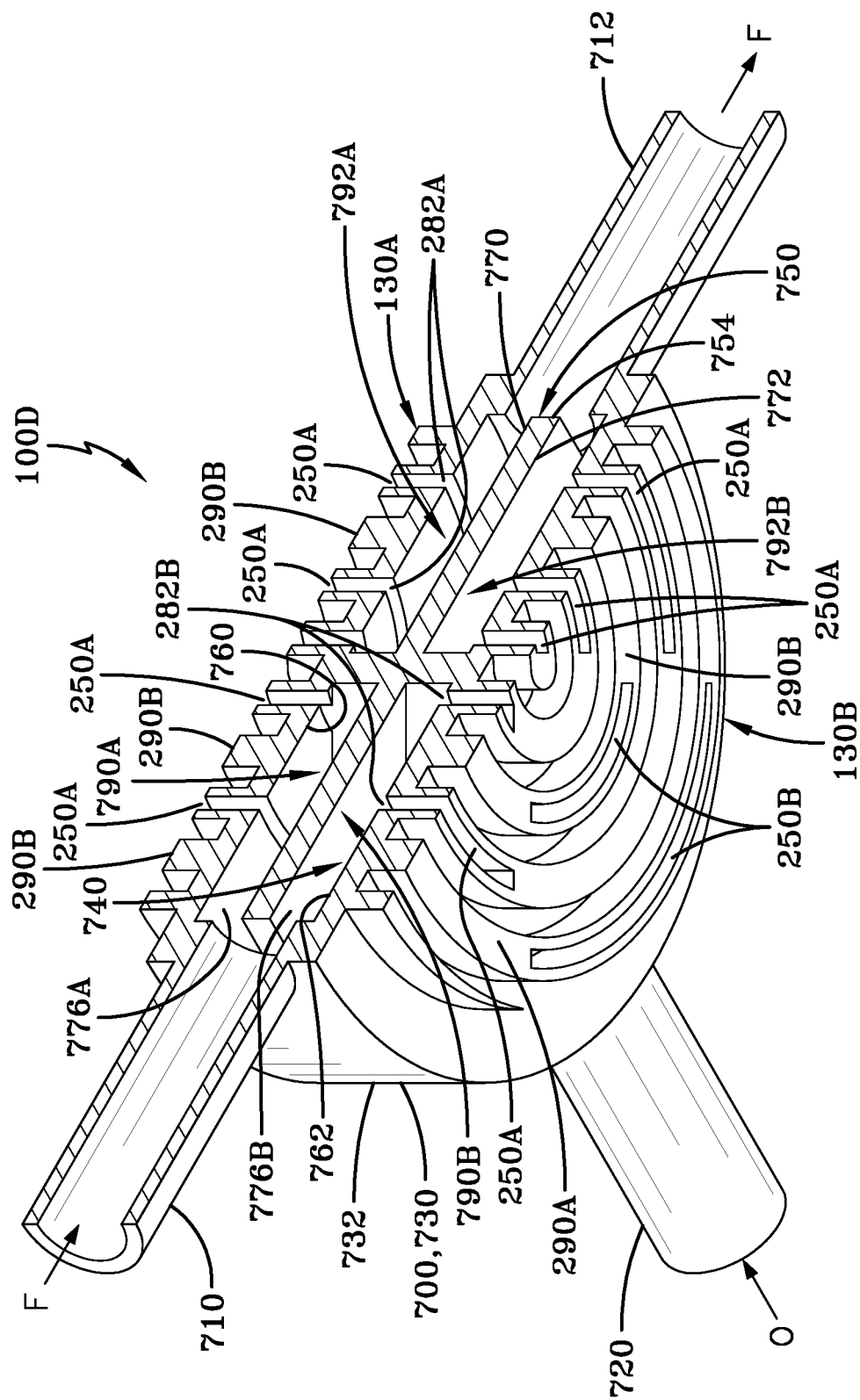
FIG. 31 is another cross-sectional view of the manifold embodiment shown in FIG. 28 in accordance with the concepts and disclosures presented herein.
Figure 32A:
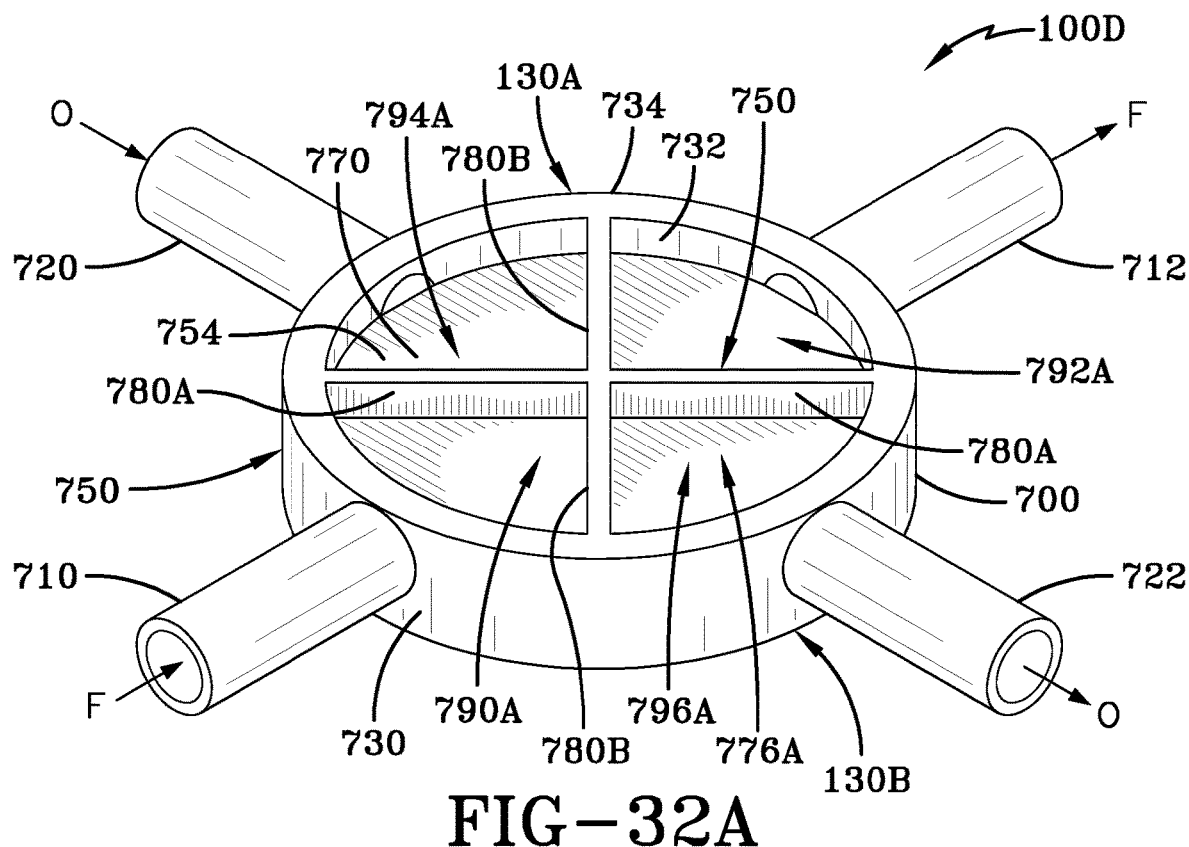
FIG. 32A is a perspective view of a partition used by the manifold embodiment shown in FIG. 28 in accordance with the concepts and disclosures presented herein.
Figure 32B:
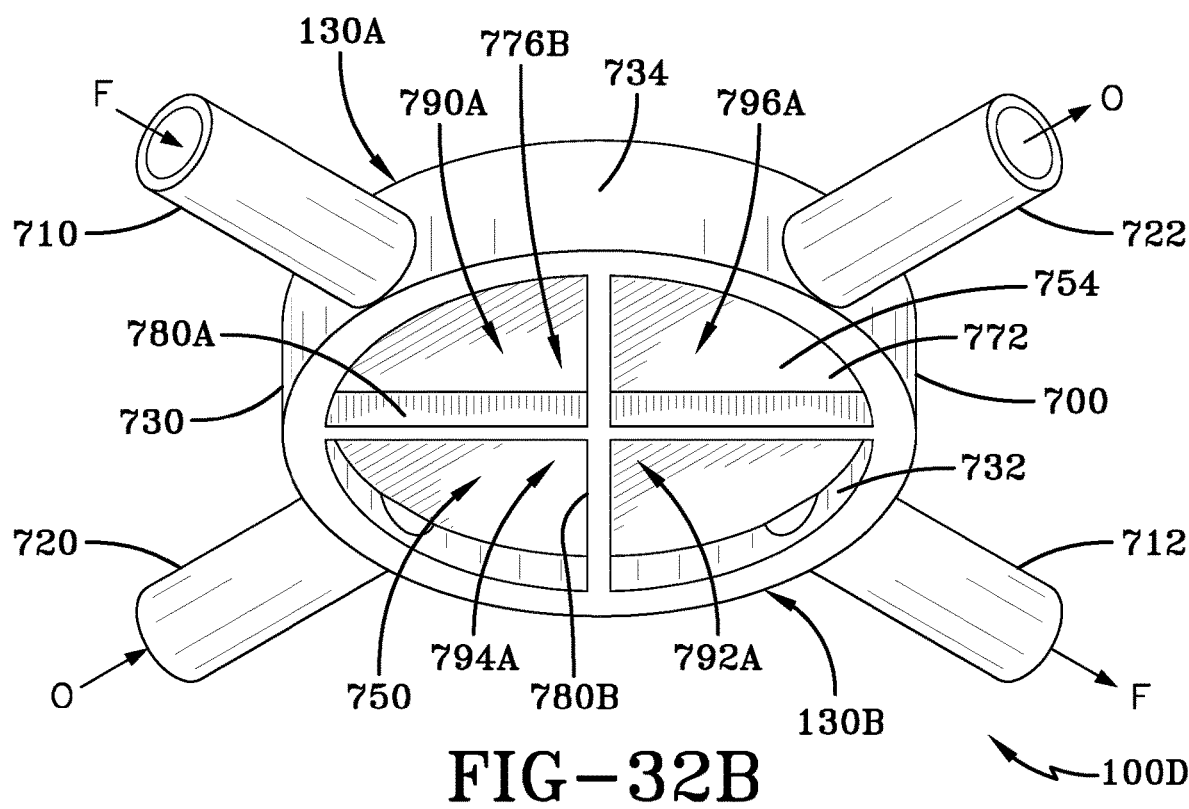
FIG. 32B is another perspective view of the partition shown in FIG. 32A in accordance with the concepts and disclosures presented herein.
Figure 33:
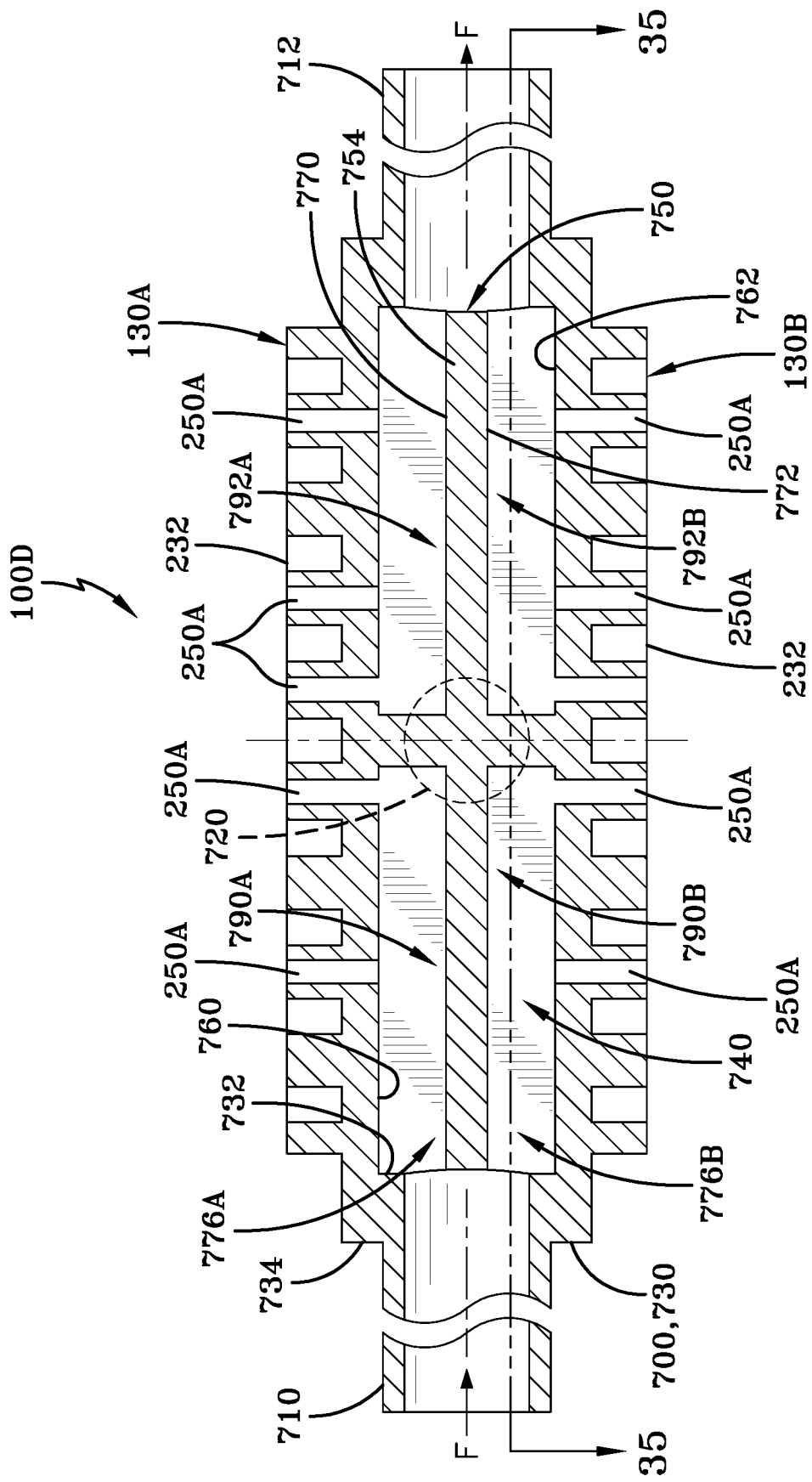
FIG. 33 is a cross-sectional view of the manifold embodiment shown in FIG. 28 in accordance with the concepts and disclosures presented herein.
Figure 34:
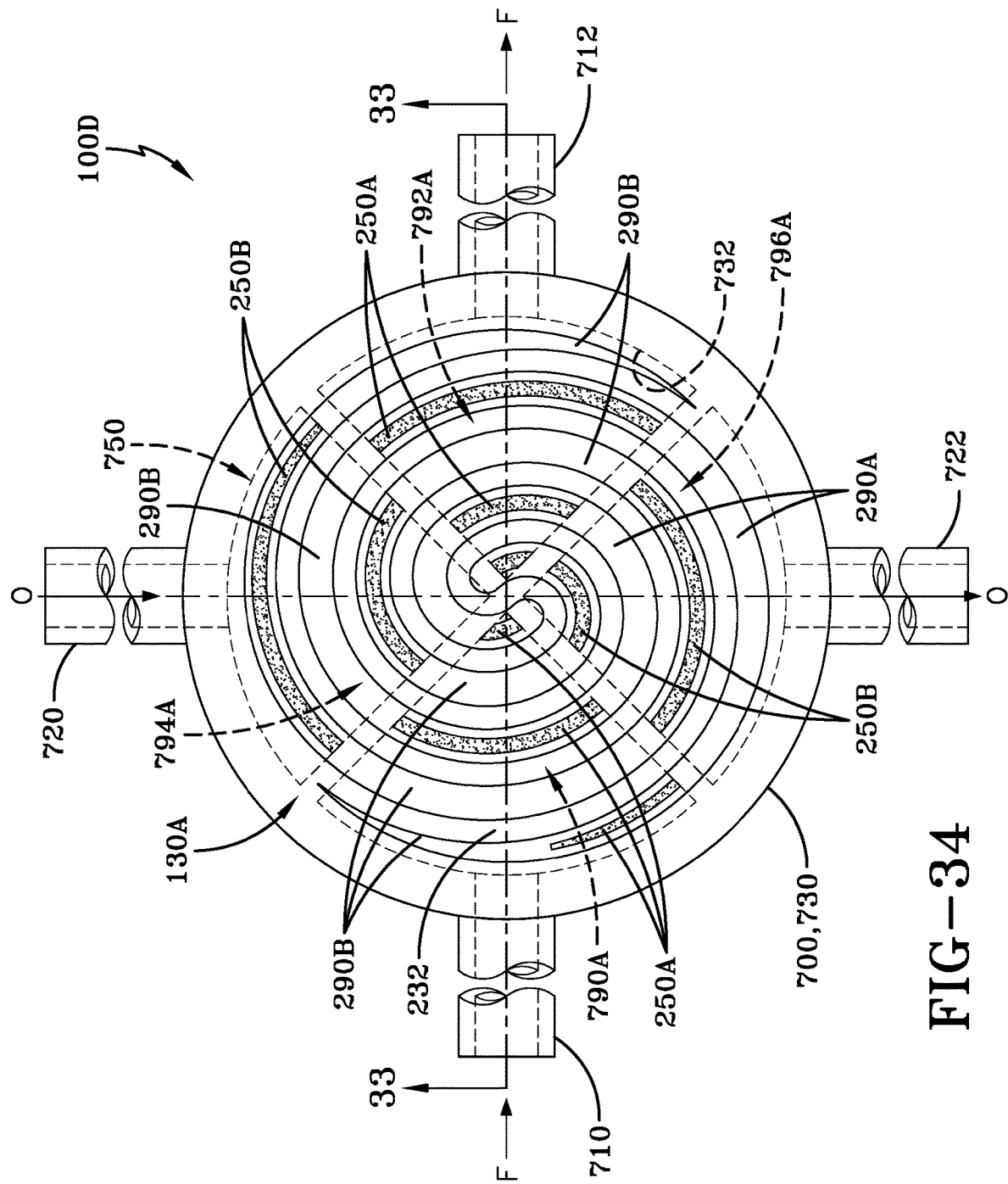
FIG. 34 is a top plan view of the manifold embodiment shown in FIG. 28 in accordance with the concepts and disclosures presented herein.
Figure 35:
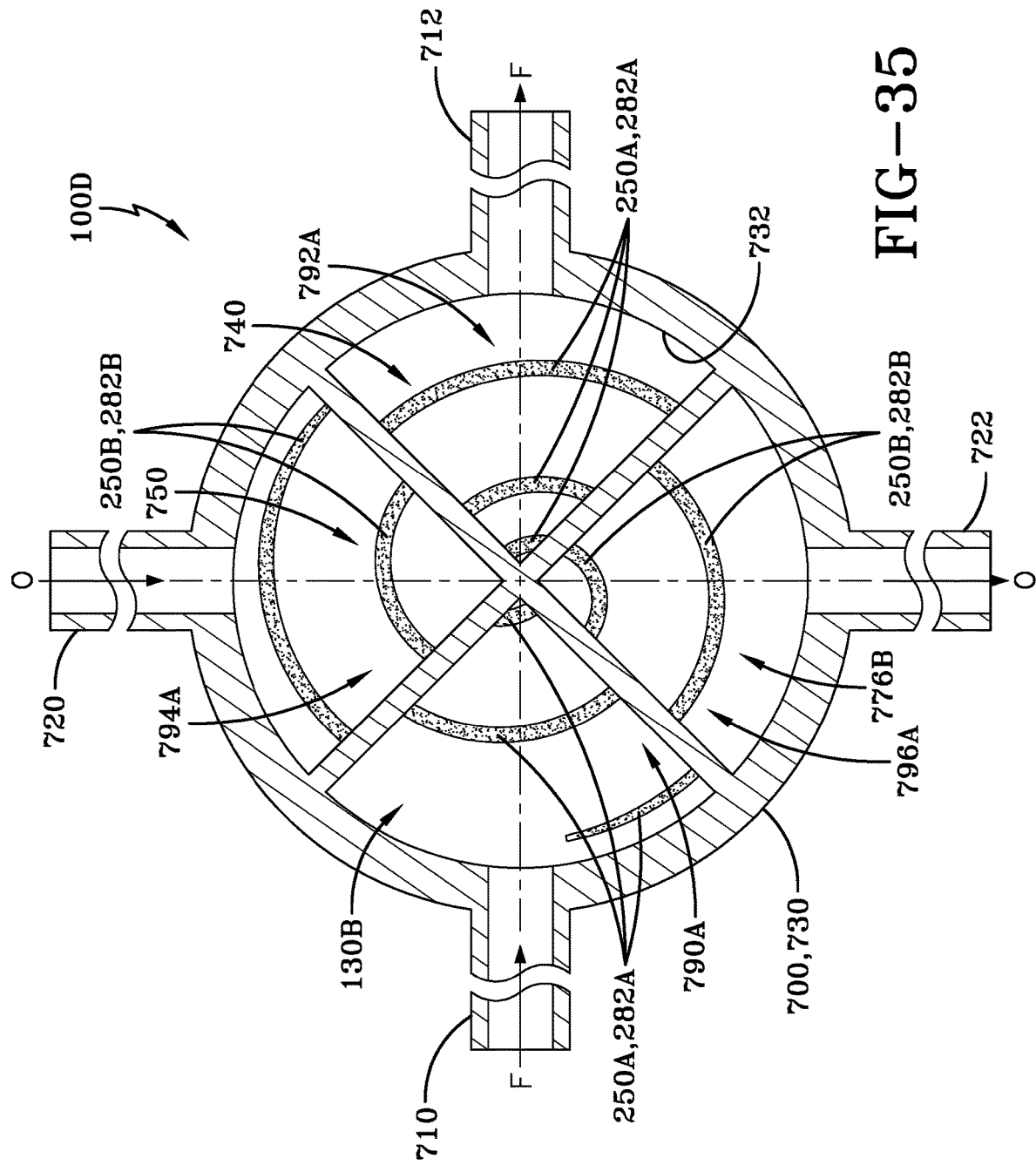
FIG. 35 is a cross-sectional view of the manifold embodiment shown in FIG. 28 in accordance with the concepts and disclosures presented herein.

It is also contemplated that the manifold 100C may be modified by removing interface 130B, as shown in FIG. 27D, so as to form an alternative manifold embodiment 100C'. That is, the portion of the body of the manifold 100C that includes the manifold 130B is made to be a solid section 130B' of material, and as such, no communication of fuel or oxidant gases is permitted through the solid section 130B'.

Accordingly, as shown in FIG. 27D, two manifolds 100C', designated as manifolds 100C'-A and 100C'-B, may be operatively coupled via interfaces 130A to each end of the SOFC 10. Thus, during operation, cold oxidant gas (e.g. air) is received in port 614 of manifold 100C'-A, whereupon it flows through the passage 690A of the heat exchanger 610 (where it is pre-heated by the hot fuel reactants from the SOFC 10) and then into the chamber 650 of manifold 100C'-A. Next, the pre-heated oxidant gas is delivered to the SOFC 10, where electrochemical reactions take place. The oxidant reactants from the SOFC 10 are then routed out of the SOFC 10 and delivered into the chamber 652 of the manifold 100C'-B. Finally the oxidant reactant exhausted out through the port 616 of manifold 100C-B via the passage 690B of the heat exchanger 610. It should be appreciated that the heated oxidant by-product gases are used to heat the incoming cool fuel gas passing through the heat exchanger 610 of manifold 100C'-B to be discussed.

Simultaneously with this process, fuel gas (e.g. hydrogen gas) is delivered to port 614 of the manifold 100C'-B, which passes through the passage 690A of the heat exchanger 610 thereof, and is pre-heated. The pre-heated fuel gas then enters the chamber 650 of the manifold 100C'-B before being entering the SOFC 10. Next, the by-products from the reacted fuel are then delivered into the chamber 652 of the manifold 100C'-A, whereupon they are routed through the passage 690B to heat the heat exchanger 610 thereof. As such, the direction of the flow of the fuel gas and the oxidant gas through the SOFC 10 are counter or opposite to each other. Accordingly, such embodiment allows the thermal operating efficiency of the SOFC 10 to be increased. However, in other embodiments the direction of the flow of the fuel gas and oxidant gas through the SOFC 10 may be in the same direction.

It should also be appreciated that in other embodiments, the manifolds 100A' and 100A" in FIG. 27C may be replaced by manifold 100C' to increase thermal efficiency of the SOFC 10.

Another embodiment of the manifold is referred to by numeral 100D, as shown in FIGS. 28-35. The manifold 100D includes an interface body 700 that has a fuel port 710 and an oxidant port 722 that operatively communicate with the interfaces 130A and 130B disposed on each side of the interface body 700 in a manner to be discussed.

Specifically, the interfaces 130A-B may be positioned relative to the body 700 so that they are opposed, so as to face in opposite directions, or may be positioned in any desired orientation relative to the body 700. The interfaces 130A and 130B are spaced apart and joined by a wall 730 having an inner surface 732 and an outer surface 734, which together define an interface cavity 740 therein. In some embodiments, the wall 730 may be formed to have a cylindrical shape, but may be a rectilinear shape, a curvilinear shape, or any combination thereof.

In operative communication with the interface cavity 740 is the fuel inlet 710, the fuel outlet 712, the oxidant inlet 720, and the oxidant outlet 722. Positioned within the interface cavity 740 is a partition 750. The partition 750, shown clearly in FIGS. 32A-B, includes a cavity partition 754 that is positioned between, and spaced away from an inner surface 760 of the interface 130A and an inner surface 762 of the interface 130B. The cavity partition 754 is also attached along its periphery to the inner surface 732 of the wall 730 of the interface body 700. The cavity partition 754 also includes opposed surfaces 770 and 772, with surface 770 positioned proximate to the inner surface 760 of the interface 130A, and the surface 772 positioned proximate to the inner surface 762 of the interface 130B. As such, the cavity partition 754 serves to form two chambers 776A and 776B within the interface cavity 740. As such, the chamber 776A is defined as the portion of the interface cavity 740 that is bounded between the inner surface 760 of the interface 130A and the surface 770 of the cavity partition 754, and the chamber 776B is defined as the portion of the interface cavity 740 that is bounded between the inner surface 762 of the interface 130B and the surface 772 of the cavity partition 754. The cavity partition 754 is also positioned so that it divides or separates each of the fuel inlet 710, the fuel outlet 712, the oxidant inlet 720 and the oxidant outlet 722 into multiple, separate inlets and outlets that fluidly communicate with the interface cavity 740 in a manner to be discussed.

The partition 750 also includes chamber partitions 780A and 782A that extend from the surface 770 of the cavity partition 750. The chamber partitions 780A and 782 are configured to intersect each other at any suitable angle, such as a substantially right angle. In addition, the chamber partitions 780A and 782A are attached to the inner surface 760 of the interface 130A, and to the inner surface 732 of the wall 730 of the interface body 700. Thus, the chamber partitions 780A and 782A serve to separate the chamber 776A into four sub-chambers, which include a fuel inlet chamber 790A, a fuel outlet chamber 792A, an oxidant inlet chamber 794A and an oxidant outlet chamber 796A. As such, the fuel inlet chamber 790A is in operative communication with the fuel inlet 710, and the fuel outlet chamber 792A is in operative communication with the fuel outlet 712. Similarly, the oxidant inlet chamber 794A is in operative communication with the oxidant inlet 720 and the oxidant outlet chamber 796A is in operative communication with the oxidant outlet 722.

In addition, the partition 750 includes chamber partitions 780B and 782B, which extend from the surface 772 of the cavity partition 750. The chamber partitions 780B and 782B are configured to intersect each other at any suitable angle, such as a substantially right angle. It should be appreciated that in some embodiments, the chamber partitions 780A, 782A and 780B,782B are co-extensive with, or overlie, each other. In addition, the chamber partitions 780B and 782B are attached to the inner surface 760 of the interface 130A, and to the inner surface of the wall 730 of the interface body 700. Thus, the chamber partitions 780B and 782B serve to separate the chamber 776B into four sub-chambers, which include a fuel inlet chamber 790B, a fuel outlet chamber 792B, an oxidant inlet chamber 794B and an oxidant outlet chamber 796B. As such, the fuel inlet chamber 790B is in operative communication with the fuel inlet 710 and the fuel outlet chamber 792B is in operative communication with the fuel outlet 712. Similarly, the oxidant outlet chamber 794B is in operative communication with the oxidant inlet 720 and the oxidant outlet chamber 796B is in operative communication with the oxidant outlet 722. As such, the fuel inlet 710 is in fluid communication with both the fuel inlet chambers 790A and 790B, and the fuel outlet 710 is in fluid communication with both the fuel outlet chambers 792A and 792B. Similarly, the oxidant inlet 720 is in fluid communication with both the oxidant inlet chambers 794A and 794B, and the oxidant outlet 722 is in fluid communication with both the oxidant outlet chambers 796A and 796B.

Continuing, the interfaces 130A and 130B include respective fuel interface sections 140A and 140B. As such, the fuel interface section 140A of interface 130A includes a plurality of fuel channels 250A that are separated by various separator sections 290A, as previously discussed with regard to the manifold 100C. As such, a first group of the fuel channels, designated as fuel inlet channels 250A, are in fluid communication with the fuel inlet chamber 790A, and a second group of the fuel channels, designated as fuel outlet channels 250A, are in fluid communication with the fuel outlet chamber 792A. Similarly, the fuel interface section 140B of the interface 130B includes a plurality of fuel channels 250A that are separated by various separator sections 290A, as previously discussed with regard to the manifold 100C. As such, a first group of the fuel channels, designated as fuel inlet channels 250A, are in fluid communication with the fuel inlet chamber 790B, and a second group of the fuel channels, designated as fuel outlet channels 250A, are in fluid communication with the fuel outlet chamber 792B.

The interfaces 130A and 130B also include respective oxidant interface sections 150A and 150B. As such, the oxidant interface section 150A of interface 130A includes a plurality of oxidant channels 250B that are separated by various separator sections 290B, as previously discussed with regard to the manifold 100C. As such, a first group of the oxidant channels, designated as oxidant inlet channels 250B', are in fluid communication with the oxidant inlet chamber 794A, and a second group of the fuel channels, designated as oxidant outlet channels 250B", are in fluid communication with the oxidant outlet chamber 796A.

Similarly, the oxidant interface section 150B of the interface 130B includes a plurality of oxidant channels 250B that are separated by various separator sections 290A, as previously discussed with regard to the manifold 100C. As such, a first group of the oxidant channels, designated as oxidant inlet channels 250B', are in fluid communication with the oxidant inlet chamber 794B, and a second group of the oxidant channels, designated as oxidant outlet channels 250B", are in fluid communication with the oxidant outlet chamber 796B.

Thus, during operation of the manifold 100D, a pair of SOFCs 10 are placed in operative communication with respective interfaces 130A and 130B. For example, in some embodiments, the fuel inlet channels 250A' and the fuel outlet channels 250A" of the interfaces 130A-B are placed in fluid communication with the fuel channel 18 of the respective SOFCs 10, such as by placing the fuel section 140 of the interfaces 130A-B into the fuel channel 18 of the respective SOFCs 10. In addition, the oxidant inlet channels 250B' and the oxidant outlet channels 250B" of the interfaces 130A-B are placed in fluid communication with the oxidant channel 20 of the respective SOFCs 10, such as by placing the oxidant section 150 of the interfaces 130A-B into the oxidant channel 20 of the respective SOFCs 10. In addition, a portion of the multilayer member 19 of each of the SOFCs 10 is placed within the spacing gap 232 of the respective interfaces 130A-B. It should be appreciated that the receipt of the fuel and oxidant sections 140,150 of the manifold 100D into the fuel and oxidant channels 18,20 of the SOFCs 10, may occur such as by sliding or joining, and in some cases create a seal, such as by friction-fit or brazing, therebetween. Next, fuel gas that is delivered to the interface body 700 by the fuel inlet port 710 is supplied simultaneously to both of the fuel inlet chambers 790A and 790B. Next, the fuel gas that is in the fuel inlet chambers 790A-B is then delivered via the fuel outlet channels 250A' of the interfaces 130A-B to the SOFCs 10 that are operatively coupled thereto. The fuel gas, such as hydrogen, is then permitted to interact with the SOFC 10, whereby, any remaining fuel or reaction by-products from the operation of the SOFCs 10 are then routed out of the fuel channel 18 of the SOFCs 10 through the fuel outlet channels 250A" of the interfaces 130A-B and into the fuel outlet chambers 792A and 792B, whereupon they are exhausted out of the fuel outlet port 712.

In addition, oxidant gas that is delivered into the interface body 700 by the oxidant inlet port 720 is delivered simultaneously to both of the oxidant inlet chambers 794A and 794B. Next, the oxidant gas in the oxidant inlet chambers 794A-B is delivered via the oxidant inlet channels 250B' of the interfaces 130A-B to the SOFCs 10 that are operatively coupled thereto. During operation, any remaining oxidant gas or other reaction by-products from the interaction of the oxidant gas with the SOFCs 10, is then routed out of the SOFCs 10 through the oxidant outlet channels 250B" of the interfaces 130A-B and into the oxidant outlet chambers 796A and 796B, whereupon they are exhausted out of the oxidant outlet port 722.

Figure 36:
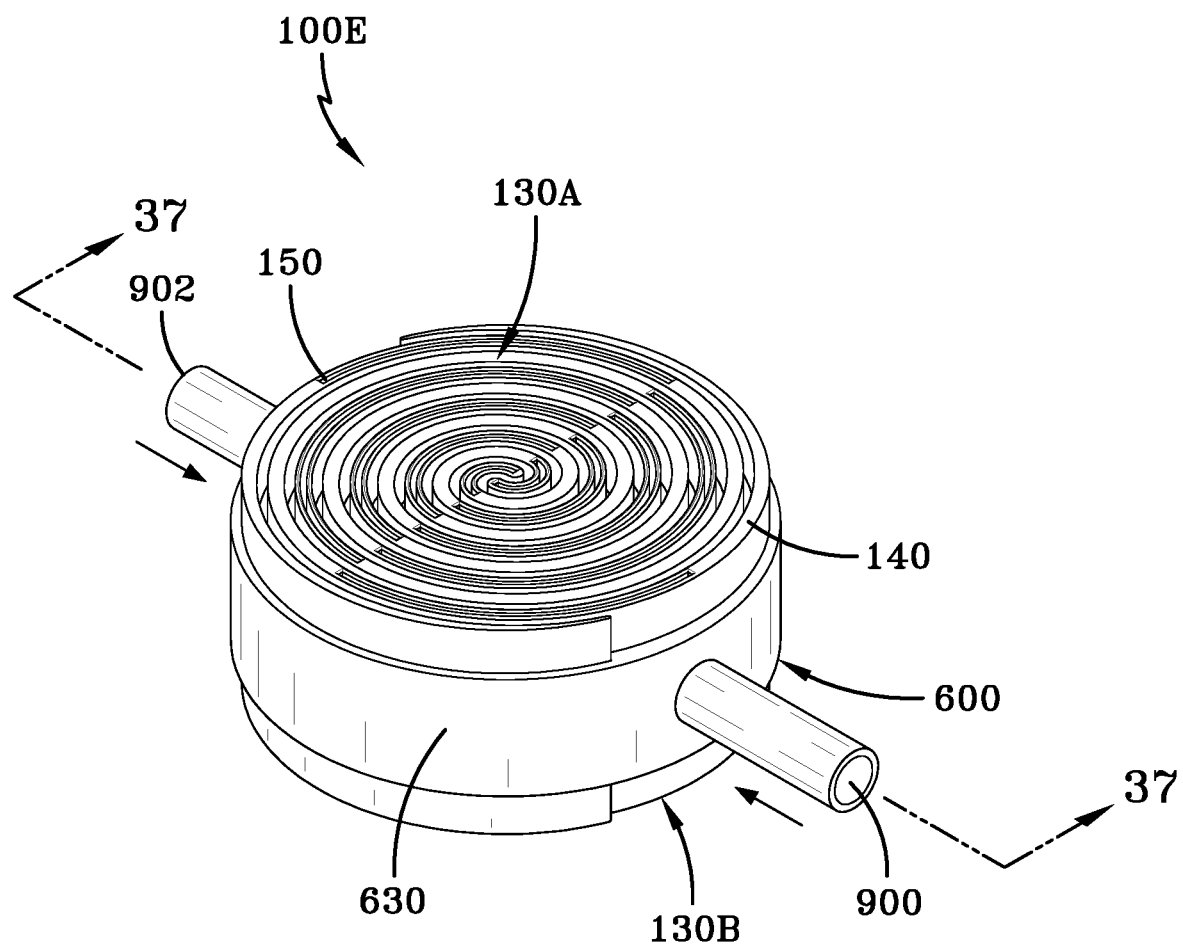
FIG. 36 is an alternative manifold embodiment in accordance with the concepts and disclosures presented herein.
Figure 37:
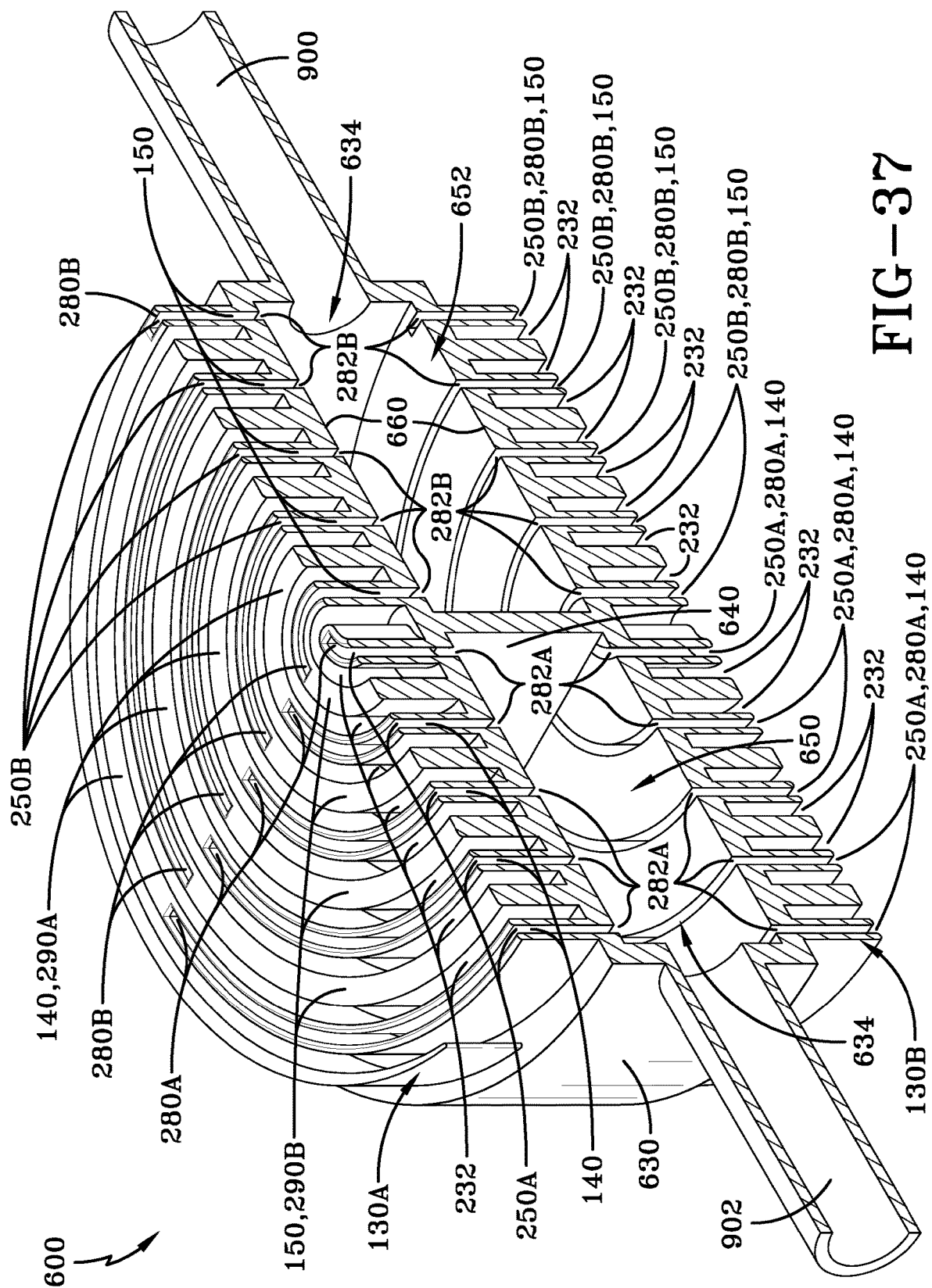
FIG. 37 is a cross-sectional view of the manifold shown in FIG. 36 in accordance with the concepts and disclosures presented herein.

In another embodiment, a manifold 100E may also be provided, which utilizes a modified interface body 600 of manifold 100C previously discussed. As such, manifold 100E includes 2 ports, port 900 and port 902, that respectively communicate with the fuel chamber 650 and the oxidant chamber 652, as shown in FIGS. 36-38.

Figure 38:
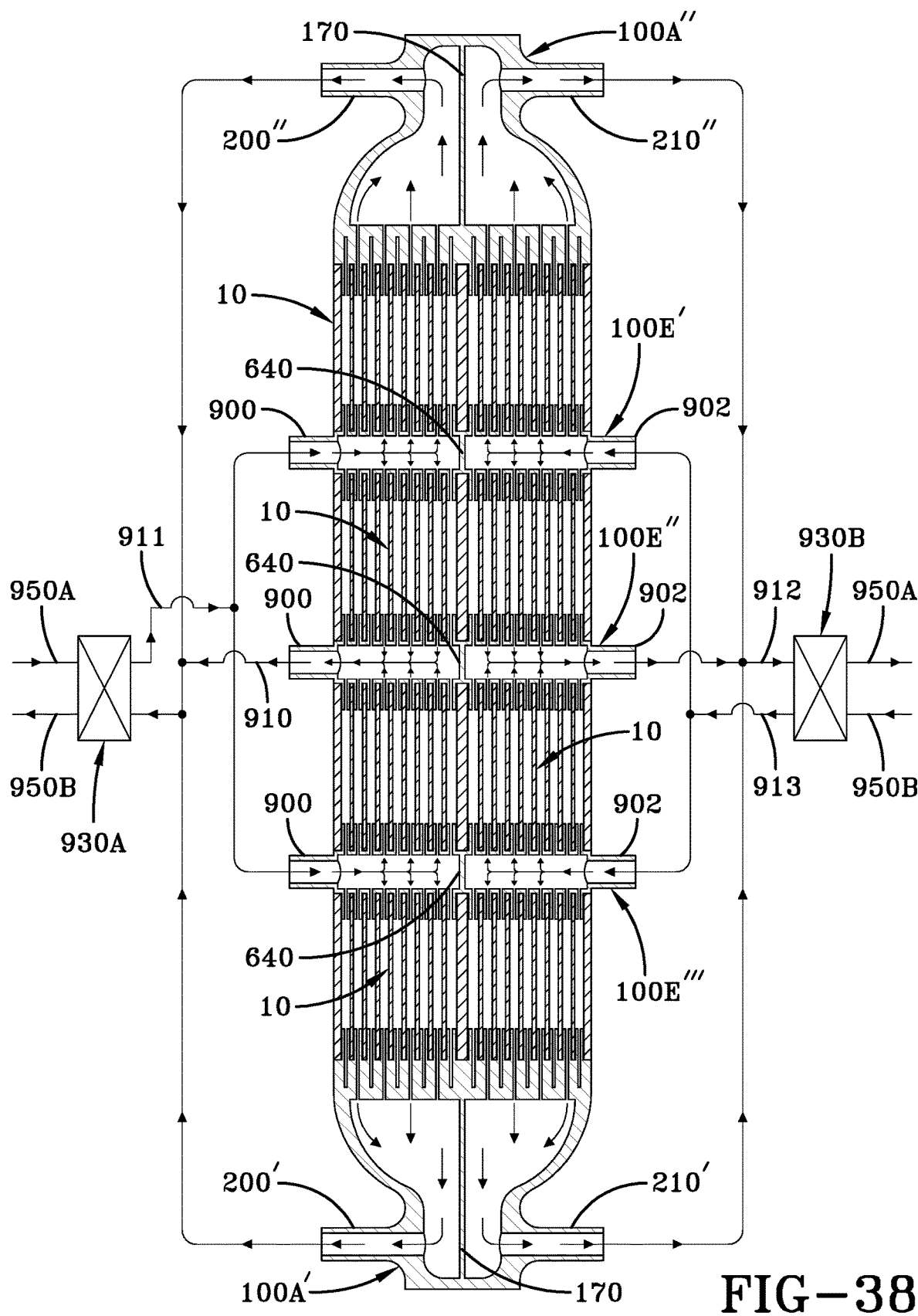
FIG. 38 is a is a cross-sectional view of an alternative embodiment of a manifold in accordance with the concepts and disclosures presented herein.

As such, one or more manifolds 100E can be used to stack multiple SOFCs 10 together, as shown in FIG. 38. In addition, the ends of the stack may be terminated by manifolds 100A. This allows for various configurations by which the fuel gas and oxidant gas may flow through the SOFCs 10 and manifolds 100A and 100E so that a flow of fuel and oxidant gases is supplied to enable the operation of the SOFCs 10.

During operation of one exemplary arrangement of stacked SOFCs 10 and manifolds 100A'/100A" and 100E'/100E"/100E'", as shown in FIG. 38, the ports 200 of the manifolds 100A' and 100A" are operatively coupled together with the port 900 of manifold 100E" to form a master port 910. In addition, the ports 210 of the manifolds 100A' and 100A" are operatively coupled together with the port 902 of the manifold 100E" to form a master port 912. The master ports 910 and 912 may be operatively coupled to a heat exchanger 930A. In addition, the port 900 of manifold 100E' and 100E" are operatively coupled together to form a master port 911, while the port 902 of manifold 100E' and 100E" are operatively coupled together to from a master port 913. The master ports 911 and 913 may be operatively coupled to a heat exchanger 930B. The heat exchangers 930A-B may comprise structures similar to that previously discussed herein, and that include at least two ports 95A-B that operatively communicate with the master ports 910 and 911 in the case of manifold 930A and that operative communicate with the master ports 912 and 913 in the case of manifold 930B.

As such, the ports 900 and the ports 902 of the manifolds 100E' and 100E"' allow for the supply of gases, such as fuel gas, into the SOFCs 10, while the port 900 of the manifold 100E" and the ports 200 of the manifolds 100A' and 100A" serve to route the exhausted reactant/by-product gases out of the SOFCs 10 and into the heat exchanger 930A. As such, the exhausted gases exit the heat exchanger 930A via port 950B and the incoming fuel gas enters the heat exchanger 930A via port 950A, whereupon it is pre-heated. Similarly, the ports 902 of the manifolds 100E' and 100E" allow for the supply of gasses, such as oxidant gas, into the SOFCs 10, while the port 902 of the manifold 100E" and the ports 210 of the manifolds 100A' and 100A" serve to route the exhausted reactant/by-product gases out of the SOFCs 10 and into the heat exchanger 930B. As such, the exhausted gases exit the heat exchanger 930B via port 950A and the incoming oxidant gas enters the heat exchanger 930B via port 950B, whereupon it is pre-heated.

Furthermore, it should be appreciated that the various embodiments of the multifunctional manifolds 100A-E may be formed as an integral whole, or may be formed of multiple sections that are attached together, such as in an interlocking manner for example. In addition, the manifolds 100A-E may be formed of any suitable material that has suitable electrical and thermal conductivity, which can withstand the fuel cell operating temperatures as well as the oxidizing and reducing environments, and that has thermal expansion coefficient closely match with that of the spiral fuel cells. Such materials include, but are not limited to metals, such as super alloys, Inconel, Crofer APU, gold, platinum and other suitable metals, electrically conductive ceramics, such as lanthanum chromite, and any combinations. Fabrication of the manifolds 100A-E may utilize additive manufacturing (3D printing) processes, such as, laser sintering, power bed printing, slurry spray printing, injection printing, UV cure printing, and the like.

It should be appreciated that while various embodiments of the interface 130 have been shown with regard to the manifolds 100A-E discussed above, such manifolds 100A-E may utilize any of the embodiments of the interface 130 presented herein. In addition, while the fuel interface section 140/fuel channel 250A and the oxidant interface section 150/oxidant channel 250B are discussed herein as supplying fuel gas and oxidant gas respectively, such teachings should not be construed as limiting, as the manifolds may be configured so that the fuel interface section 140/fuel channel 250A may deliver oxidant gas to the SOFC 10, and the oxidant interface section 150/oxidant channel 250B may deliver fuel gas to the SOFC 10. Moreover, any of the ports, passages and chambers of the manifolds 100A-E may be utilized in any desired manner so as to receive fuel or oxidant gases in any desired direction or route to enable the desired operation of the SOFC 10.

In alternative embodiments, the direction of flow of one or more of the fuel and oxidant gases through the various manifolds and SOFCs may proceed in directions that are the same or in directions that are opposite to that discussed in the examples above. In other words, one gas (fuel or oxidant) may flow in a direction that is opposite (counter-flow) to the direction of another gas (fuel or oxidant) through the SOFC 10; and, in some embodiments the gases (fuel and oxidant) may flow in the same direction (co-flow) through the SOFC 10.

It should be appreciated that the anode 12 and the cathode 16 of the SOFC 10 are capable of being electrically coupled to the fuel interface section 140 and the oxidant interface section 150, when the SOFC 10 is attached to the manifolds 100A-E discussed herein. As such, the interface sections 140 and 150 may themselves be formed, or may be configured to include, electrodes, which are formed from any suitable electrically conductive or semi-conductive material for electrical communication with the anode and cathode 12,16 of the SOFC 10. In some embodiments, the electrodes may be electrically coupled to interface electrodes, which serve to connect the SOFC 10 to an electrical load that is to receive electrical power. For example, in some embodiments, the ports 200,210 of the manifold 100A may serve as interface electrodes, such that port 200 serves as the anode interface electrode and the port 210 serves as the cathode interface electrode, or vice versa.

Manufacturing of Manifold and SOFCs

The various manifold embodiments discussed herein may be manufactured using additive manufacturing (3D printing) techniques, such as, laser sintering, power bed printing, slurry spray printing, injection printing, UV (ultra-violet) cure printing. Moreover, the various manifold embodiments may be manufactured using the design techniques used to form fuel cells, such as SOFCs, discussed in the following sections herein.

In another aspect, a fuel cell, such as a SOFC 10, may be designed using an additive manufacturing process, whereby a 3D (three-dimensional) computer model of the fuel cell is created, whereupon the 3D computer model is then fabricated using an additive manufacturing process.

Figure 1:
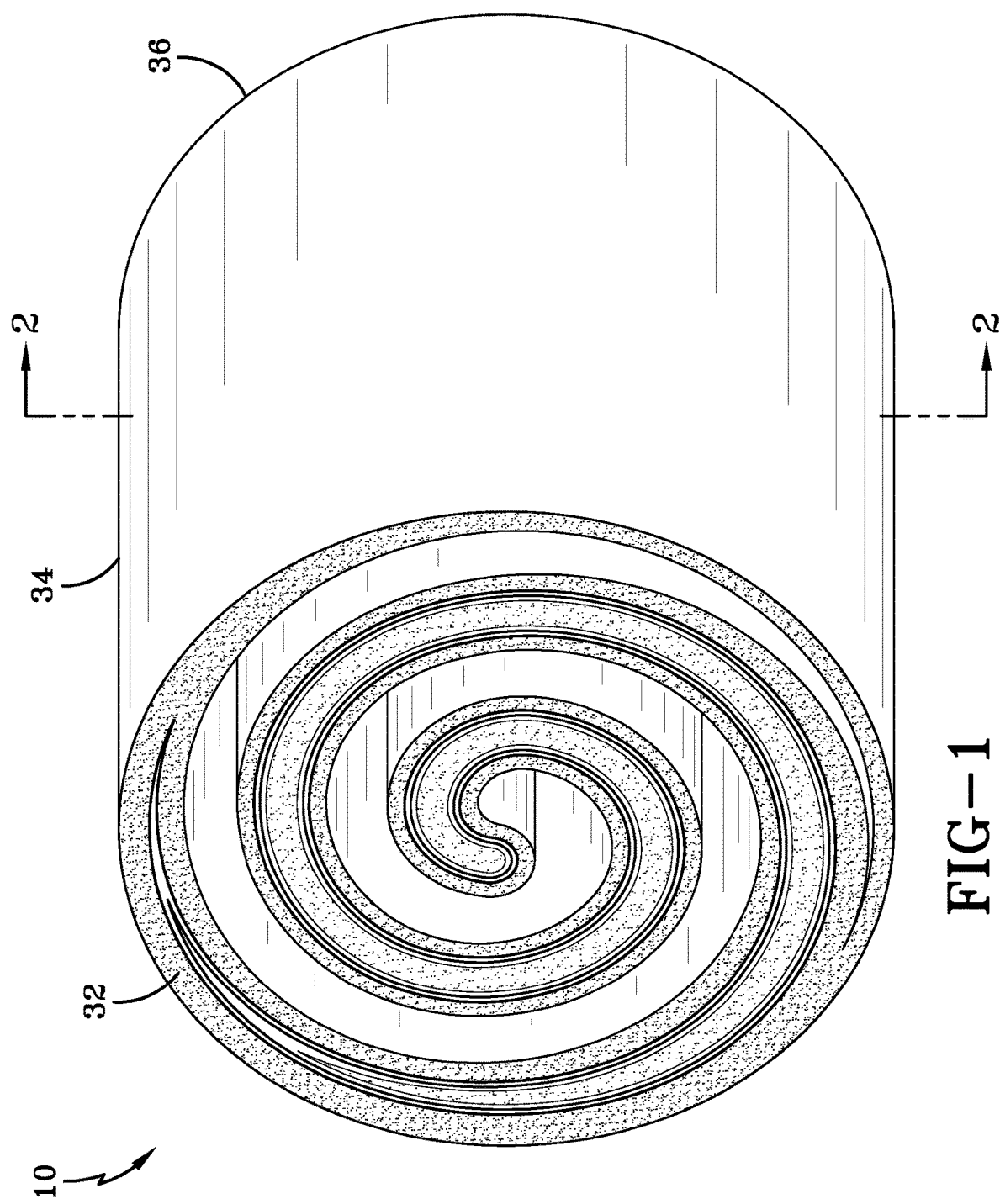
FIG. 1 is a schematic perspective view of a tubular solid-oxide fuel cell (SOFC) having a spiral cross-section.
Figure 2:
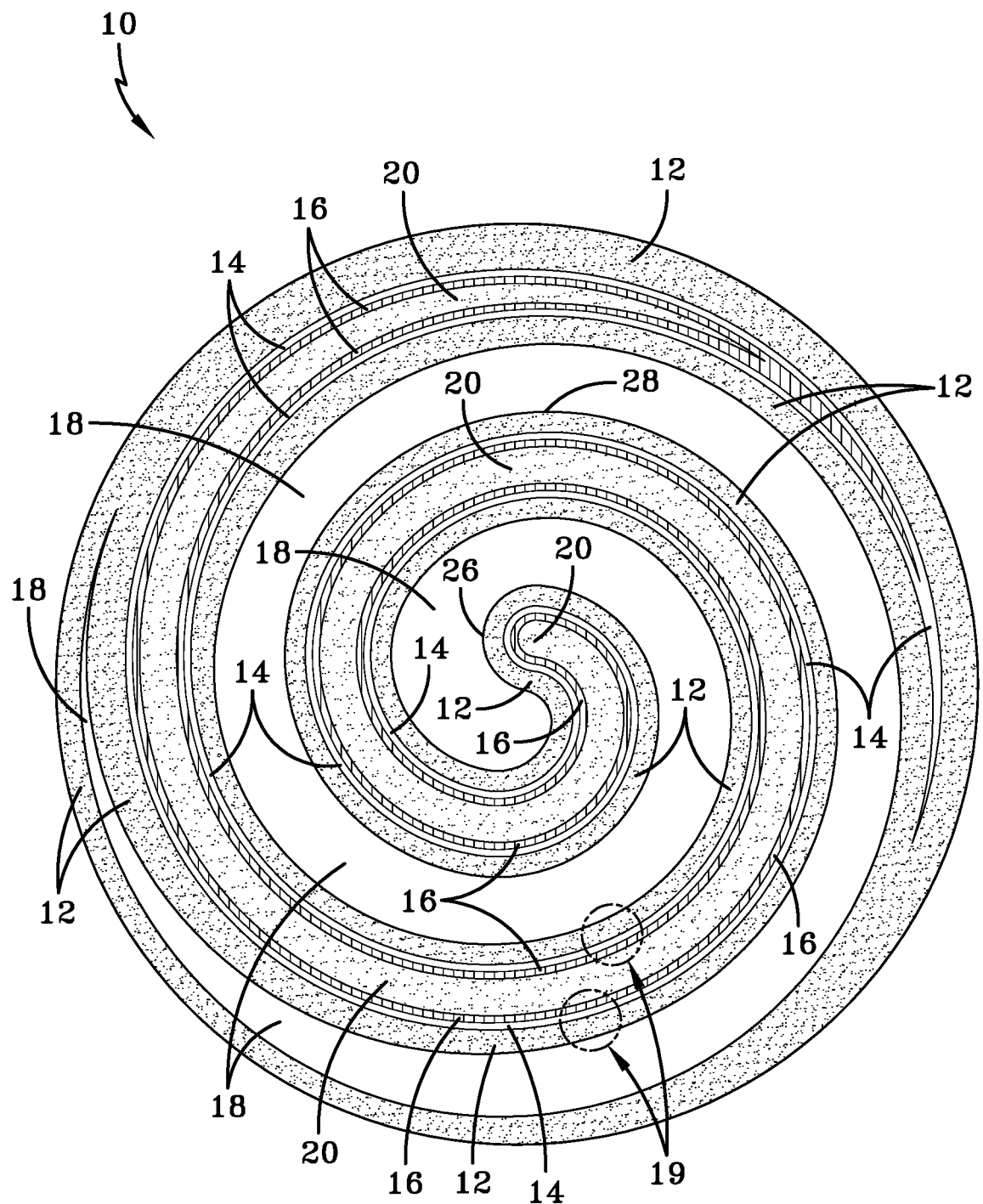
FIG. 2 is a cross-sectional view of the tubular solid-oxide fuel cell shown in FIG. 1.
Figure 3:
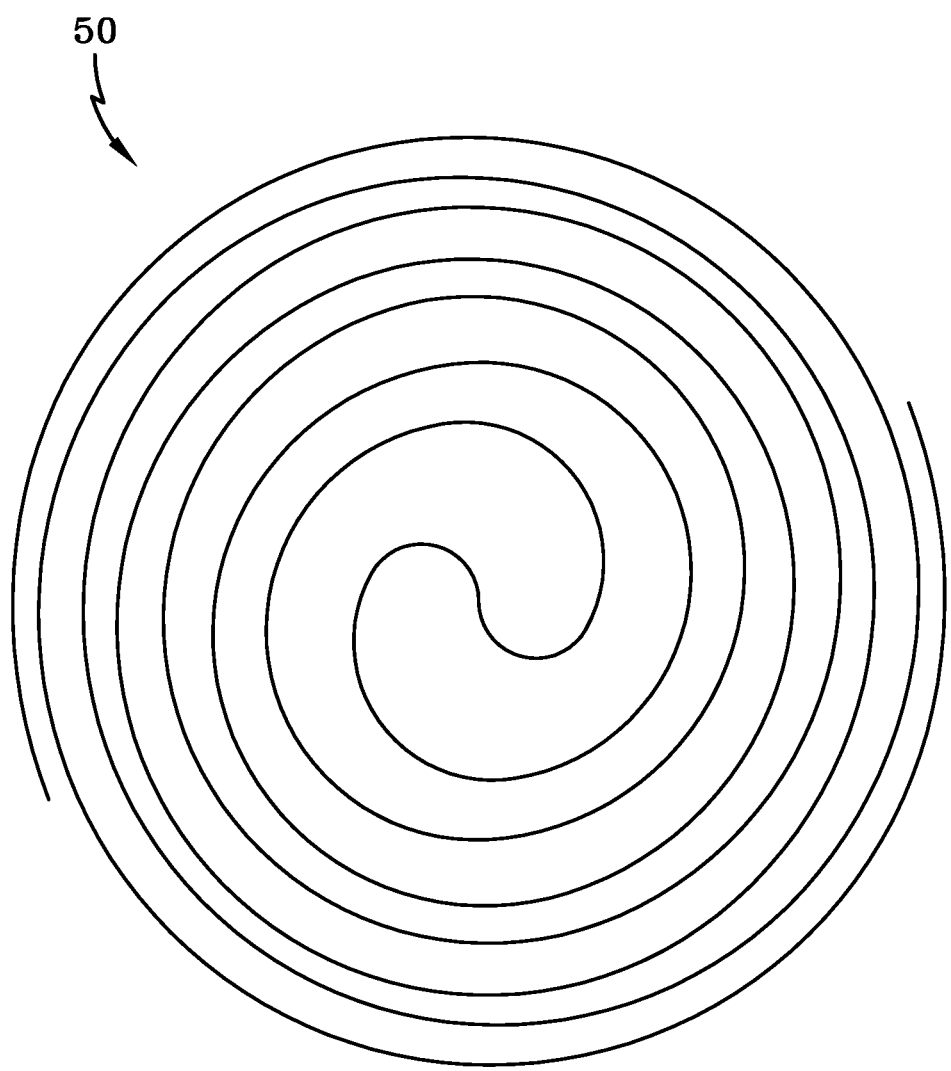
FIG. 3 is a schematic of a Fermat spiral.

In one embodiment of the 3D design process, any suitable 3D modeling software may be used to form a computer model of the desired fuel cell. It should be appreciated that the fuel cell that is being computer modeled may comprise any suitable design or configuration, such as a spiral solid-oxide fuel cell (SOFC) that has a spiral cross-section, such as SOFC 10 in FIG. 1. After verifying the design of the fuel cell using the computer model, the theoretical power density that is output by the fuel cell may be calculated therefrom. Next, a physical model of the fuel cell is manufactured using any suitable additive manufacturing technique. For example, the additive manufacturing technique utilized by the various embodiments of the manufacturing process discussed herein may include, but is not limited to: powder and slurry 3D printing, selective laser sintering (SLS), selective laser melting (SLM), stereo lithography, laminated object manufacturing, direct deposition additive manufacturing (e.g. material extrusion), material jetting, and binder jetting. In addition, the manufactured physical model of the fuel cell will be checked against the design/computer model, and evaluated for manufacturing defects.

In one embodiment, the physical fuel cell model may be manufactured using a selective laser sintering (SLS) additive manufacturing process. The SLS process may utilize a 3D printer or any other suitable device. In addition, the material used to form the fuel cell using the SLS process may comprise a ceramic material or a ceramic composite material. For example, the material used to form the fuel cell may include yttria stabilized zirconia (YSZ) powder that is combined with nickel oxide (NiO). After the fuel cell has been manufactured, the microstructure may be checked using SEM (scanning electron microscope) to identify how the YSZ and NiO particles are melted together and to determine how far it is from the required microstructure.

As previously discussed, the fuel cell manufactured by the various processes discussed herein, may include the spiral fuel cell 10, as disclosed in U.S. Pat. No. 8,182,959, which is incorporated herein by reference. In addition, the manufacturing processes taught herein may also be utilized to form a fuel cell manifold, including a spiral fuel cell manifold.

Spiral Fuel Cell Fabrication by Selective Laser Sintering (SLS):

In one embodiment, the additive manufacturing method utilizes a selective laser sintering (SLS) process or SLS 3D Printing. SLS is a convenient process for manufacturing a spiral fuel cell, as the desired characteristics of the spiral fuel cell cannot be obtained using other conventional manufacturing processes. However, there are many parameters that affect the structure of the fuel cell in order to produce one with desirable characteristics. For example, the desirable characteristics of the spiral fuel cell and the manufacturing parameters used to form such spiral fuel cell are discussed as follows:

Microstructures: The ceramic portion of the spiral fuel cell is porous (35-45% porosity, pore size on one side of the wall may be about <1 µm, while the pore size on the other side wall may be from about 5-20 µm).

Particle size: A particle size of 1 µm or less for the atomized powder particles with a laser wavelength beam of about 1.064 µm using a 50 W fiber laser beam achieves desirable results.

Mixing proportions: Mixing additional ceramic powder with zirconia causes it to increase the laser absorption and enhance the thermal resistance.

Laser Vector Orientation: The laser vector may be oriented in a manner to prevent the formation of voids and to generate a more compatible microstructure.

Laser Vector Length: The length of the laser vector is affected by the informality of the 3D CAD model and this may result in variable energy inputs, as several laser vectors will be used in one section and that leads to heat transfer variation that affects the cell structure.

Particle Size and the Power Layer thickness: It has been found that a desirable result may be obtained by using a layer thickness of about 10 times or less the particle size.

Laser Beam Penetration: In order to achieve a desirable microstructure, the laser beam should be able to penetrate through the current and the previous powder layer.

Laser Beam Density: The laser beam should be dense enough in order to partially melt the YSZ. In one embodiment, with almost 0.08 molar percent between yttria and zirconia will start to melt at approximately 600-1000° C.

The laser beam intensity should be enough to partially melt the NiO and YSZ to around 600-1000° C. which allows the particles to be connected together, thereby shaping a porous structure. From the experiment conducted in Ecole Nationale D'Inginiuers de Saint-Etienne ENISE and Ecole Nationale Superieure de Mines de Saint-Etienne in 2007 the laser used to melt the YSZ alone has wavelength beam of 1.064 µm using 50 W fiber laser beam and good microstructure was achieved.

Additive Manufacturing Techniques:

As previously discussed, the additive manufacturing process disclosed herein may utilize any suitable additive manufacturing process, including but not limited to: power and slurry based 3D printing; selective laser sintering (SLS), selective laser melting (SLM), stereo lithography, laminated object manufacturing, and direct deposition additive manufacturing (e.g. material extrusion), material jetting, and binder jetting.

3D Model of the Spiral Fuel Cell:

In one embodiment, the computer model of the spiral fuel cell, such as a 3D computer model, may be generated using any suitable software package, such as SOLID EDGE CAD software. The 3D model design of the spiral fuel cell may be configured so that it includes two spiral pathways that are symmetrical and have ends that are approximately 180° apart in the inner surface of the exterior wall. However, it should be appreciated that the ends may be any suitable number of degrees apart. In addition, the wall thickness and the space may be configured to have convenient proportions to allow the fuel and gas to pass through and to prevent manufacturing defects that are due to the de-powdering process (not too dense and not too wide part). In addition, fitting tolerance should be appropriate to make the manifold fit on the spiral fuel cell shell.

Sample Experimental Models:

A spiral fuel cell prototype was produced using a 3D printer for prototyping and the following samples were printed with a resolution of 0.1 mm.

A previous study conducted in Ecole Nationale D'Inginiuers de Saint-Etienne ENISE & Ecole Nationale Superieure de Mines de Saint-Etienne titled "Ceramic Components Manufacturing by Selective Laser Sintering" tested the ceramic powder with a wide range of particle size as shown in the table below;

In order to observe the relationships between the material-process-microstructure many parameters may be tested, such as:

1. Orientation of the laser vector.
2. Length of the laser vector.
3. Powder layering strategy.
4. The temperature in the enclosure.
5. Post heat treatment in the furnace.

From the above figures, the SLS additive manufacturing process is able to generate a very fine and self-held thin wall of ceramic material and with a material porosity that is suitable for use in fuel cell operation.

Another study conducted in the Institute of Mechanical Engineering in Germany and Clausthal University of Technical titled "Selective Laser Sintering of Metal and Ceramic and Metal Compound Structure" used chrome carbide and steel layering, which concentrated on the following parameters: connection mechanism between ceramic and steel components; creation of interfaces; bonding force between layers; and homogeneity and porosity of the compound structure.

From the previous study, the two techniques of layering and mixing can be used or even combined together to increase the connectivity of the SOFC to allow the charged particles to move with a higher rate and eliminate the isolated areas and the trapped particles. That would have a significant increase in the overall efficiency of the fuel cell, such as a solid oxide fuel cell.

The following is a result of another study conducted using direct ink deposition and powder deposition techniques, which gave a porosity between (35-45%). In addition, the compression strength in MPa was studied for all the materials that have been tested, including ceramic based materials.

With regard to the composite between the ceramic and metal, one of the previously conducted experiments shows that tight contacts between steel and ceramic powder can be generated with selective laser sintering. Stability between these two different basic materials is based upon the connecting mechanism (pure mechanical till adhesive bonding). Moreover, measurement of hardness shows that all samples contain an improved surface tensile strength than objects of only steel powder. Improved results have been achieved with non-oxide ceramics ($Si_3N_4$, AlN, SiC etc.) and carbides (WV-NI 83-17, Cr3C2-NiCr). Obtained hardness (HV 0, 5 DirectSteel/WC-Ni 83-17 mixture=375) is substantially better than for pure metal powder (HV 0, 5 DirectSteel=172).
Modifications and Added Features Permitted by Additive Manufacturing Manifold and Single Spiral Cell:

Additive manufacturing allows easy editing of the SOFC manifold design in order to increase the followability and smooth flow of the air and the fuel from and into the model. One of the changes that may be made in the manifold/SOFC design is a modification of the curvature of to allow smooth passage with lower restrictions.

From the previously conducted studies, SLS/M of the ceramic powder and compound ceramic/metal mixture allowed the fabrication of ceramic with a different particle size. This also allowed a porous microstructure to be achieved, which is required for the spiral fuel cell support to enable the gas to penetrate from one side to the other, thereby enlarging the power density by decreasing the resistance caused by the dense structure.

In addition, additive manufacturing allows the addition of features, such as a heat exchanger and the manipulation of the design to achieve better performance, easier production and higher efficiency solid oxide fuel cells (SOFCs) in general, and the design of several models with a spiral cell, which has a larger impeded surface area and other additional features.

From the previously illustrated data the most convenient manufacturing process and additive manufacturing techniques for the fuel cell/manifold include, but are not limited to: additive manufacturing using binder jetting, material deposition or SLS for the fuel cell manifold; addictive manufacturing using binder jetting, material deposition or SLS for the spiral shell prototype; extrusion or casting for the mass production of the spiral shell and the mold requiring 3D printing and internal and external finishing processes; and GEL casting, ice molding and foam/sponge spiral support.

Therefore, the compact fuel cell manifold discussed herein has multiple functions, including but not limited to: delivering gases in and out of the spiral fuel cell, collecting electrical current on both an anode and cathode of the fuel cell, and exchanging heat between the inlet and outlet gases. In addition, super alloys (e.g. Inconel) and additive manufacturing processes (e.g. laser sintering 3D printing) are used to fabricate the spiral fuel cell support, as well as the manifold.

In addition, the manifold embodiments discussed herein overcome the challenges in delivering gasses to the spiral fuel cell and the collection of electrical current from the fuel cell, as well as overcome the challenges in recovering heat from the exhaust gases and the preheating of incoming gases. Thus, because the SOFCs and the manifold together combine multiple functions into one unit, the resultant fuel cell/manifold stack is able to have a compact design, as well as a reduced weight and volume.

Furthermore, the spiral fuel cell of the present invention is able to generate electricity at 3-5 times higher volumetric power density than conventional tubular fuel cells. It should also be appreciated that the fabrication method discussed herein may be used for electrolyzers to produce fuel or gases from carbon dioxide.

Therefore, it can be seen that the objects of the embodiments have been satisfied by the structure and its method for use presented above. While in accordance with the Patent Statutes, only the best mode and preferred embodiments have been presented and described in detail, with it being understood that the embodiments disclosed herein are not limited thereto or thereby. Accordingly, for an appreciation of the true scope and breadth of the invention, reference should be made to the following claims.

What is claimed is:

1. A manifold for solid-oxide fuel cells (SOFCs) comprising:
    a body;
    a first interface and a second interface included by said body, each said interface being configured to be removably coupled to one of the SOFCs, wherein said first interface and said second interface each include:
        a first fuel port in operative communication with a second fuel port included by said body;
        a first oxidant port in operative communication with a second oxidant port included by said body;
        wherein said first fuel port and said first oxidant port each form a closed Fermat spiral of circular cross-section and having an axis; and
        further comprising longitudinally extending channels accommodating gas flow through said channels parallel to said axis.

2. The manifold of claim 1, further comprising a heat exchanger body having a third fuel port and a third oxidant port, wherein said heat exchanger body includes therein a partition that defines a first channel and a second channel, such that said first channel is in operative communication with said second fuel port and said second channel is in operative communication with said second oxidant port.

3. The manifold of claim 1, wherein said body includes a cavity that is separated by a partition to define a fuel chamber and an oxidant chamber, such that said fuel port is in operative communication with said fuel chamber and said oxidant channel is in operative communication with said oxidant port, and
    wherein said fuel chamber is in operative communication with said fuel port of said first and second interfaces, and said oxidant chamber is in operative communication with said oxidant port of said first and second interfaces.

4. The manifold of claim 1, wherein said first fuel port and said first oxidant port are disposed in respective sections that are each formed as Fermat spirals.

5. The manifold of claim 1, wherein said first and second channels are spirals.

6. The manifold of claim 1, wherein said interfaces are opposite to each other.

7. The manifold of claim 1, wherein said body further includes:
   an electrode configured to be placed in electrical communication with an anode or a cathode of the electrochemical device.

8. The manifold of claim 1, wherein the manifold is formed of Inconel, Crofer APU, lanthanum chromite based conductive ceramics, or composites thereof.

\* \* \* \* \*